(12) United States Patent
Hubler et al.

(10) Patent No.: US 10,411,520 B2
(45) Date of Patent: Sep. 10, 2019

(54) SYSTEM AND METHOD FOR WIRELESS ENERGY TRANSFER WITH NON-SINUSOIDAL WAVES

(71) Applicant: The Board of Trustees of the University of Illinois, Urbana, IL (US)

(72) Inventors: Alfred W. Hubler, Urbana, IL (US); Thomas Kirsh, Urbana, IL (US); Juehang Qin, Lafayette, IN (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 186 days.

(21) Appl. No.: 15/688,049

(22) Filed: Aug. 28, 2017

(65) Prior Publication Data

US 2018/0062448 A1 Mar. 1, 2018

Related U.S. Application Data

(60) Provisional application No. 62/380,791, filed on Aug. 29, 2016.

(51) Int. Cl.
*H02J 50/27* (2016.01)
*H02J 50/40* (2016.01)
*H02J 50/12* (2016.01)
*H04B 5/00* (2006.01)

(52) U.S. Cl.
CPC .............. *H02J 50/27* (2016.02); *H02J 50/12* (2016.02); *H02J 50/40* (2016.02); *H04B 5/0031* (2013.01); *H04B 5/0037* (2013.01)

(58) Field of Classification Search
CPC . H02J 50/12; H02J 50/27; H02J 50/40; H04B 5/0031; H04B 5/0037

USPC .................... 307/104, 149, 109, 110, 66, 64
See application file for complete search history.

(56) References Cited

U.S. PATENT DOCUMENTS

| | | | | |
|---|---|---|---|---|
| 2,529,667 A * | 11/1950 | Villem | ...................... | H04B 7/12 455/162.1 |
| 2,556,669 A * | 6/1951 | Albersheim | ............... | H04J 3/00 342/60 |
| 2007/0046289 A1* | 3/2007 | Troxler | .................. | G01N 33/42 324/334 |
| 2010/0315990 A1* | 12/2010 | Utagawa | ................ | H01Q 1/248 370/315 |
| 2012/0122416 A1* | 5/2012 | Ito | ........................ | H03D 1/2272 455/333 |
| 2017/0093222 A1* | 3/2017 | Joye | ..................... | H04B 5/0037 |
| 2017/0229911 A1* | 8/2017 | Ettes | ....................... | H02J 5/005 |

(Continued)

*Primary Examiner* — Fritz M Fleming
*Assistant Examiner* — Jagdeep S Dhillon
(74) *Attorney, Agent, or Firm* — Klintworth & Rozenblat IP LLP

(57) ABSTRACT

The present disclosure provides a communication and power transfer system, the system comprising a transmitter capable of emitting a signal (e.g. microwaves) and comprising a means for modulating the frequency of a signal to a frequency modulated signal, and a receiver, the receiver synchronized to be in resonance with the frequency modulated signal so as to be able to receive signal. Methods for using carrier wave for communication and power transfer are also provided. The present disclosure provides a secure communication and power transfer systems utilizing frequency modulated microwaves that are minimally absorbed by organic matter and can move through aqueous media.

17 Claims, 58 Drawing Sheets
(11 of 58 Drawing Sheet(s) Filed in Color)

(56) References Cited

U.S. PATENT DOCUMENTS

| | | | |
|---|---|---|---|
| 2017/0229920 A1* | 8/2017 | Joye | H02J 7/025 |
| 2018/0219419 A1* | 8/2018 | Ettes | H02M 3/3376 |
| 2018/0241223 A1* | 8/2018 | Bae | H02J 50/80 |
| 2019/0020119 A1* | 1/2019 | Laxminarayana | H01Q 25/002 |

* cited by examiner

SYSTEM AND METHOD FOR WIRELESS ENERGY TRANSFER WITH NON-SINUSOIDAL WAVES

CROSS-REFERENCE TO RELATED APPLICATIONS

This application claims priority to U.S. provisional application Ser. No. 62/380,791, filed on Aug. 29, 2016, the contents of which is incorporated herein in its entirety.

STATEMENT REGARDING FEDERALLY SPONSORED RESEARCH OR DEVELOPMENT

This invention was made with government support under N00014-14-1-0381 and N00014-15-1-2397 awarded by Office of Naval Research and AF FA9453-14-1-0247 awarded by Air Force Research Lab. The government has certain rights in the invention.

BACKGROUND

Wireless power transfer in a room occupied by humans is an unsolved problem. Current technologies available for wireless energy transfer can include: Inductive coupling, omnidirectional electromagnetic radiation, unidirectional electromagnetic radiation, and magnetic resonance coupling. Inductive coupling is a low cost solution with high efficiency, but the transmission distance is less than the size of the inductive coil. Magnetic resonance coupling provides greater range, up to several meters, but may damage biological tissue in the vicinity. Omnidirectional radiation can transfer power to very small receivers, but the power density decreases rapidly as a function of the distance between sender and receiver. Directed radiation provides high efficiency and range, but the sender needs to track the position of mobile receivers.

Power transfer by directed radiation can be done by microwave transmission and optical transmission. Optical power transmission using lasers has the main advantage of allowing much smaller apertures for both the transmitter and the receiver, however depends on good weather. With microwaves, large power densities are achievable in resonant cavities and waveguides, such as within microwave ovens. Microwave power transfer can have an efficiency over 80%. However, outside of a confined waveguide or cavity, intense microwave radiation is harmful to living beings and make a commercial deployment of microwave power transfer impossible. For the same reason, it is difficult to transmit microwaves through dense media. This has implications for communications with and supplying power to underwater craft and embedded sensors, such as medical sensors inside the human body.

BRIEF DESCRIPTION OF THE DRAWINGS

This patent or application file contains at least one drawing executed in color. Copies of this patent or patent application publication with color drawings will be provided by the Office upon request and payment of the necessary fee. The features, objects and advantages other than those set forth above will become more readily apparent when consideration is given to the detailed description below. The detailed description makes reference to the following drawings, including color drawings, wherein.

Figure 1:
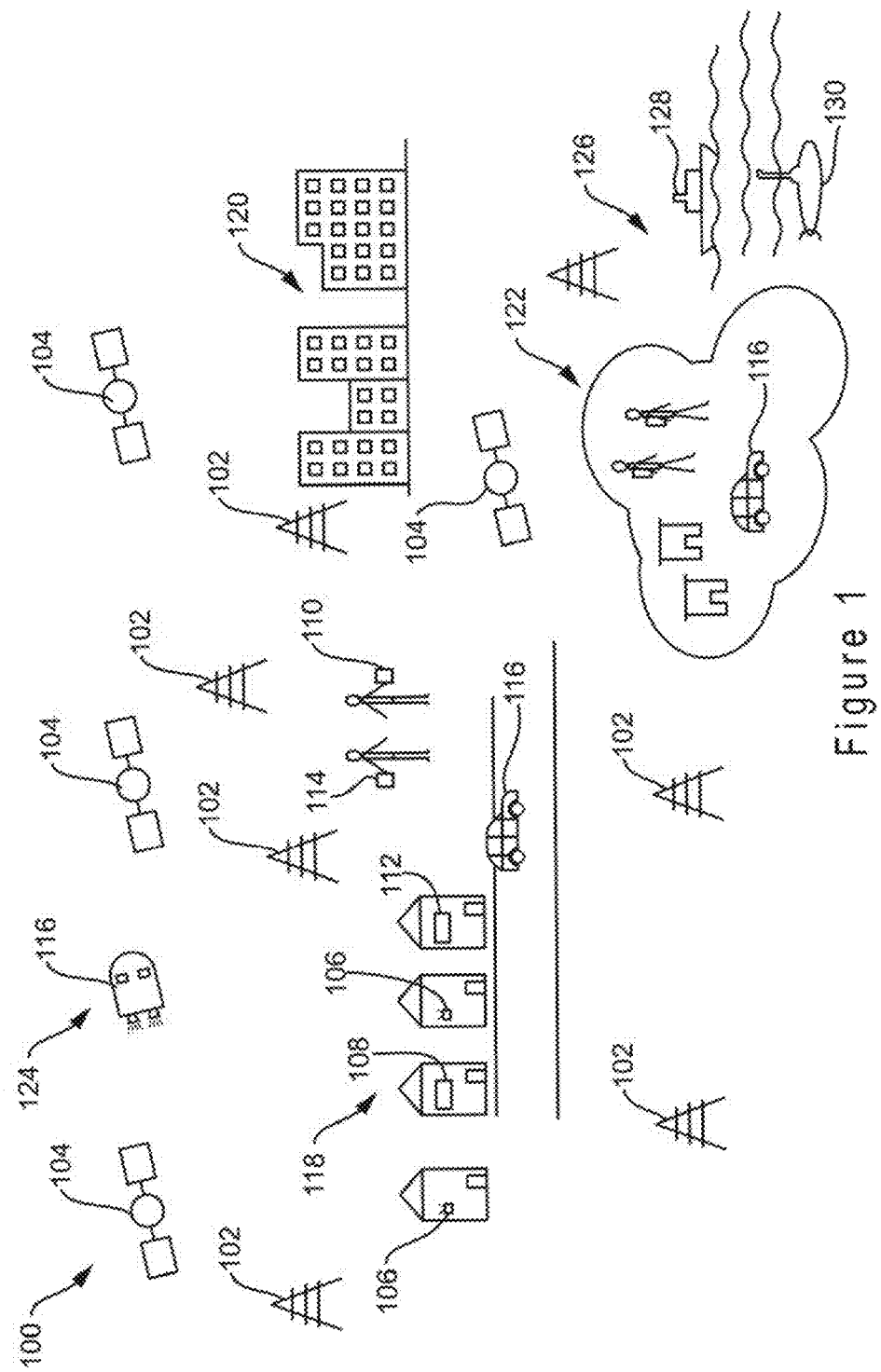
FIG. 1 is a system diagram of example wireless power environment.

While the present invention is susceptible to various modifications and alternative forms, exemplary embodiments thereof are shown by way of example in the drawings and are herein described in detail. It should be understood, however, that the description of exemplary embodiments is not intended to limit the invention to the particular forms disclosed, but on the contrary, the intention is to cover all modifications, equivalents and alternatives falling within the spirit and scope of the invention as defined by the embodiments above and the claims below. Reference should therefore be made to the embodiments above and claims below for interpreting the scope of the invention.

The patent or application file contains at least one drawing executed in color. Copies of this patent or patent application publication with color drawing(s) will be provided by the Office upon request and payment of the necessary fee.

DETAILED DESCRIPTION

The system and methods now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

Likewise, many modifications and other embodiments of the system and methods described herein will come to mind to one of skill in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Unless defined otherwise, all technical and scientific terms used herein have the same meaning as commonly understood by one of skill in the art to which the invention pertains. Although any methods and materials similar to or equivalent to those described herein can be used in the practice or testing of the present invention, the preferred methods and materials are described herein.

FIG. 1 is a system diagram of example wireless power environment 100. The environment can include wireless transmitters for wirelessly transmitting power, including, but not limited to, one or more of, cellular towers 102, satellites 104, Wi-Fi routers 106, standalone devices 108, etc. and wireless receivers for wirelessly receiving power, including, but not limited to, one or more of, mobile phones 110, mobile computers 112, tablets 114, cameras, radios, playback devices, etc. Additionally or alternatively, the wireless receivers can be used to power batteries of vehicles 116, including but not limited to one of more of consumer vehicles, military vehicles space vehicles, land vehicles, above and below water sea vehicles, e.g., boats 128 and submarines 130, etc. Example wireless power environments 100 includes, but is not limited to, residential environments 118, business environments 120, military environments 122, space environments 124, sea environments 126, etc. The wireless power environment 100 can help reduce weight in space, and one the ground and at sea, e.g., by reducing a number of cables, plugs, etc. needed.

One application includes wireless power transfer, for both high power density transfer for long range transmission in the case of space-based solar, and low power density transmission for microelectronics. A rate of frequency modulation required for significant reduction of peak population can be lower for a lower power signal. In addition to those applications, the present disclosure can find use in rapidly modulated signal as a carrier wave for communications. The same signal can be used for both power transfer and communications. Another advantage can be that this fast frequency modulation can be used as a form of multiplexing and to provide resistance to jamming, in a way similar to frequency-hopping spread spectrum. Additionally or alternatively, the wireless power has applications in the transmission of microwaves through dense media. It can enable wireless charging of and communications with embedded medical sensors or communications at greater depth with underwater craft, without the signals being absorbed by living things within the ocean and/or being minimally absorbed in a non-harmful way.

In one aspect, a communication and power transmission system is provided including a transmitter, the transmitter capable of emitting a signal and comprising a means for modulating the frequency of a signal, and a receiver, wherein the receiver is synchronized to be in resonance with the signal so as to be able to receive the signal. The signal can be any source of electromagnetic radiation, including, but not limited to, radio waves, X-rays, microwaves, ultrasound, visible light. In one embodiment, the signal is microwaves.

The transmitter can be any device capable of sending at an electromagnetic radiation signal, including, but not limited to, a magnetron; a Gunn oscillator; a quantum system with short lived intermediate states; a self-sustained nonlinear electric oscillator; a quantum system in a rapidly changing external field; and an electromagnetic wave emitter driven by the amplified output of a function generator.

The means for modulating the frequency of the signal includes rapidly changing the frequency control voltage of self-sustained, nonlinear electric oscillator with adjustable inductance or adjustable capacitance. The signal does not have to be a directed beam, a signal that emanates in all directions can be used. With a multidirectional signal, most of the signal will flow to the receiver because of distractive interference in the far field.

The antenna can be a time-dependent resonance frequency, a quantum system with short lived intermediate states, a self-sustained nonlinear electric oscillator, or a quantum system in a rapidly changing external field.

Methods of Using a Carrier Wave for Communication and Power Transfer is also provided, the method including rapidly modulating the frequency of a signal from a transmitter and synchronizing the frequency-modulated signal with a receiver so that the frequency-modulated signal is in resonance with the receiver. In one embodiment, the rate of modulating the frequency depends on the amount of power of the signal desired. In one embodiment, a significant fraction energy of the electromagnetic wave self-directs from the transmitter to the receiver.

Reducing Microwave Absorption with Chaotic Microwaves

In one example, a response of a two-level quantum system to a chaotic signal is determined using numerical methods compared to the response to a sinusoidal signal. We expect the largest response for sinusoidal driving functions, because the Schrödinger equation is linear. The method is based on numerical solutions of the Schrödinger solution of the two-level system, and the chaotic signal used is that of a Chua oscillator. We find that when two-level systems are perturbed by a chaotic signal, the peak population of the initially unpopulated state is much lower than which is produced by a sinusoidal signal of small detuning. This is true even when the peak frequency of the chaotic signal, which is identified via a discrete fourier transform, is close to the resonant frequency. We also find that the response is weaker for a weaker signal, where the resonant peak for a sinusoidal signal would be narrower. We discuss potential applications of this result in the field of microwave power transmission, as it shows applying chaotic forcing functions to transmitted microwaves used for power transmission can decrease unintended absorption of microwaves by organic tissue to an non-harmful amount.

We study the response of a two-level quantum system to a chaotic signal using numerical methods and compare it to the response to a sinusoidal signal. We expect the largest response for sinusoidal driving functions, because the Schrödinger equation is linear. The method is based on numerical solutions of the Schrödinger solution of the two-level system, and the chaotic signal used is that of a Chua oscillator. We find that when two-level systems are perturbed by a chaotic signal, the peak population of the initially unpopulated state is much lower than which is produced by a sinusoidal signal of small detuning. This is true even when the peak frequency of the chaotic signal, which is identified via a discrete fourier transform, is close to the resonant frequency. We also find that the response is weaker for a weaker signal, where the resonant peak for a sinusoidal signal would be narrower. We discuss potential applications of this result in the field of microwave power transmission, as it shows applying chaotic forcing functions to transmitted microwaves used for power transmission can decrease unintended absorption of microwaves by organic tissue.

Absorption of chaotic microwaves by dense media can be much less, because chaotic microwaves have an impedance mismatch with linear quantum systems. This suggests that most dielectric and poorly conducting matter is largely transparent to chaotic microwaves, including organic materials and water. Despite that, a non-linear system with similar characteristics may exhibit synchronization of chaos, suggesting chaotic microwaves can resonate with such nonlinear systems. This implies that chaotic microwaves can pass undiminished through matter, and then be absorbed by a nonlinear antenna, and thereby transport energy from an energy source to an energy sink, while minimizing energy absorption by other sources, e.g., to a non-harmful amount. We discuss potential applications for safe and secure wireless power transfer in rooms occupied by humans and communication in media with a high water content.

Description of Two Level Quantum System

We consider a system with two base states, $|1\rangle$ and $|2\rangle$, where the two base states are symmetric, such as in the case of an ammonia molecule with spin states Up or Down. The state vector of that system would then be defined by Equation (1).

$$|\psi\rangle = C_1|1\rangle + C_2|2\rangle \tag{1}$$

The Hamiltonian can be expressed as Equation (2), when there is an external time-dependent field. $\mu$ represents the dipole moment, and E(t) represents the time-varying field.

$$H_0 = \begin{pmatrix} E_0 + \mu E(t) & -A \\ -A & E_0 - \mu E(t) \end{pmatrix} \tag{2}$$

The Hamiltonian in Equation (2) can be transformed into Equation (3).

$$H = \begin{pmatrix} E_0 + A & \mu E(t) \\ \mu E(t) & E_0 - A \end{pmatrix} \tag{3}$$

The transformation matrix is as shown in Equation (4).

$$S = \frac{1}{\sqrt{2}} \begin{pmatrix} 1 & -1 \\ 1 & 1 \end{pmatrix} \tag{4}$$

The Hamiltonian H shown in Equation (3) is useful as it represents the diagonalized Hamiltonian if there is no external field, and can be considered almost diagonal for weak fields. The basis states based on this Hamiltonian is shown in Equation (5).

$$|\psi\rangle = C1|1\rangle + C_2|2\rangle \tag{5}$$

This yields the system of differential equations shown in Equation (6).

$$i\hbar \frac{dC1}{dt} = (E_0 + A)C1 + \mu E(t)C2,$$
$$i\hbar \frac{dC2}{dt} = (E_0 + A)C2 + \mu E(t)C1 \tag{6}$$

In the case of a electric field that is weak, such that $\mu E \ll A$, C1 and C2 can be expressed as per Equation (7).

$$C1 = \gamma 1 e^{-i(E_0 + A)t/\hbar}$$
$$C2 = \gamma 2 e^{-i(E_0 - A)t/\hbar} \tag{7}$$

The system described in Equation (6) can then be formulated as Equation (8).

$$i\hbar \frac{d\gamma 1}{dt} = \mu E(t) e^{i\omega_0 t} \gamma 2,$$
$$i\hbar \frac{d\gamma 2}{dt} = \mu E(t) e^{-i\omega_0 t} \gamma 1 \tag{8}$$

where $\hbar \omega_0 = 2A$.

In the sinusoidal case, such a system can be pertubed by an electric field defined by Equation (9). This can be a good approximation for a planar electromagnetic wave with varying frequency, as long as wavelength is significantly longer than the system concerned, such that the gradient of the field is not significant.

$$E = 2E_0 \cos((\omega_0 + \Delta)t) \tag{9}$$

In this case, the solution would be Rabi's formula, as shown in Equation (10).

$$P_1 = |\gamma 1|^2 = 1 - \frac{\mu^2 E_0^2 / \hbar^2}{\mu^2 E_0^2 / \hbar^2 + \Delta^2/4} \sin^2\left(\sqrt{\frac{\mu^2 E_0^2}{\hbar^2} + \frac{\Delta^2}{4}}\, t\right) \tag{10}$$

$$P2 = |\gamma 2|^2 = \frac{\mu^2 E_0^2 / \hbar^2}{\mu^2 E_0^2 / \hbar^2 + \Delta^2/4} \sin^2\left(\sqrt{\frac{\mu^2 E_0^2}{\hbar^2} + \frac{\Delta^2}{4}}\, t\right)$$

Chua Oscillator as Forcing Function

The Chua Oscillator is described by Equation (11).

$$\frac{dX}{dT} = \alpha[Y - X - f(X)], \tag{11}$$
$$\frac{dY}{dT} = X - Y + Z,$$
$$\frac{dZ}{dT} = -\beta Y,$$
$$f(x) = |x-1| - |x+1| - \frac{x}{2}$$
$$X(T) = x(t), Y(T) = y(t), Z(T) = z(t), T = \frac{t}{\tau}$$

where variable $\tau$ is introduced as a timescale variable. This is introduced to allow for a change in timescale, which is analogous to frequency. To create a detuning variable $\Delta$ that is scaled as it is in Equation (9), $\tau$ has to be scaled as shown in Equation (12).

$$\tau = \frac{\omega_0 + \Delta}{2\pi f_{peak}} \tag{12}$$

$f_{peak}$ is defined as the peak frequency as determined with a fourier transform of Z(t), which is the variable used as the forcing function.

Combining Equation (11) and Equation (10), with Z(t) as the forcing function, yields Equation (13).

$$\frac{dX}{dt} = \tau\{\alpha[Y - X - f(X)]\}, \tag{13}$$
$$\frac{dY}{dt} = \tau(X - Y + Z),$$
$$\frac{dZ}{dt} = \tau(-\beta Y),$$
$$i\hbar \frac{d\gamma_1}{dt} = \mu A Z e^{i\omega_0 t} \gamma_2,$$
$$i\hbar \frac{d\gamma_2}{dt} = \mu A Z e^{-i\omega_0 t} \gamma_1$$

where A refers to an amplitude parameter used to vary the strength of the electric field.

Equation (13) is the final form of the differential equation used in the numerical simulation.

Frequency Response to Chaotic Signal as Forcing Function

As the system of differential equations shown in Equation (13) cannot be analytically solved, numerical solutions has to be computed. The numerical solutions are computed using the MATLAB function ode45, which is an implementation of the explicit Runge Kutta solver. The numerical solutions of Equation (13) are plotted together with Equation (10), to compare the response of a chaotic signal to a sinusoidal one in FIGS. 1 and 2.

The response is characterized by the average probability of the initially unpopulated state, as defined by in Equation (14).

$$P_{avg} = \frac{1}{T}\int_0^T P_2(t)dt \qquad (14)$$

where T is the period of one oscillation of the wavefunction due to sinusoidal forcing, given by $$\sqrt{\frac{\mu^2 E_0^2}{\hbar^2} + \frac{\Delta^2}{4}}.$$

This can be seen from Equation (10).

Discussion of Example Results

Figure 2:
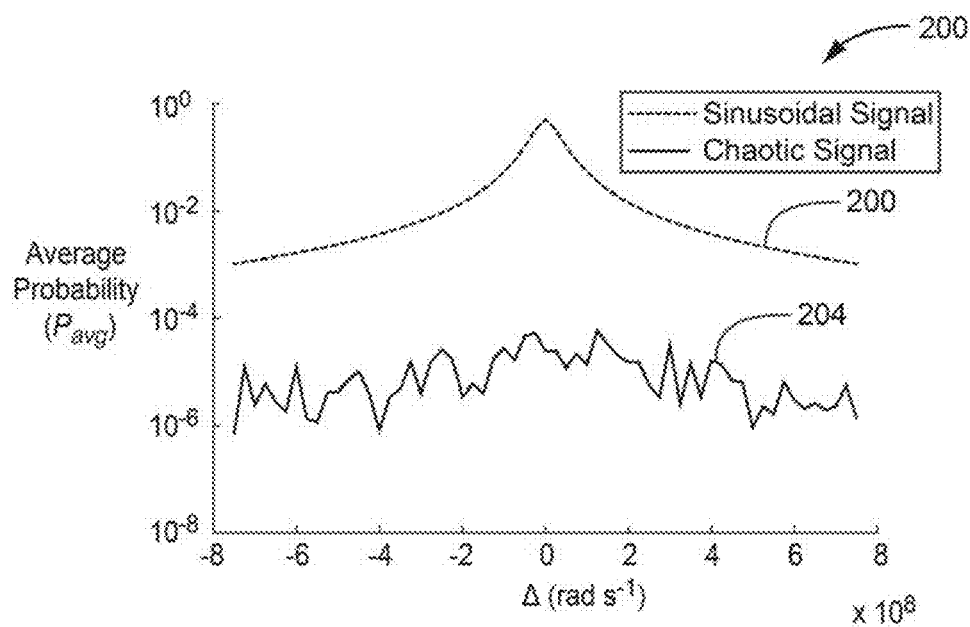
FIG. 2 is a graph of an example average probability that the system is in state 2 as a function of A for a small forcing function.
Figure 3:
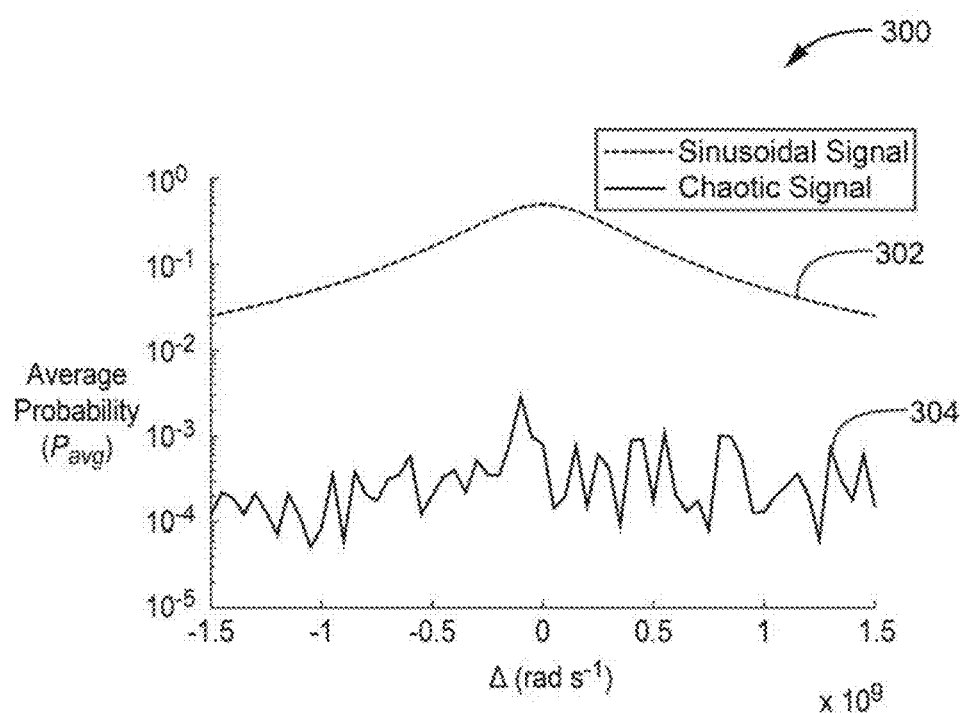
FIG. 3 is a graph of an example average probability that the system is in state 2 as a function of A for a large forcing function.

Example results are shown in FIGS. 2 and 3.

FIG. 2 is a graph 200 of an example average probability that the system is in state 2 as a function of A for a small forcing function. The blue line 202 represents analytical solution given by Equation (10), and the orange line 204 represents numerical solution given by Equation (13). The system described is the Nitrogen inversion of Ammonia, thus the dipole moment is $\mu$=1.472 D and the resonant frequency is $\omega_0$=2$\pi$×23870 Mhz. Electric field strength is A=100NC$^{-1}$, which corresponds to a root-mean-square field strength of $E_{rms}$=5.24×10$^2$NC$^{-1}$. The system is plotted on a logarithmic scale due to the large difference between sinusoidal and chaotic forcings. Length of simulation time is one theoretical period of the oscillation as given by Equation (10), which depends on the value of $\Delta$. The sinusoidal forcing is one of equivalent rms strength to the numerical forcing.

FIG. 3 is a graph 300 of an example average probability that the system is in state 2 as a function of $\Delta$ for a large forcing function. The blue line 302 represents analytical solution given by Equation (10), and the orange line 304 represents numerical solution given by Equation (13). The system described is the Nitrogen inversion of Ammonia, thus the dipole moment is $\mu$=1.472 D and the resonant frequency is $\omega_0$=2$\pi$×23870 Mhz. Electric field strength is A=1000NC$^{-1}$, which corresponds to a root-mean-square field strength of $E_{rms}$=5.24NC$^{-1}$×10$^3$. The system is plotted on a logarithmic scale due to the large difference between sinusoidal and chaotic forcings. Length of simulation time is one theoretical period of the oscillation as given by Equation (10), which depends on the value of $\Delta$. The sinusoidal forcing is one of equivalent rms strength to the numerical forcing.

FIG. 2 represents a solution with electric field strength of $E_{rms}$=5.24×10$^2$, which corresponds to a time-averaged plane wave Poynting vector magnitude of 7.29×10$^3$ Wm$^{-2}$ which is comparable in magnitude to the power density which is expected to be used for microwave transmission of space-based solar power. FIG. 3 represents a solution with electric field strength of $E_{rms}$=5.24×10$^3$, which corresponds to a time-averaged plane wave Poynting vector magnitude of 7.29×10$^5$ Wm$^{-2}$. This may be too high for space-based solar due to ionosphere interactions, however can be used for terrestrial power transmission.

Chaotic signals can be used for wireless power transfer in the presence of media with a high water content and for a wide range of power densities, even up to and exceeding that required for space-based solar. As the example results in FIGS. 2 and 3 show, the absorption is even more reduced for lower amplitude signal. This implies that it would be significantly easier both experimentally verify and to utilize the result for low power density applications. In addition to wireless energy transfer, it is also possible to use a chaotic signal as a carrier wave for secure communications in dense media.

Example results show the peak population of a 2-level quantum system when perturbed by a chaotic signal. It is shown using numerical solutions of Equation (13) that the peak population is reduced with a chaotic signal in FIGS. 2 and 3. In addition, it is shown that the effect of a chaotic signal in reducing peak population of the 2-level system is higher for weaker signals. This result has applications in wireless power transfer applications, both in potentially increasing overall system efficiency by decreasing unintended absorption by the environment, e.g., to a non-harmful amount, and in reducing the effect of wireless power transmission on organic tissue.

The example results based on two-level system presented can also be applied to quantum systems interacting with electromagnetic waves that are not described by merely two level Hamiltonians, as long as additional energy levels are much further from resonance and the rotating wave approximation holds, which requires weak coupling, where the Rabi frequency is much slower than the resonance frequency, which is the case in the example results shown.

Reducing Microwave Absorption with Fast Frequency Modulation

Absorption of frequency modulated microwaves by matter can be much less, for example, because fast frequency modulation of microwaves results in decreased resonance of quantum systems. This suggests that most dielectric and poorly conducting matter is largely transparent to frequency modulated microwaves, including organic materials and water. Despite that, it is known that nonlinear systems captured into resonance can continue to resonate even as the forcing frequency is modulated, suggesting frequency modulated microwaves can resonate with nonlinear antennas. This implies that frequency modulated microwaves can pass undiminished through matter, and then be absorbed by a nonlinear antenna, and thereby transport energy from an energy source to an energy sink, while minimizing energy absorption by other sources. We discuss potential applications for safe and secure wireless power transfer.

Description of Two Level Quantum System

We consider a system with two base states, |1⟩ and |2⟩, where the two base states are symmetric, such as in the case of an ammonia molecule with spin states Up or Down. The state vector of that system would then be defined by Equation (15).

$$|\psi\rangle = C_1|1\rangle + C_2|2\rangle \qquad (15)$$

The Hamiltonian can be expressed as Equation (16), when there is an external time-dependent field. $\mu$ represents the dipole moment, and E(t) represents the time-varying field.

$$H_0 = \begin{pmatrix} E_0 + \mu E(t) & -A \\ -A & E_0 - \mu E(t) \end{pmatrix} \quad (16)$$

The Hamiltonian in Equation (16) can be transformed into Equation (17).

$$H = \begin{pmatrix} E_0 + A & \mu E(t) \\ \mu E(t) & E_0 - A \end{pmatrix} \quad (17)$$

The transformation matrix is as shown in Equation (18).

$$S = \frac{1}{\sqrt{2}} \begin{pmatrix} 1 & -1 \\ 1 & 1 \end{pmatrix} \quad (18)$$

The Hamiltonian H shown in Equation (17) is useful as it represents the diagonalized Hamiltonian if there is no external field, and can be considered almost diagonal for weak fields. The basis states based on this Hamiltonian is shown in Equation (19).

$$|\psi\rangle = C_1 |1\rangle + C_2 |2\rangle \quad (19)$$

This yields the system of differential equations shown in Equation (20).

$$i\hbar \frac{dC_1}{dt} = (E_0 + A)C_1 + \mu E(t)C_2,$$
$$i\hbar \frac{dC_2}{dt} = (E_0 - A)C_2 + \mu E(t)C_1 \quad (20)$$

In the case of a electric field that is weak, such that $\mu E \ll A$, $C_1$ and $C_2$ can be expressed as per Equation (21).

$$C_1 = \gamma_1 e^{-i(E_0+A)t/\hbar}$$
$$C_2 = \gamma_2 e^{-i(E_0-A)t/\hbar} \quad (21)$$

The system described in Equation (20) can then be formulated as Equation (22).

$$i\hbar \frac{d\gamma_1}{dt} = \mu E(t) e^{i\omega_0 t} \gamma_2,$$
$$i\hbar \frac{d\gamma_2}{dt} = \mu E(t) e^{-i\omega_0 t} \gamma_1 \quad (22)$$

where $\hbar \omega_0 = 2A$.

Such a system can be pertubed by an electric field defined by Equation (23). This can be a good approximation for a planar electromagnetic wave with varying frequency, as long as wavelength is significantly longer than the system concerned, such that the gradient of the field is not significant.

$$E = 2E_0 \cos((\omega_0 + \Delta(t))t) \quad (23)$$

In that case, Equation (22) can be expressed as Equation (24).

$$i\hbar \frac{d\gamma_1}{dt} = \mu E_0 [e^{i(2\omega_0 + \Delta(t))t} + e^{-i\Delta(t)t}] \gamma_2,$$
$$i\hbar \frac{d\gamma_2}{dt} = \mu E_0 [e^{i\Delta(t)t} + e^{-i(2\omega_0 + \Delta(t))t}] \gamma_1 \quad (24)$$

For small values of $\mu E_0$, $$\frac{d\gamma_1}{dt} \text{ and } \frac{d\gamma_2}{dt}$$

are small. Hence, it is a reasonable approximation to take $e^{\pm i(2\omega_0 + \Delta(t))t} = 0$, as 0 is the average value of the oscillation. This approximation, known as the rotating wave approximation, yields Equation (25).

$$i\hbar \frac{d\gamma_1}{dt} = \mu E_0 e^{-i\Delta(t)t} \gamma_2,$$
$$i\hbar \frac{d\gamma_2}{dt} = \mu E_0 e^{i\Delta(t)t} \gamma_1 \quad (25)$$

While Equation (25) is not directly solvable, as an approximation, one can solve for when $\Delta(t)$ as a constant, and then re-introduce $\Delta(t)$ as a function of time. This procedure produces a modified form of Rabi's formula, as shown in Equation (26), when solved with the initial condition $\gamma_1 = 1$.

$$P_1 = |\gamma_1|^2 = 1 - \frac{\mu^2 E_0^2 / \hbar^2}{\mu^2 E_0^2 / \hbar^2 + (\Delta(t))^2/4} \sin^2\left(\sqrt{\frac{\mu^2 E_0^2}{\hbar^2} + \frac{(\Delta(t))^2}{4}} t\right)$$

$$P_2 = |\gamma_2|^2 = \frac{\mu^2 E_0^2 / \hbar^2}{\mu^2 E_0^2 / \hbar^2 + (\Delta(t))^2/4} \sin^2\left(\sqrt{\frac{\mu^2 E_0^2}{\hbar^2} + \frac{(\Delta(t))^2}{4}} t\right) \quad (26)$$

Comparison with Numerical Solution

To verify the approximations thus far in Equation (26), it can be compared with numerical solutions of Equation (21). The approximations prior to Equation (21) are same as those used in the derivation of Rabi cycles, and have been experimentally verified and hence do not require additional justification. The numerical solution uses the Matlab implementation of TR-BDF2 in the function ode23tb, chosen for the numerical stability which prevents total probability from increasing for long solutions. The forcing function is of the form shown in Equation (27).

$$E = 2E_0 \cos((\omega_0 + \Delta(t))t)$$
$$\Delta(t) = \Delta' t \quad (27)$$

Figure 4:
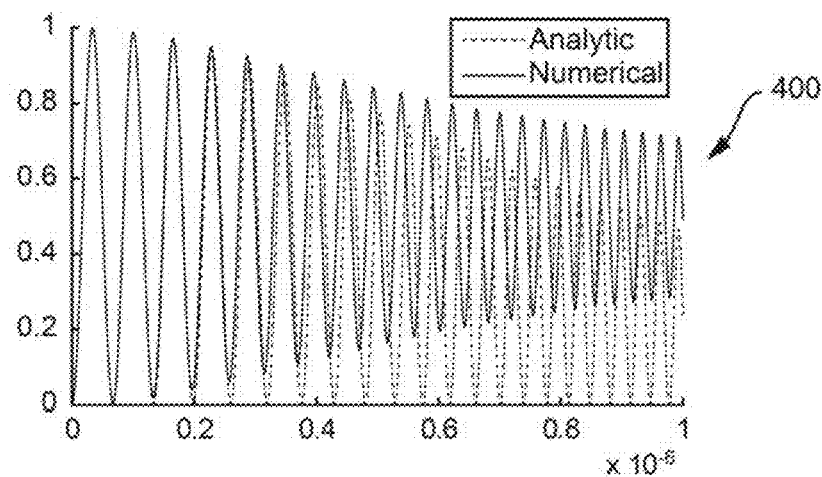
FIG. 4 is a graph of an example probability that the system is in state II as a function of t.
Figure 5:
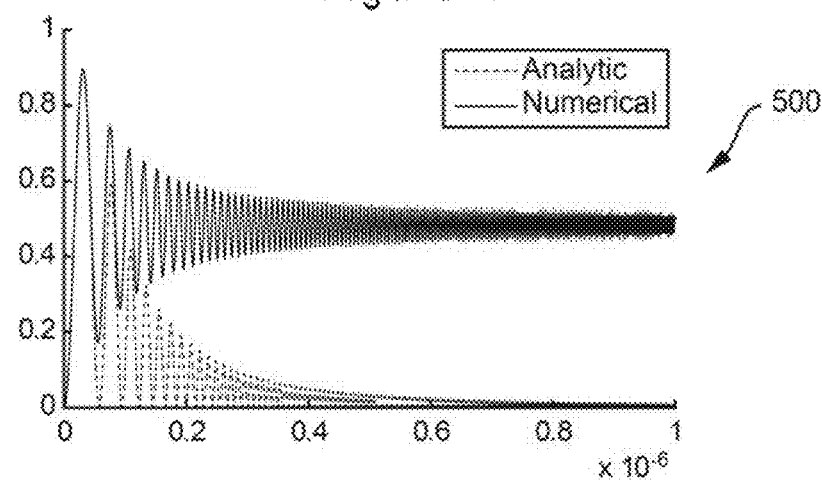
FIG. 5 is a graph of an example probability that the system is in state II as a function of t.
Figure 6:
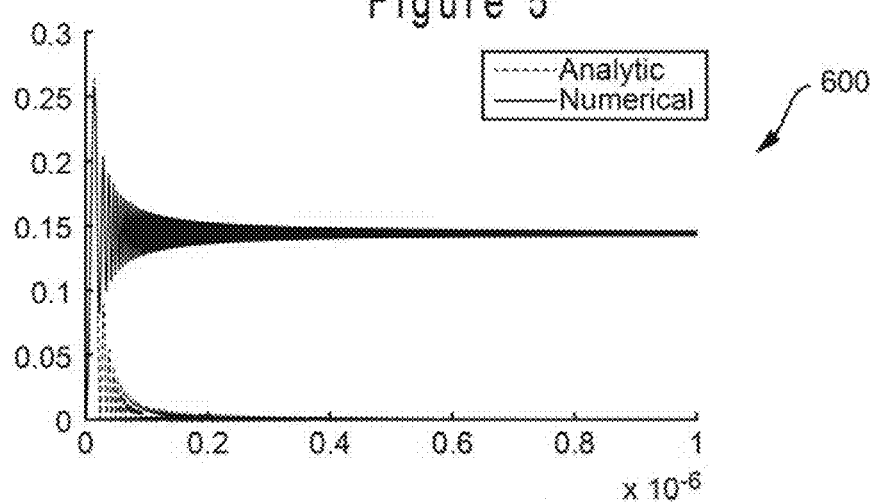
FIG. 6 is a graph of an example probability that the system is in state II as a function of t.

The numerical results are shown in FIGS. 4, 5, and 6 together with plots of Equation (26). The value used for the resonant frequency ($\omega_0$) is that of Ammonia inversion, chosen as the model system. Similarly, the value of dipole moment ($\mu$) used is that of ammonia.

FIG. 4 is a graph 400 of an example probability that the system is in state II as a function of t. Forcing is $2E_0 \cos((w_0 + \Delta' t)t)$, where $\omega_0 = 2\pi \times 23870$ Mhz, $w' = 1 \times 10^{14}$ s$^{-2}$, $\mu = 1.472$ D, and $E_0 = 1000$ NC$^{-1}$.

FIG. 5 is a graph 500 of an example probability that the system is in state II as a function of t. Forcing is $2E_0 \cos((w_0 + \Delta' t)t)$, where $\omega_0 = 2\pi \times 23870$ Mhz, $w' = 1 \times 10^{15}$ s$^{-2}$, $\mu = 1.472$ D, and $E_0 = 1000$ NC$^{-1}$.

FIG. 6 is a graph 600 of an example probability that the system is in state II as a function of t. Forcing is $2E_0 \cos((w_0 + \Delta' t)t)$, where $\omega_0 = 2\pi \times 23870$ Mhz, $w' = 1 \times 10^{15}$ s$^{-2}$, $p = 1.472$ D, and $E_0 = 1000$ NC$^{-1}$.

It can be seen the approximation holds up well for one cycle, even though the probability diverges quickly afterwards. This suggests that the approximate formula in Equation (26) would work for characterization of frequency response based on peak population of the initially unpopulated state.

Frequency Response to Chirp Signal as Forcing Function

To determine the frequency response, the peak population of the initially unpopulated state has to be determined. To do this one can find the zero of $$\frac{dP\,2}{dt},$$

and then use that time-value to determine the probability at that point from Equation (26). The peak probability would be called $P_{max}$.

This would involve solving Equation (28). As it is a transcendental equation, the equation is solved numerically. This is done using the fzero function in Matlab.

$$\frac{\Delta(t)\dot{\Delta}(t)}{2(\mu^2 E_0^2/\hbar^2 + (\Delta(t))^2/4)}\sin\left(\sqrt{\frac{\mu^2 E_0^2}{\hbar^2} + \frac{\Delta(t)^2}{4}}\,t\right) + 2\left(\frac{\sqrt{\frac{\mu^2 E_0^2}{\hbar^2} + \frac{\Delta(t)^2}{4}} + \frac{t\Delta(t)\dot{\Delta}(t)}{4\sqrt{\mu^2 E_0^2/\hbar^2 + (\Delta(t))^2/4}}}{}\right)\cos\left(\sqrt{\frac{\mu^2 E_0^2}{\hbar^2} + \frac{\Delta(t)^2}{4}}\,t\right) = 0$$

Figure 7:
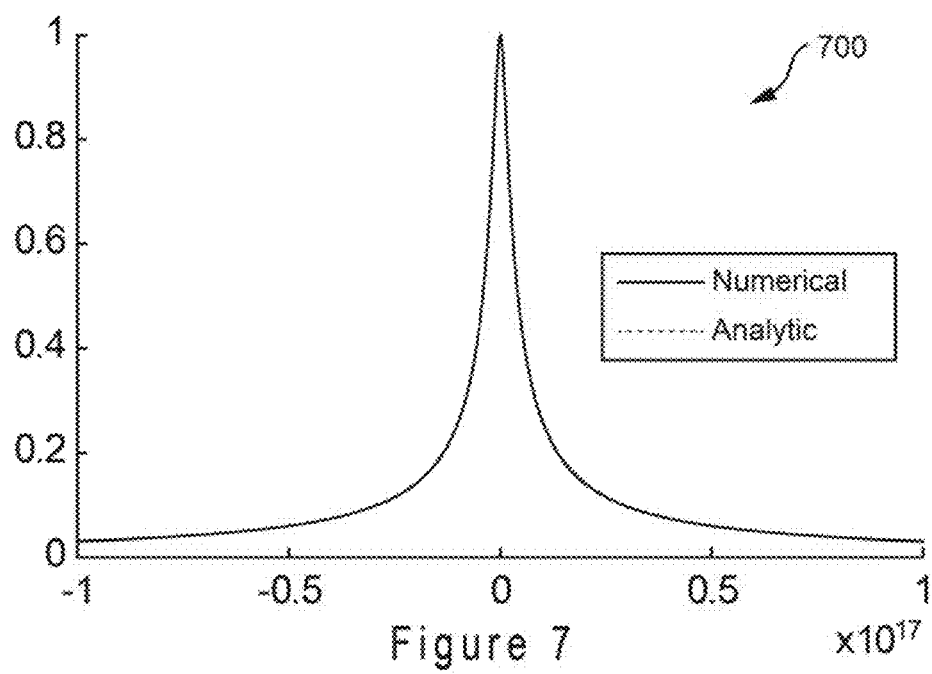
FIG. 7 is a graph of an example peak probability that the system is in state $|2\rangle$ as a function of w'.

For a linear chirp signal of the form shown in Equation (27), FIG. 7 can be produced.

FIG. 7 is a graph 700 of an example peak probability that the system is in state |2⟩ as a function of w'. Forcing is $2E_0 \cos((w_0 + \Delta't)t)$, where $\omega_0 = 2\pi \times 23870$ Mhz, and $E = 1000 NC^{-1}$. The two lines are overlapping.

It can be seen that the solution based on solution of Equation (28) is very similar to the solution obtained by numerically solving the differential Equation (22) and obtaining the peak value from that. This is because while Equation (26) is not the exact solution of Equation (25), the Hamiltonian changes slowly over the course of the first oscillation. Thus, Equation (26) can be considered an adiabatic approximation, up to the first transition. This does not work beyond the first oscillation, however, as errors are cumulative.

That allows us to construct the same frequency response graph with a different value of $E_0$. The numerical solution is more expensive to compute with small values of $E_0$ as the Rabi flopping described by Equation (26) is slower even though the forcing frequency does not change, however the analytical method does not suffer from this limitation. This allows us to obtain FIG. 5.

Figure 8:
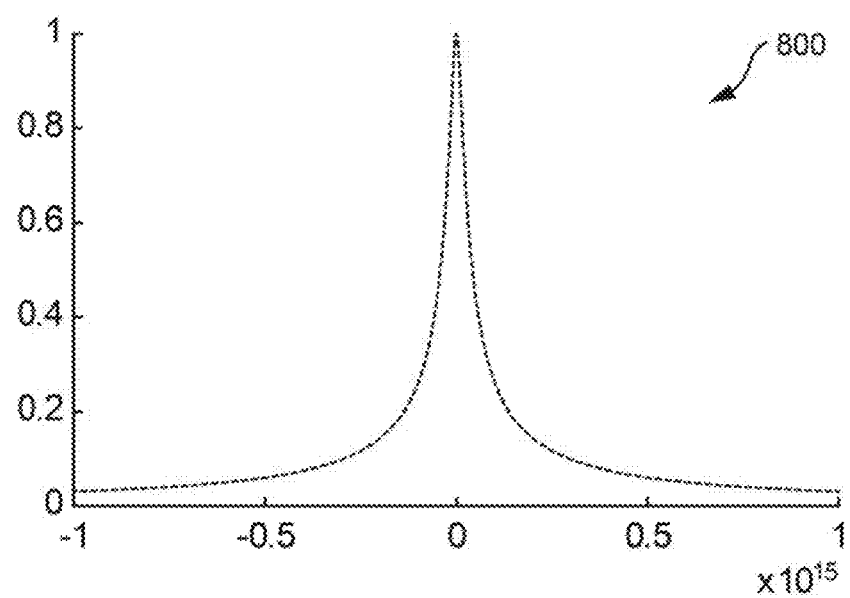
FIG. 8 is a graph of an example peak probability that the system is in state $|2\rangle$ as a function of w'.

FIG. 8 is a graph 800 of an example peak probability that the system is in state |2⟩ as a function of w'. Forcing is $2E_0 \cos((w_0 + \Delta't)t)$, where $\omega_0 = 2\pi \times 23870$ Mhz, and $E_0 = 100 NC^{-1}$.

Discussion of Example Results

Example results are shown in FIG. 7 and FIG. 8. FIG. 7 represents a solution with electric field strength of $E_0 = 1000 NC^{-1}$. That is a very high value, corresponding to dielectric heating power per volume of $7.23 \times 10^5 Wm^{-3}$ of room temperature water, for $\varepsilon''=10.62$ as the value of imaginary relative permittivity. This value also corresponds to a plane wave Poynting vector magnitude of 1327 $Wm^{-2}$. This is comparable to the expected power density for microwave power transmission from space-based solar power.

FIG. 8 represents a lower value, of $E_0 = 100 NC^{-1}$. This represents a plane wave Poynting vector magnitude of 13.27 $Wm^{-2}$, which is more typical of low power microwave power transmission for microelectronics.

It can be seen from the values obtained that the effect is not entirely simply due to the $\Delta'$ term changing the frequency to be far enough from resonance. Using the system parameters presented in FIG. 3, the first peak in the population of the upper level occurs at $1.45 \times 10^{-8}$ s. At that time, $\Delta t' = 1.45 \times 10^{-8}$ Hz. If this is taken as the static value of $\Delta$ in Equation (26), the resultant amplitude is 0.292, which is higher than the value in 3 of 0.258. Mathematically, this is due to the time dependence of $\Delta't$ resulting in the peak not being in the same time coordinate as that of the original Rabi oscillation, necessitating a numerical solution of the transcendental equation (28).

Relation to Penetration Depth

One can determine the change in penetration depth with a few assumptions. The first assumption is that intensity of radiation in the material being investigated decays linearly; that is, attenuation is linear. The second assumption is that when a molecule is raised to a higher energy state due to rabi oscillations, it immediately relaxes to the ground state. This can be achieved by strong phonon couplings in a solid where the temperature $k_b T$ is much lower than $\hbar \omega$, for example. The final assumption is that there is no anisotropy in the material. In such a scenario, the absorption would be described by Equation (29).

$$\frac{dI}{dz} = \frac{1}{\lambda} \qquad (29)$$

The above equation can be intepreted as a probability of absorption of photon, such that the probability of a photon being absorbed by a film of infinitesimal thickness $\delta z$ is $$\frac{\delta z}{\lambda}.$$

It follows from the above assumptions that if the peak population of the upper level is decreased from 1 to p, such that $0 < p < 1$, then the probability of a photon being absorbed by a film of infinitesimal thickness $\delta z$ is $$\frac{p\delta z}{\lambda}.$$

Thus, the new penetration depth is give by Equation (30), and has an inverse linear relationship to the peak probability of the Rabi oscillation at a certain chirp rate.

$$\lambda' = \frac{\lambda}{p} \qquad (30)$$

Applications

As previously mentioned, one major application would be wireless power transfer, for both high power density transfer for long range transmission in the case of space-based solar, and low power density transmission for microelectronics. As the example results in FIG. 7 and FIG. 8 show, the rate of frequency modulation required for significant reduction of peak population is much lower for a lower power signal. This implies that it would be significantly easier both experimentally verify and to utilize the result for low power density applications.

In addition to those applications, it is also possible to use a rapidly modulated signal as a carrier wave for communications. This suggests that the same signal can be used for both power transfer and communications. Another advantage is that it possible to use this fast frequency modulation as a form of multiplexing and to provide resistance to jamming, in a way similar to frequency-hopping spread spectrum. Various means may be used to modulate the transmitted signal, including but not limited to, software defined Radios (SDRs), tuneable Gunn diode oscillators, and other frequency modulating devices commonly used in the telecommunications industry.

This has applications in the transmission of microwaves through dense media. It can enable wireless charging of and communications with embedded medical sensors or communications at greater depth with underwater craft.

Example Future and Related Work

Related work that has been done involved studying the effect of other types of nonlinear forcings, such as chaotic forcings, on 2-level quantum systems, and on classical oscillators. These results combined serve to enable wireless transmission of energy with EM waves while minimizing absorption by unintended sources, and minimizing unintended damage to organic material that crosses the field. Chaotic waves can also be used as carrier waves of communications, hence the applications are similar to those of microwaves with fast frequency modulation as presented in herein.

Future work can focus on the effect of nonlinear waves in the continuous spectra of a quantum system, or the construction of a proof-of-concept device to display the effects shown.

Example results show the peak population of a 2-level quantum system when perturbed by a chirp signal. It is shown using numerical solutions of Equation (22) that the peak population is reduced with a large chirp in FIG. 4, and in the same figure this result is reproduced using a computationally cheaper procedure involving the solution of the transcendental equation shown in Equation (28). In addition, it is shown that the effect of a chirp signal in reducing peak population of the 2-level system is higher for weaker signals in FIG. 8. This result has applications in wireless power transfer applications, both in potentially increasing overall system efficiency by decreasing unintended absorption by the environment and in reducing the effect of wireless power transmission on organic tissue. However, it needs to be emphasized that this study does not directly address potential safety concerns of passing microwaves through live tissue and that further study is required.

The results based on two-level system presented can also be applied to quantum systems interacting with electromagnetic waves that are not described by merely two level Hamiltonians, as long as additional energy levels are much further from resonance and the rotating wave approximation holds, which requires weak coupling, where the Rabi frequency is much slower than the resonance frequency.

Wireless Power Transmission Using Resonant Oscillators

In some examples, wireless power transfer is becoming more prominent for powering devices that require little power to operate. We can construct a system of a sender, receiver, and observer that draws all the electromagnetic radiation to the observer. The most power is absorbed at the observer when the observer is in resonance with the sender and receiver. We run a simulation of this system and analyze the power to determine maximum spring-like and frictional coefficients. The power at the sender, receiver, and observers for different frictional and spring-like coefficients is analyzed computationally. We provide an example of such a system and confirm that the most power is output at the observer when in resonance with the sender. Finally, we simulate a system with a sender, two receivers, and an observer and confirm and expand upon those results.

Wireless energy transmission has so far been examined through relay networks, resonant-inductive coupling, and rectennas (reconfigurable rectifying antennae). These structures can also be magnetoinductive waveguides which describe the behavior of waves in a relay coil system and transfer about 58% of the power. Near field communications operate at distances of 10 cm or less and have a frequency around 13.56 MHz. They use magnetic induction between two loop antennae to transfer power. German student, Dennis Siegel, used coils and high frequency diodes to collect enough ambient RF to charge one AA battery a day. We propose a simpler system, one where the sender is a self-sustaining oscillator and the power is transferred when the receiver is in resonance with the sender. Harvesting ambient RF energy has been researched by many groups. By creating antennas that harvest whatever electromagnetic radiation happens to be nearby (from cell towers, Wifi routers, etc) they are able to collect enough milliwatts of power to charge and use low-power devices. They target the ultra-high frequency bands and some microwave bands. Geometric optics suggest electromagnetic waves travel in a straight line in a homogeneous medium. However, we can create a situation where the light waves will bend. Dipole antennas emit evenly perpendicular to the dipole unless there is another dipole nearby that is in resonance. When the dipoles are colinear, the energy moves from one dipole to the other along its Poynting vector. The Poynting vector will be in a straight line if the dipoles are not in resonance but when the dipoles are in resonance, the Poynting vector will bend and "connect" the two dipoles allowing energy to flow between them. Our work shows that if you have two resonant dipoles where one is behind a block, then most of the energy will flow into the shadowed region behind the block because of the bending Poynting vector, which is a result of diffraction in the far-field.

Theory

A system of three oscillators, representing a source, a receiver, and an observer. The source and receiver are coupled to one another and the observer is coupled to the source. The differential equation that describes the behavior of the source is $$m_1 \ddot{x}_1 + \eta_1 \left[ \frac{m \dot{x}_1^2}{2} + \frac{c_1 x_1^2}{2} - E \right] \dot{x}_1 + c_1 x_1 = k(x_2 - x_1) \tag{31}$$

where $\eta_1$ is the frictional constant, k is a spring-like constant, and E is some energy. The differential equation for the receiver is $$m_2 \ddot{x}_2 + \eta_2 \dot{x}_2 + c_2 x_2 = k(x_1 - x_2) \tag{32}$$

and the differential equation for the observer is $$m_3 \ddot{x}_3 + \eta_3 \dot{x}_3 = k(x_1 - x_3) \tag{33}$$

General Simulations

Begin by simulating a damped harmonic oscillator. Note that these do not use Equation 31-33 but instead simulate the more general case for damped and driven harmonic oscillator motion. Thus we label them with the subscript d. The differential equation for a damped harmonic oscillator is $$m_d \ddot{x}_d + \eta_d \dot{x}_d + k_d x_d = 0 \tag{34}$$

where $\eta_d$ is the damping constant and $k_d$ is the spring-like constant. The results of my simulation are shown in FIG. 1 and plot two different initial conditions.

Figure 9:
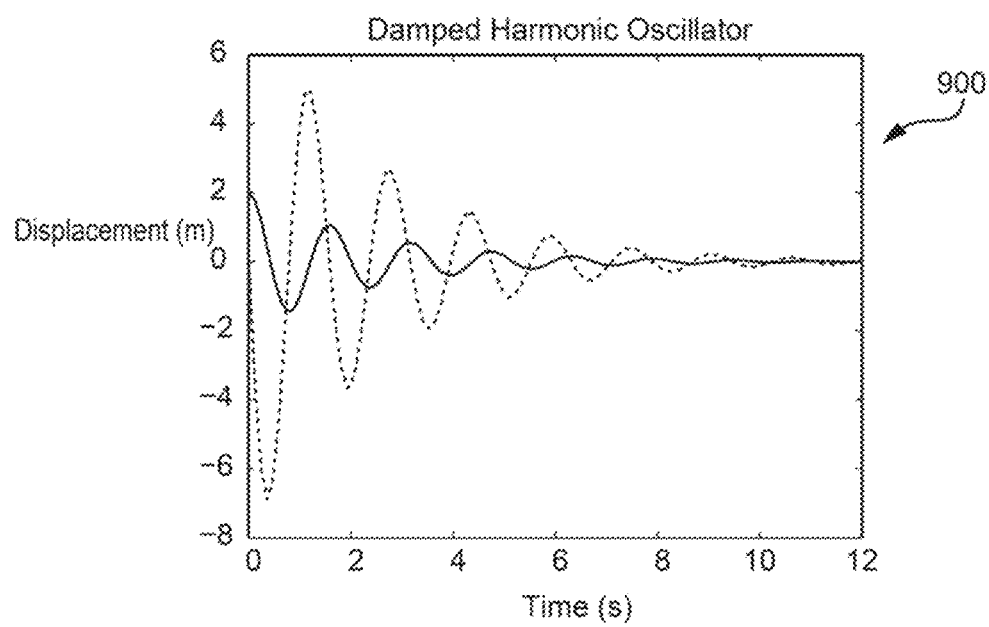
FIG. 9 is an example plot of Equation 34 with initial conditions of $x_{d_1}(0)=2$ and $x_{d_2}(0)=0$.

FIG. 9 is an example plot 900 of Equation 34 with initial conditions of $x_{d_1}(1)=2$ and $x_{d_2}(0)=0$. The values we used in the simulation were $m_d=5$, $k_d=80$, and $\eta_d=4$. The example time span was 14 seconds using 120 intervals.

Next, we simulated a driven, damped oscillator denoted by f. The differential equation for a driven damped oscillator is $$m_f \ddot{x}_f + \eta_f \dot{x}_f + k_f x_f = A_f \sin(\omega_f t) \tag{35}$$

The results of my simulation are shown in FIG. 3 and once again plot two different initial conditions.

Figure 10:
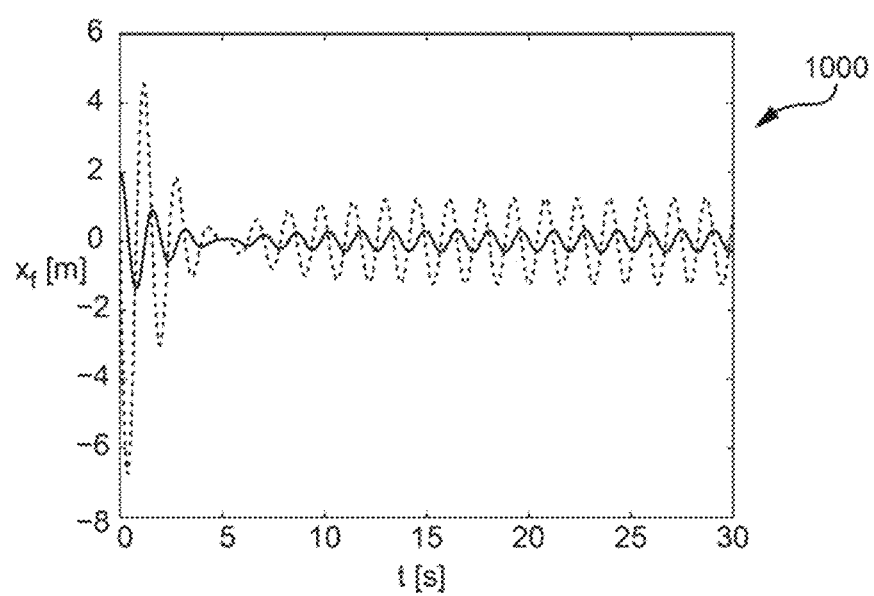
FIG. 10 is an example plot of Equation 35 with initial conditions $x_{f_1}(0)=2$ and $x_{f_2}(0)=0$.

FIG. 10 is an example plot 1000 of Equation 35 with initial conditions $x_{f_1}(0)=2$ and $x_{f_2}(0)=0$. The values we used in this simulation were $m_f=5$, $k_f=80$, $\eta_f=4$, $A_f=1$, and $$\omega_f = \sqrt{\frac{k_f}{m_f}}.$$

The time span here was over 30 seconds with 100 intervals.

Following this, we look at the power needed to drive the oscillator in FIG. 10. The power needed is calculated by $$P = \frac{1}{T_f} \int_0^{T_f} A_f \sin(\omega_f t) \dot{x}_f \, dt \tag{36}$$

Figure 11:
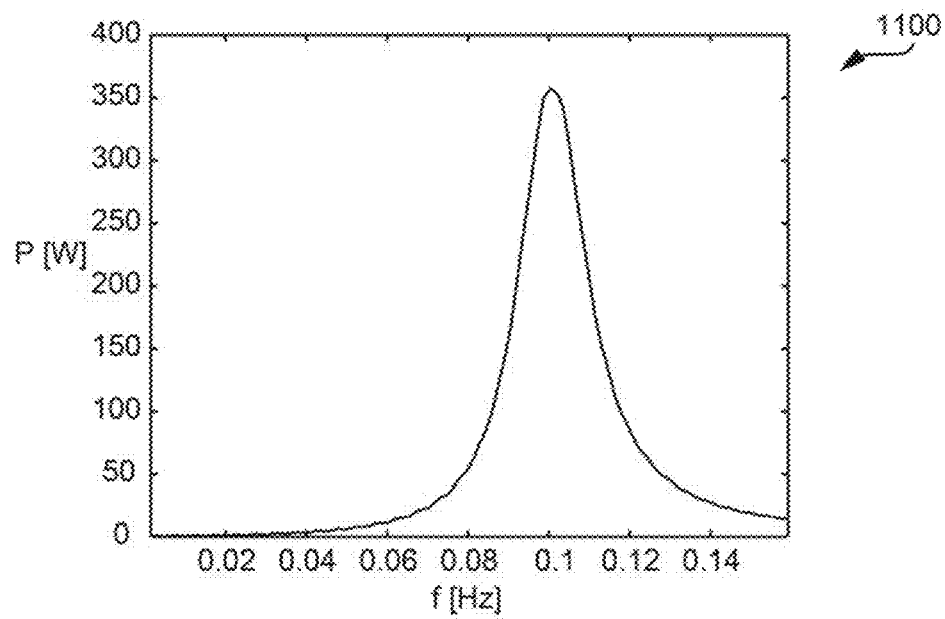
FIG. 11 is an example of a plot of Equation 36 using the initial conditions $x_{p_1}(0)=2$ and $x_{p_2}(0)=0$.

Results are shown in FIG. 11. Note that f was calculated by the equation $$f = \frac{\omega}{2\pi} \tag{37}$$

FIG. 11 is an example of a plot 1100 of Equation 36 using the initial conditions $x_{p_1}(0)=2$ and $x_{p_2}(0)=0$. Equation 36 used Equation 35 but with values of $m_p=1$, $k_p=0.4$, $\eta_p=0.1$, and $A_p=3$. The time span was up to 100 seconds with 1000 intervals and $T_p=100$. We initialized $\omega_p$ to be zero and took 100 iterations 0.01 spaces apart.

From this plot, it is clear that the most power is needed when the driving frequency is the same as the resonance frequency.

We can also calculate the power dissipated through the oscillator by $$P_d = \frac{1}{T_d} \int_0^{T_d} \eta_d \dot{x}_d^2 \, dt \tag{38}$$

Figure 12:
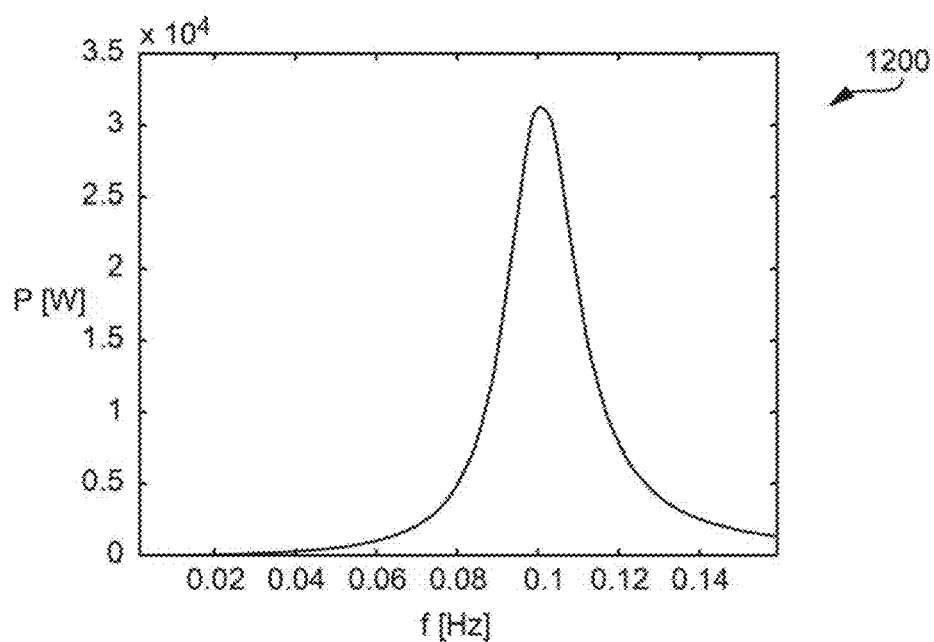
FIG. 12 is an example plot of Equation 38 using Equation 35 to solve to get values for $\dot{x}_d$.

The results are plotted in FIG. 12. Again, the most power is dissipated when the driving frequency is equal to the resonance frequency.

FIG. 12 is an example plot 1200 of Equation 38 using Equation 35 to solve to get values for $\dot{x}_d$. The initial conditions are the same as in FIG. 11, as are the values used. The time span and intervals are the same and again, $\omega_p$ was initialized to be zero and iterated 100 times with values 0.01 spaces apart.

Simulating Our System

If we consider the sender by itself, Equation 31 becomes $$m_1 \ddot{x}_1 + \eta_1 \left[ \frac{m_1 \dot{x}_1^2}{2} + \frac{c_1 x_1^2}{2} - E \right] \dot{x}_1 + c_1 x_1 = 0 \tag{39}$$

or expanding it, $$m_1 \ddot{x}_1 + \frac{\eta_1 m_1}{2} \dot{x}_1^3 + \frac{\eta_1 c_1}{2} x_1^2 \dot{x}_1 - \eta_1 E \dot{x}_1 + c_1 x_1 = 0 \tag{40}$$

Given $x = A \sin(\omega t)$ is a solution, $$\dot{x} = \omega A \cos(\omega t) \tag{41}$$

and $$\ddot{x} = -\omega^2 A \sin(\omega t) \tag{42}$$

Plugging Equation 41 and Equation 42 as well as $x = A \sin(\omega t)$ into Equation 40, we get $$-m_1 \omega_1^2 A_1 \sin(\omega_1 t) + \frac{\eta_1 m_1}{2} \omega_1^3 A_1^3 \cos^3(\omega_1 t) + \tag{43}$$
$$\frac{\eta_1 c_1}{2} (A_1^2 \sin^2(\omega_1 t))(\omega_1 A_1 \cos(\omega_1 t)) -$$
$$\eta_1 E \omega_1 A_1 \cos(\omega_1 t) + c_1 A_1 \sin(\omega_1 t) = 0$$

Using the trig identity $$1 - \sin^2(\omega t) = \cos^2(\omega t) \tag{44}$$

we get $$-m_1 \omega_1^2 A_1 \sin(\omega_1 t) + \eta_1 \frac{m_1}{2} \omega_1^3 A_1^3 \cos^3(\omega_1 t) + \eta_1 \frac{c_1}{2} \omega_1 A_1 \cos(\omega_1 t) - \tag{45}$$
$$\eta_1 \frac{c_1}{2} \omega_1 A_1^3 \cos^3(\omega_1 t) - \eta_1 E \omega_1 A_1 \cos(\omega_1 t) + c_1 A_1 \sin(\omega_1 t) = 0$$

Combining like terms, we see that $$\eta_1 \frac{c_1}{2} \omega_1 A_1^3 \cos(\omega_1 t) - \eta_1 E \omega_1 A_1 \cos(\omega_1 t) = 0 \tag{46}$$

$$\eta_1 \frac{c_1}{2} \omega_1 A_1^3 - \eta_1 E \omega_1 A_1 = 0 \tag{47}$$

$$A_1 \left( \frac{c_1}{2} A_1^2 - E \right) = 0 \tag{48}$$

$$A_1 = 0 \text{ or} \tag{49}$$
$$A_1 = \sqrt{\frac{2E}{c_1}}$$

Figure 13:
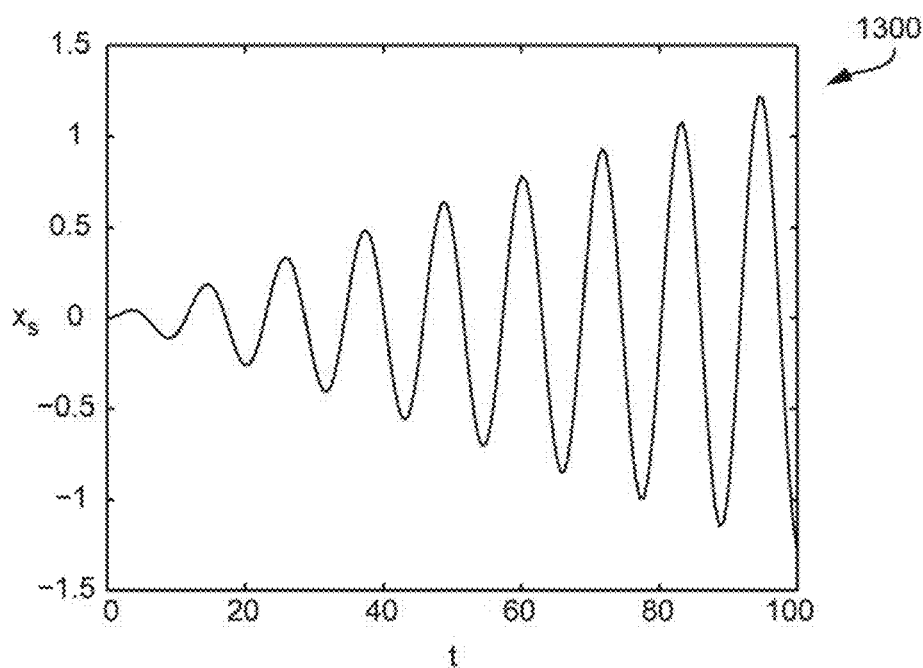
FIG. 13 is an example plot of solutions to Equation 39 with the result of Equation 49 where $x_{1_1}(0)=0$ and $x_{1_2}(0)=0$ and are the initial conditions.

Matlab has a function called "vdpode" which solves the Van der Pol equation. Modifying that program so that it solves Equation 39 will give us a numerical solution. For a driven system, we get results that look like this:

FIG. 13 is an example plot 1300 of solutions to Equation 39 with the result of Equation 49 where $x_{1_1}(0)=0$ and $x_{1_2}(0)=0$ are the initial conditions. The values used in the simulation were $$E = 0.001, c_1 = 3, m_1 = 10, \eta_1 = 0.001, \omega_1 = \sqrt{\frac{c_1}{m_1}},$$

and $A_1$ is given in Equation 49.

Figure 14:
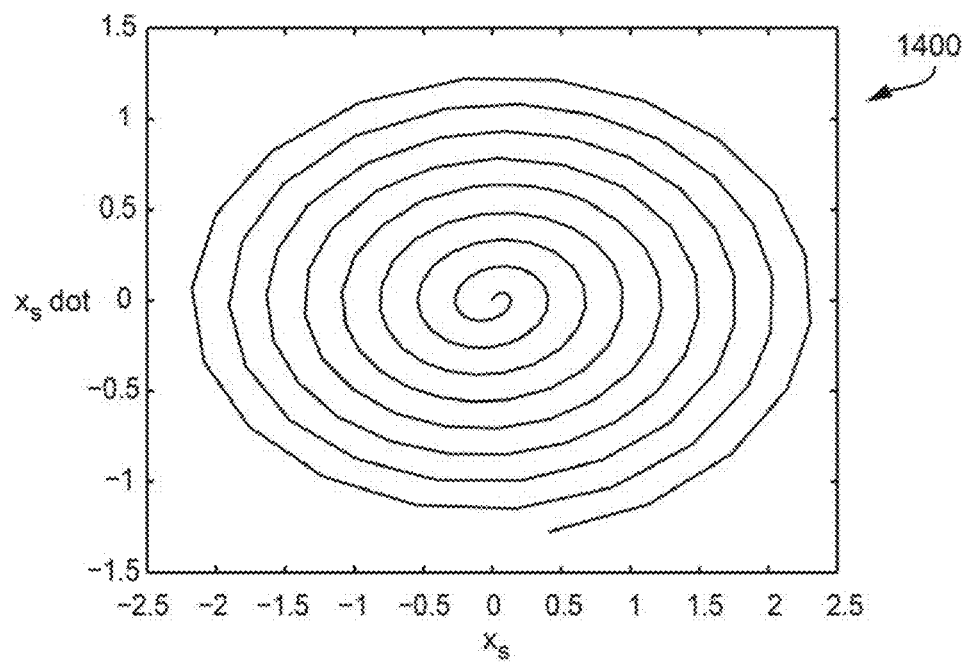
FIG. 14 is a plot of an example phase space of Equation 39 plotted with the same initial conditions and constants as FIG. 13.

Using the same values as in FIG. 13, the phase space is plotted in FIG. 14.

FIG. 14 is a plot 1400 of an example phase space of Equation 39 plotted with the same initial conditions and constants as FIG. 13.

This graph shows that our sender is a self-sustaining oscillator.

Now we want to simulate the power in the receiver when it is coupled to the sender. This time, the constant $c_2$ is changed and the relationship between the power and $c_2$ is examined. The equation for the power in the receiver is given by $$P_r = \frac{1}{T_r} \int_0^{T_r} \eta_2 \dot{x}_r^2 \, dt \tag{50}$$

Figure 15:
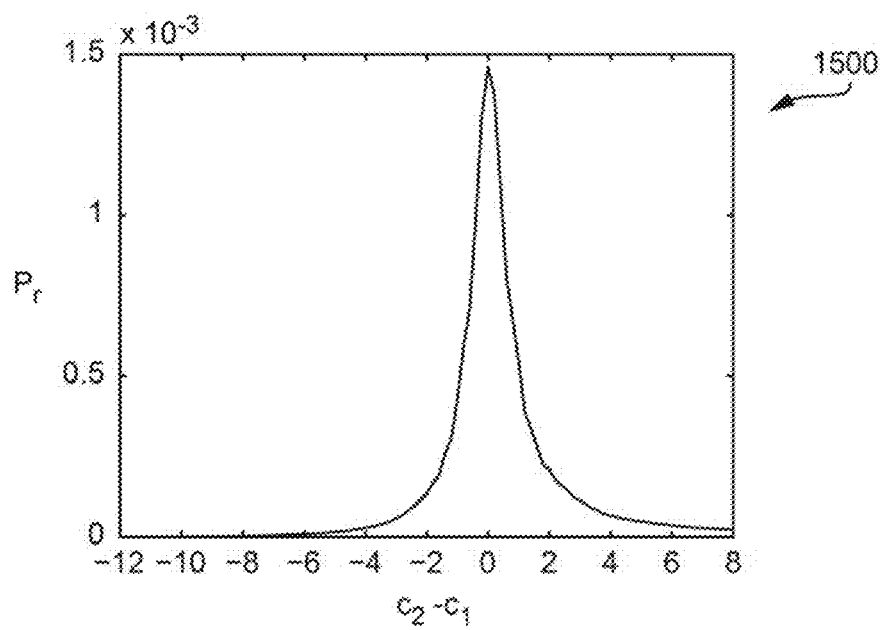
FIG. 15 is a plot of an example power in the receiver as a result of a changing $c_2$ is plotted.

The solution to Equation 50 is graphed in FIG. 15.

FIG. 15 is a plot 1500 of an example power in the receiver as a result of a changing $c_2$ is plotted. $x_1(0)$ is initialized to 0.1 and the other initial conditions were set to zero. The constant values were $c_1=12$, $\eta_1=0.001$, $E=0.001$, $m_1=m_2=1$, and $k=0.4$. we set $\eta_2$ and $c_2$ to be varying separated by 0.0001 and 0.2 spaces, respectively, for 100 iterations. The time span was over 100 seconds of 1000 intervals and $T_r=100$.

Examining the difference between $c_1$ and $c_2$ leads to the conclusion that when $c_1=c_2$, the power in the receiver is at a maximum. This is what was expected.

If we now examine the power in the receiver as we vary $\eta_2$ using Equation 50 we find that there is an optimal friction damping constant that gives the most power in the receiver. This is shown in FIG. 16.

Figure 16:
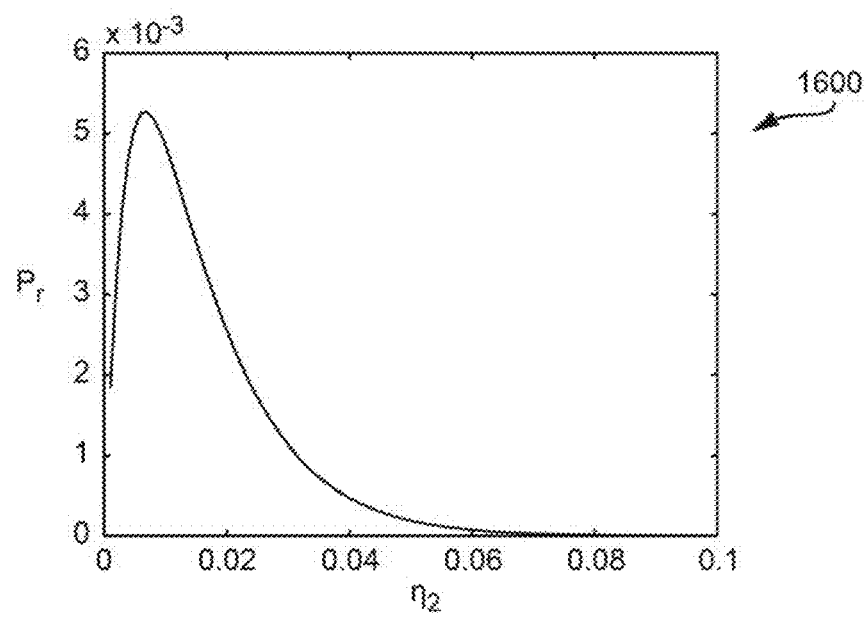
FIG. 16 is a plot of an example power given in Equation 50 is plotted here over a changing frictional constant $\eta_2$.

FIG. 16 is a plot 1600 of an example power given in Equation 50 is plotted here over a changing frictional constant $\eta_2$. The values of the constants used in the simulation were $c_1=c_2=7$, $E=0.001$, $m_1=m_2=1$, and $k=1$. $\eta_1$ is kept fixed at a value of 1, while $\eta_n$ varies over 100 iterations spaced apart by a separation of 0.001. The initial conditions are the same as in FIG. 15 as well as the time span and $T_r$.

From this graph we can see there is an optimal $\eta_2$ value that gives the most power in the receiver. If $\eta_2$ is too big, the friction constant prevents much power. If $\eta_2$ is too small, we get less power. The next step is to find the analytic solution when $\eta_2$ is small.

We use Equation 51 and 52 as solutions to Equation 51 and 52

$$x_2 = A \sin(\omega t - t_0) \tag{51}$$

and $$x_1 = \frac{E}{m} \sin(\omega t) \tag{52}$$

Using the identity $$A \sin(\omega t - t_0) = B \cos(\omega t) - C \sin(\omega t) \tag{53}$$

where $B=A \sin(t_0)$ and $C=A \cos(t_0)$, we get that $$\dot{x}_2 = -\omega B \sin(\omega t) - \omega C \cos(\omega t) \tag{54}$$

and $$\ddot{x}_2 = -\omega^2 B \cos(\omega t) + \omega^2 C \sin(\omega t) \tag{55}$$

Plugging these solutions back into Equation 52, assuming $m_1=m_2$, and solving for A:

$$m\omega^2 C \sin(\omega t) - m\omega^2 B \cos(\omega t) - \eta_2 \omega B \sin(\omega t) - \eta_2 \omega C \cos(\omega t) + \tag{56}$$
$$c_2 B \cos(\omega t) - c_2 C \sin(\omega t) = \frac{Ek}{m} \sin(\omega t) - Bk \cos(\omega t) + Ck \sin(\omega t)$$

Grouping like terms together gives $$-m\omega^2 B - \eta_2 \omega C + c_2 B = -Bk \tag{57}$$

and $$m\omega^2 C - \eta_2 \omega B - c_2 C = \frac{Ek}{m} + Ck \tag{58}$$

Solving for B in Equation 57, we get $$\eta_2 \omega B = m\omega^2 C - c_2 C - \frac{Ek}{m} - Ck \tag{59}$$

$$B = \frac{m\omega^2 C - c_2 C - \frac{Ek}{m} - Ck}{\eta_2 \omega} \tag{60}$$

Plugging Eqn. 59 into Eqn. 56 gives $$-m\omega^2 \left( \frac{m\omega^2 C - c_2 C - \frac{Ek}{m} - Ck}{\eta_2 \omega} \right) - \eta_2 \omega C + \tag{61}$$
$$c_2 \left( \frac{m\omega^2 C - c_2 C - \frac{Ek}{m} - Ck}{\eta_2 \omega} \right) = -k \left( \frac{m\omega^2 C - c_2 C - \frac{Ek}{m} - Ck}{\eta_2 \omega} \right)$$

Now we multiply by $\eta_2\omega$ on both sides and distribute to get $$-m^2\omega^4 C + c_2 m\omega^2 C + Ek\omega^2 + m\omega^2 kC - \eta_2^2\omega^2 C + m\omega^2 c_2 C - \qquad (62)$$
$$c_2^2 C - \frac{Ekc_2}{m} - c_2 kC = -m\omega^2 kC + c_2 kC + \frac{Ek^2}{m} + k^2 C$$

Bringing all the terms without C to the right side $$-m^2\omega^4 C + c_2 m\omega^2 C + 2m\omega^2 kC - \eta_2^2\omega^2 C + \qquad (63)$$
$$m\omega^2 c_2 C - c_2^2 C - 2c_2 kC - k^2 C = \frac{Ek^2}{m} - Ek\omega^2 + \frac{Ekc_2}{m}$$

$$C(-m^2\omega^4 + c_2 m\omega^2 + 2m\omega^2 k - \eta_2^2\omega^2 + m\omega^2 c_2 - c_2^2 - 2c_2 k - k^2) = \qquad (64)$$
$$\frac{Ek}{m}(k + c_2 - m\omega^2)$$

$$C = \frac{Ek(k + c_2 - m\omega^2)}{m\begin{pmatrix} -m^2\omega^4 + c_2 m\omega^2 + 2m\omega^2 k - \eta_2^2\omega^2 + \\ m\omega^2 c_2 - c_2^2 - 2c_2 k - k^2 \end{pmatrix}} \qquad (65)$$

Now we can solve for B in Equation 60

$$B = \frac{m\omega^2}{\eta_2\omega}\left[\frac{Ek(k + c_2 - m\omega^2)}{m\begin{pmatrix} -m^2\omega^4 + c_2 m\omega^2 + 2m\omega^2 k - \eta_2^2\omega^2 + \\ m\omega^2 c_2 - c_2^2 - 2c_2 k - k^2 \end{pmatrix}}\right] - \qquad (66)$$
$$\frac{c_2}{\eta_2\omega}\left[\frac{Ek(k + c_2 - m\omega^2)}{m\begin{pmatrix} -m^2\omega^4 + c_2 m\omega^2 + 2m\omega^2 k - \eta_2^2\omega^2 + \\ m\omega^2 c_2 - c_2^2 - 2c_2 k - k^2 \end{pmatrix}}\right] -$$
$$\frac{Ek}{m\eta_2\omega} - \frac{k}{\eta_2\omega}\left[\frac{Ek(k + c_2 - m\omega^2)}{m\begin{pmatrix} -m^2\omega^4 + c_2 m\omega^2 + 2m\omega^2 k - \eta_2^2\omega^2 + \\ m\omega^2 c_2 - c_2^2 - 2c_2 k - k^2 \end{pmatrix}}\right]$$

Taking the numerators once the common denominator had been found we get $$m\omega^2 Ek(k + c_2 - m\omega^2) - c_2 Ek(k + c_2 - m\omega^2) - Ek^2(k + c_2 - m\omega^2) - \qquad (67)$$
$$Ek(-m^2\omega^4 + c_2 m\omega^2 + 2m\omega^2 k - \eta_2^2\omega^2 + m\omega^2 c_2 - c_2^2 - 2c_2 k - k^2)$$

$$= m\omega^2 Ek^2 + m\omega^2 Ekc_2 - m^2\omega^4 Ek - c_2 Ek^2 - c_2^2 Ek + c_2 Ekm\omega^2 - Ek^3 - \qquad (68)$$
$$c_2 Ek^2 + m\omega^2 Ek^2 + m^2\omega^4 Ek - c_2 m\omega^2 Ek - 2m\omega^2 Ek^2 +$$
$$Ek\eta_2^2\omega^2 - m\omega^2 c_2 Ek + c_2^2 Ek + 2c_2 Ek^2 + Ek^3 = Ek\eta_2^2\omega^2$$

Therefore, $$B = \frac{Ek\eta_2^2\omega^2}{m\eta_2\omega\begin{pmatrix} -m^2\omega^4 + c_2 m\omega^2 + 2m\omega^2 k - \eta_2^2\omega^2 + \\ m\omega^2 c_2 - c_2^2 - 2c_2 k - k^2 \end{pmatrix}} \qquad (69)$$

$$B = \frac{Ek\eta_2\omega}{m\begin{pmatrix} -m^2\omega^4 + c_2 m\omega^2 + 2m\omega^2 k - \eta_2^2\omega^2 + \\ m\omega^2 c_2 - c_2^2 - 2c_2 k - k^2 \end{pmatrix}} \qquad (70)$$

From our earlier definitions of $B = A\sin(t_0)$ and $C = A\cos(t_0)$, we get $$A = \sqrt{B^2 + C^2} \qquad (71)$$

and $$\tan(t_0) = B/C \qquad (72)$$

Plugging in Equation 65 and Equation 70, we see that $$A = \frac{Ek\sqrt{\eta_2^2 - \omega^2 + (k + c_2 - m\omega^2)^2}}{m\begin{pmatrix} -m^2\omega^4 + c_2 m\omega^2 + 2m\omega^2 k - \eta_2^2\omega^2 + \\ m\omega^2 c_2 - c_2^2 - 2c_2 k - k^2 \end{pmatrix}} \qquad (73)$$

and $$\tan(t_0) = \frac{Ek\eta_2\omega}{Ek(k + c_2 - n\omega^2)} = \frac{\eta_2\omega}{k + c_2 - m\omega^2} \qquad (74)$$

$$t_0 = \arctan\left(\frac{\eta_2\omega}{k + c_2 - m\omega^2}\right) \qquad (75)$$

Figure 17:
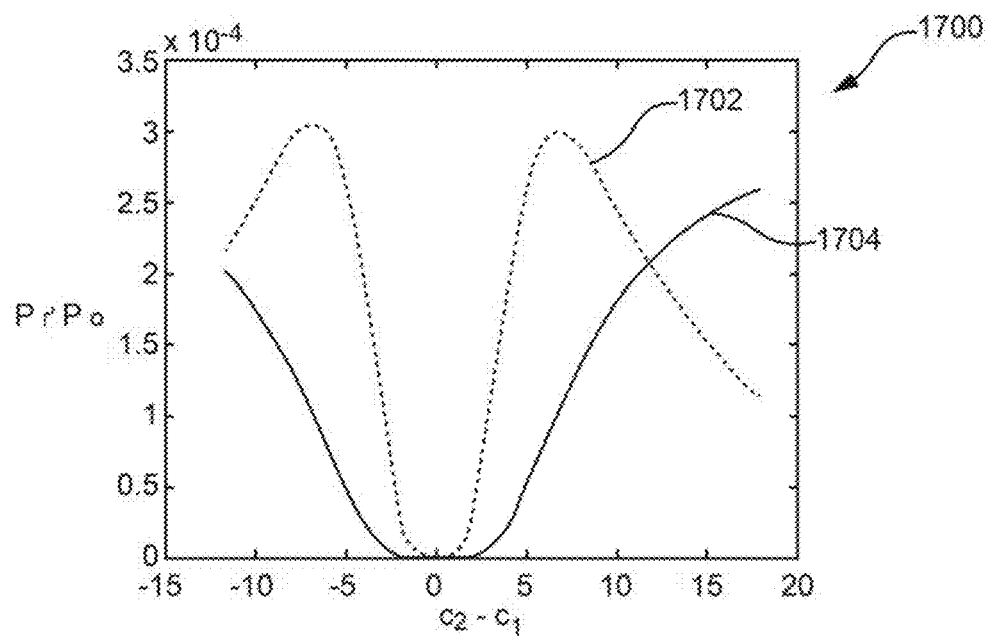
FIG. 17 is a plot of an example observer's power, $P^O$ (Dashed line), and the sender's power $P^S$ (Solid line) for changing $c^2$.

Now we add in the observer and look at the power the observer gets. The power at the observer can be found from the equation $$P_o = \frac{1}{T_o}\int_0^{T_o} \eta_3 \dot{x}_3^2 dt \qquad (76)$$

and the simulation is done in FIG. 17.

FIG. 17 is a plot 1700 of an example observer's power, $P^O$ (Dashed line 1702), and the sender's power $P^S$ (Solid line 1704) for changing $c^2$. For Equation 31-33, the values of the constants used were E=0.001, $c_1$=12, k=1, $m_1$=$m_2$=$m_3$=1, $\eta_1$=0.001, and $\eta_3$=0.1. For this graph, the value of $\eta_2$=1.

We see here that for large coefficients of friction in the receiver, both $P^O$ and $P^S$ are minimums at the same point. Thus, $\eta_2$=1 is too large. Next, we look the same constants in FIG. 17 but with $\eta_2$=0.01.

Figure 18:
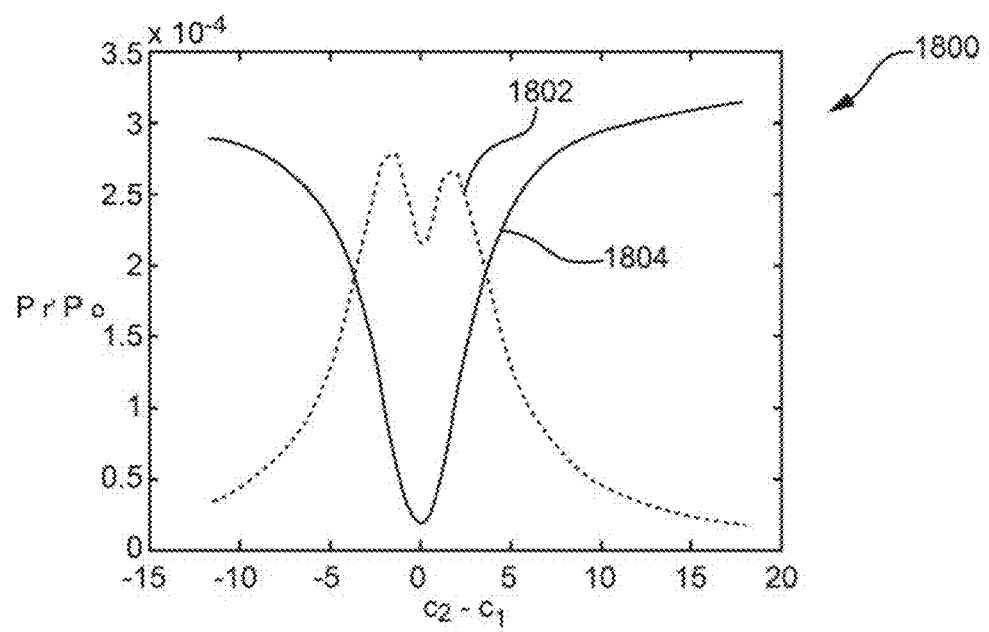
FIG. 18 is a plot of an example power at the observer, $P^O$ (dashed line), and the power at the sender, $P^S$ (solid line), with the same constant values as in FIG. 17 but with $\eta_2=0.01$.

FIG. 18 is a plot 1800 of an example power at the observer, $P^O$ (dashed line 1802), and the power at the sender, $P^S$ (solid line 1804), with the same constant values as in FIG. 17 but with $\eta_2$=0.01.

Again, it appears that $\eta_2$=0.01 is still too large of a frictional coefficient. Next, we try $\eta_2$=0.006.

Figure 19:
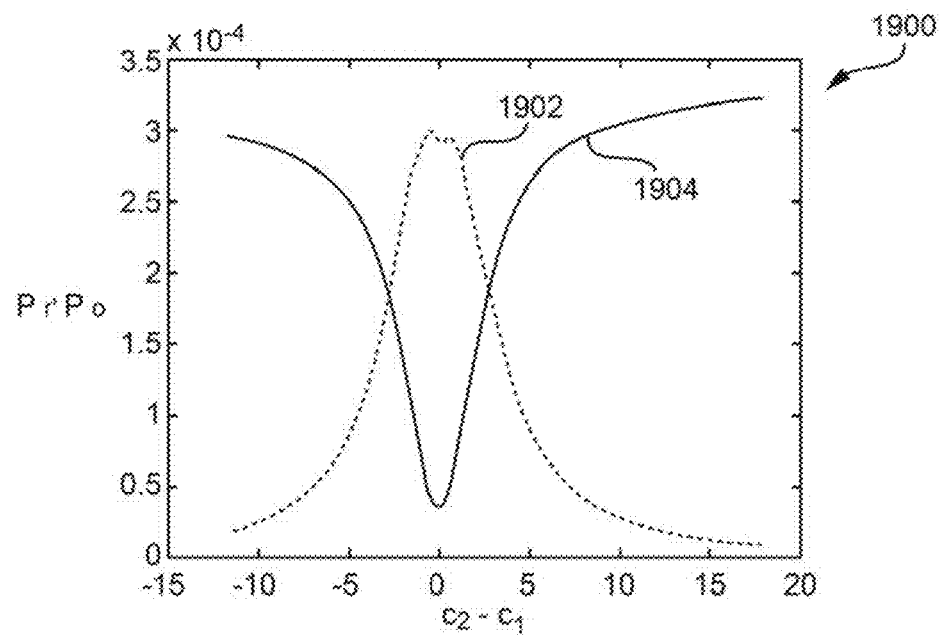
FIG. 19 is a plot of an example power at the observer, $P^O$ (dashed line), and the power at the sender, $P^S$ (solid line), with the same constant values as in FIG. 17 but with $\eta_2=0.006$.

FIG. 19 is a plot 1900 of an example power at the observer, $P^O$ (dashed line 1902), and the power at the sender, $P^S$ (solid line 1904), with the same constant values as in FIG. 17 but with $\eta_2$=0.006.

This is a much better value because $P^S$ is a minimum where $P^O$ is a maximum. It's not quite perfect however, since $P^O$ is not a perfect maximum and has a small minimum at the peak. Next we try $\eta_2$=0.005.

Figure 20:
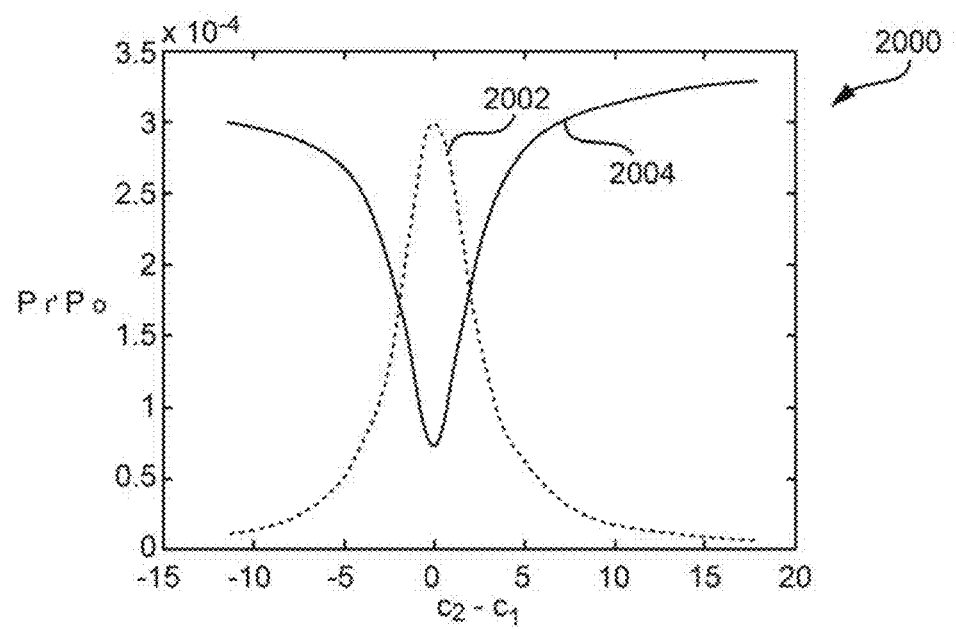
FIG. 20 is a plot of an example power at the observer, $P^O$ (dashed line), and the power at the sender, $P^S$ (solid line), with the same constant values as in FIG. 17 but with $\eta_2=0.005$.

FIG. 20 is a plot 2000 of an example power at the observer, $P^O$ (dashed line 2002), and the power at the sender, $P^S$ (solid line 2004), with the same constant values as in FIG. 17 but with $\eta_2$=0.005.

Again, this is better than FIG. 19 but the peak is still not quite a perfect maximum. Next, we try $\eta_2$=0.004.

Figure 21:
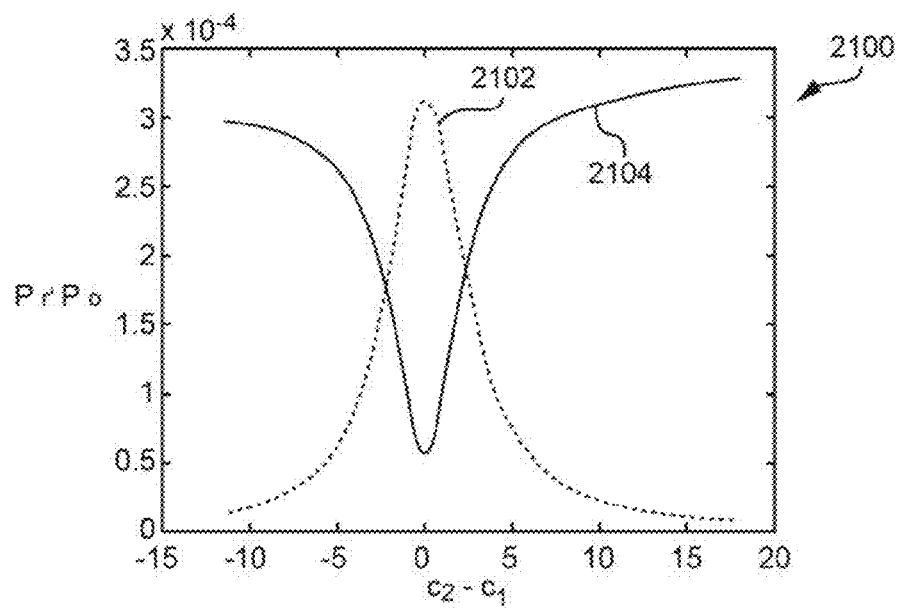
FIG. 21 is a plot of an example power at the observer, $P^O$ (dashed line), and the power at the sender, $P^S$ (solid line), with the same constant values as in FIG. 17 but with $\eta_2=0.004$.

FIG. 21 is a plot 2100 of an example power at the observer, $P^O$ (dashed line 2102), and the power at the sender, $P^S$ (solid line 2104), with the same constant values as in FIG. 17 but with $\eta_2$=0.004.

This is almost perfect! The optimal $\eta_2$ value that gives the most power at the observer is 0.004. If we try $\eta_2$=0.003, we get FIG. 22.

Figure 22:
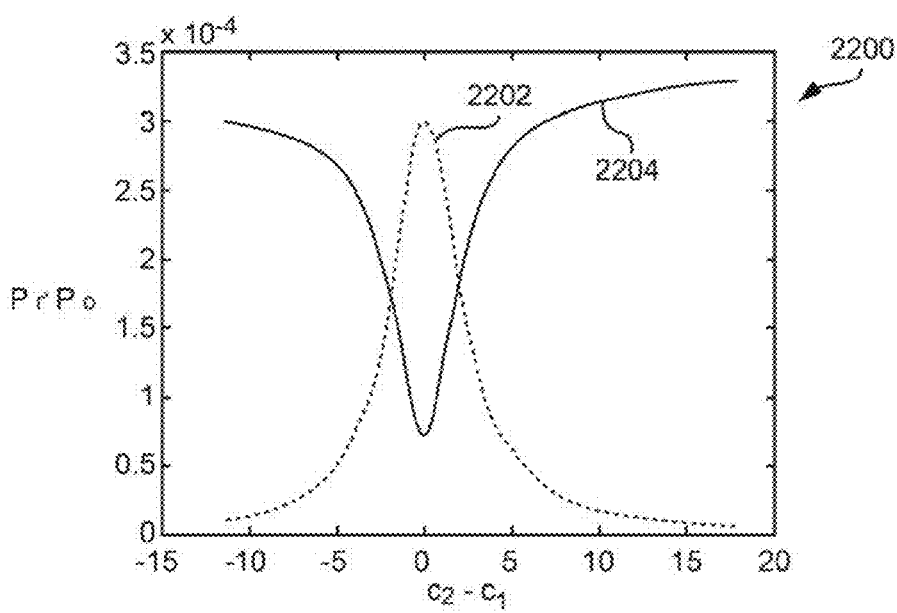
FIG. 22 is a plot of an example power at the observer, $P^O$ (dashed line), and the power at the sender, $P^S$ (solid line), with the same constant values as in FIG. 17 but with $\eta_2=0.003$.

FIG. 22 is a plot 2200 of an example power at the observer, $P^O$ (dashed line 2202), and the power at the sender, $P^S$ (solid line 2204), with the same constant values as in FIG. 17 but with $\eta_2$=0.003.

We still get a well-defined peak but the maximum power at the observer is less than when $\eta_2$=0.004. The same is true for FIG. 23 where $\eta_2$=0.002.

Figure 23:
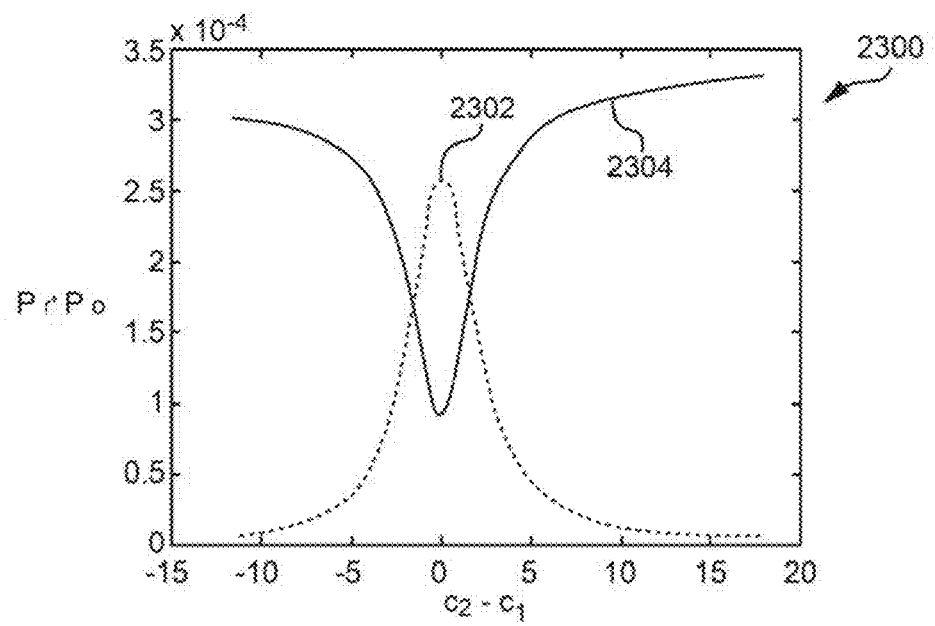
FIG. 23 is a plot of an example power at the observer, $P^O$ (dashed line), and the power at the sender, $P^S$ (solid line), with the same constant values as in FIG. 17 but with $\eta_2=0.002$.

FIG. 23 is a plot 2300 of an example power at the observer, $P^O$ (dashed line 2302), and the power at the sender, $P^S$ (solid line 2304), with the same constant values as in FIG. 17 but with $\eta_2$=0.002.

When $\eta_2$<0.0008, we still get a $P_O$ maximum when $P_S$ is a minimum but the maximum $P_O$ is less than the minimum $P_S$.

Figure 24:
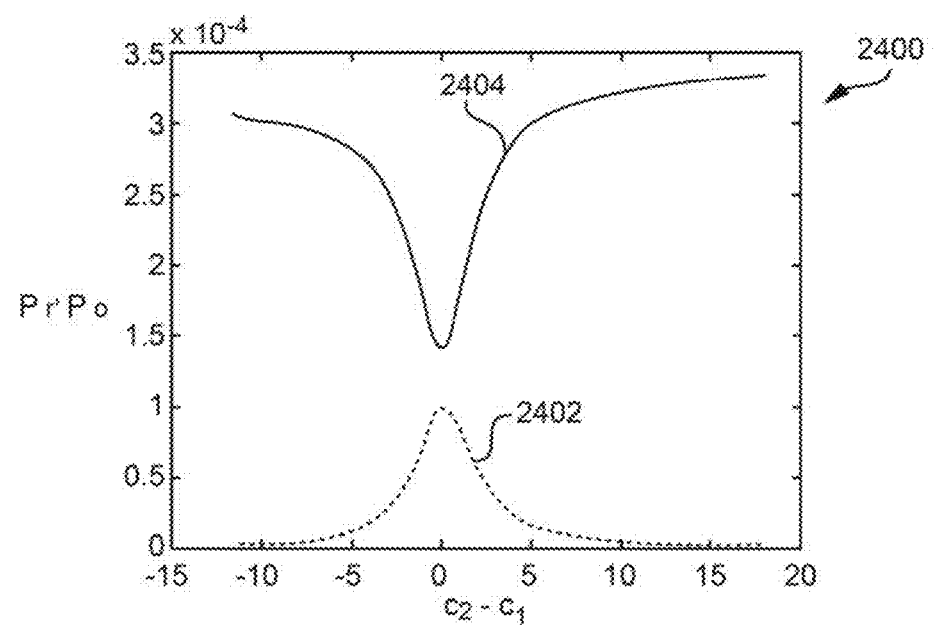
FIG. 24 is a plot of an example power at the observer, $P^O$ (dashed line), and the power at the sender, $P^S$ (solid line), with the same constant values as in FIG. 17 but with $\eta_2=0.0005$.

FIG. 24 is a plot 2400 of an example power at the observer, $P^O$ (dashed line 2402), and the power at the sender, $P^S$ (solid line 2404), with the same constant values as in FIG. 17 but with $\eta_2$=0.0005.

Next, we left $\eta_2$ fixed and changed $\eta_3$.

Figure 25:
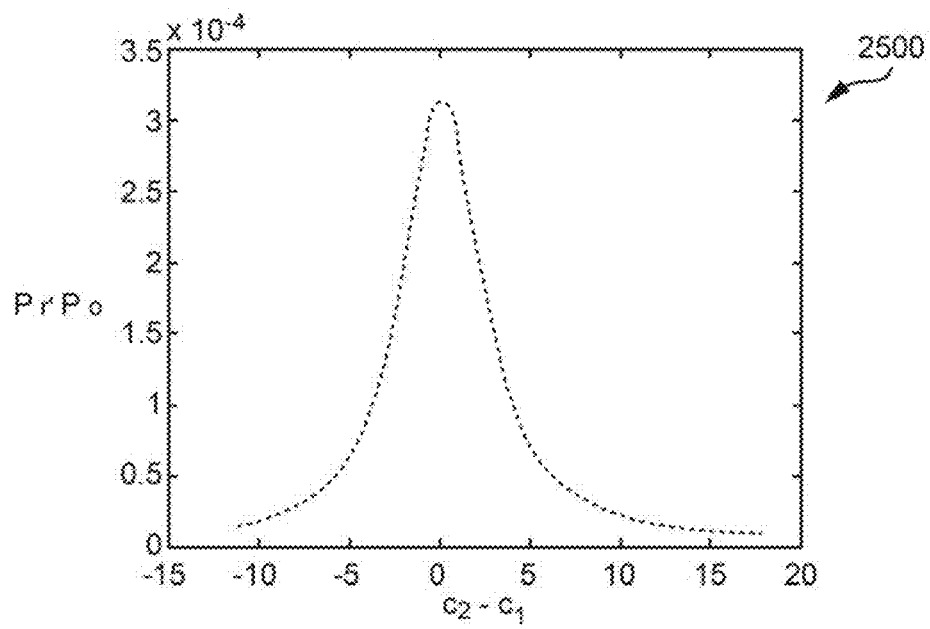
FIG. 25 is a plot of an example using the same constants as in FIG. 17 except $\eta_2=0.004$ and $\eta_3=0.0001$.

FIG. 25 is a plot 2500 of an example using the same constants as in FIG. 17 except $\eta_2$=0.004 and $\eta_3$=0.0001.

Figure 26:
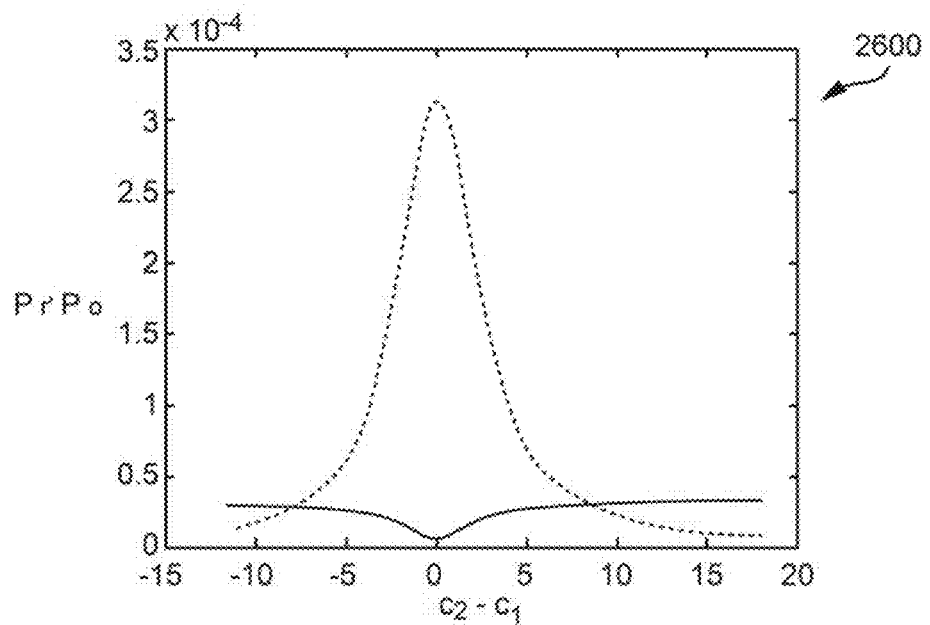
FIG. 26 is a plot of an example using the same constants as in FIG. 25 except $\eta_3=0.01$.

FIG. 26 is a plot 2600 of an example using the same constants as in FIG. 25 except $\eta_3$=0.01.

Now, we analyze the power at the sender in comparison to power at the observer and the power at the receiver.

Figure 27:
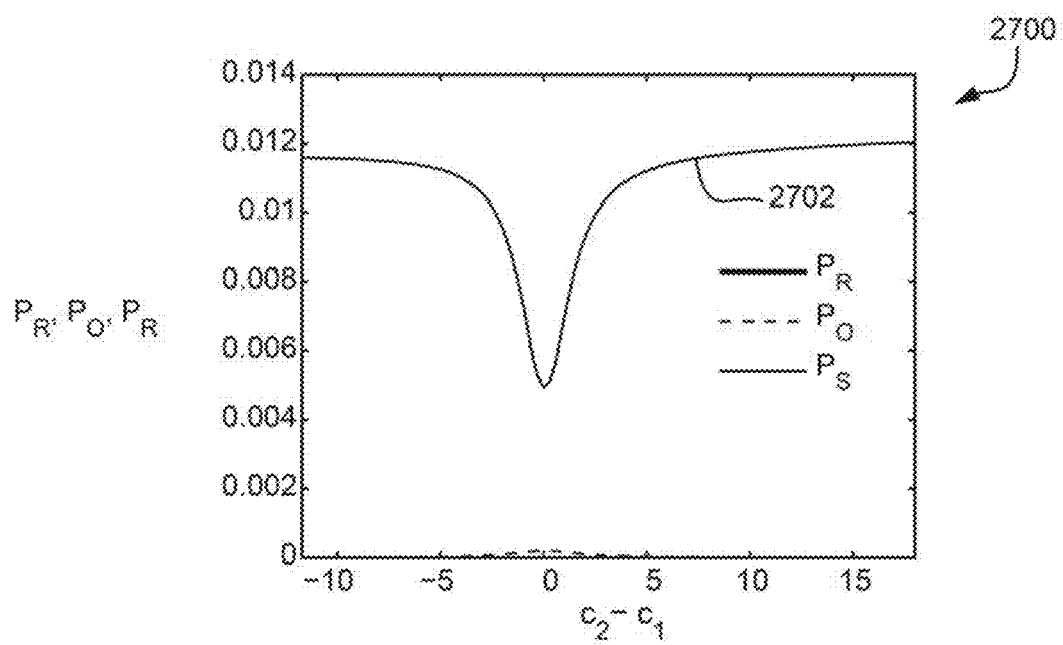
FIG. 27 is a plot of an example using the same constants as in FIG. 25 except $\eta_1=0.1$ and the power at the sender is in red (top).

FIG. 27 is a plot 2700 of an example using the same constants as in FIG. 25 except $\eta_1$=0.1 and the power at the sender is illustrated with a red line 2702.

If the frictional coefficient is too strong, the observer will not receive much power.

Next, we looked at a smaller frictional coefficient of value $\eta_1$=0.001.

Figure 28:
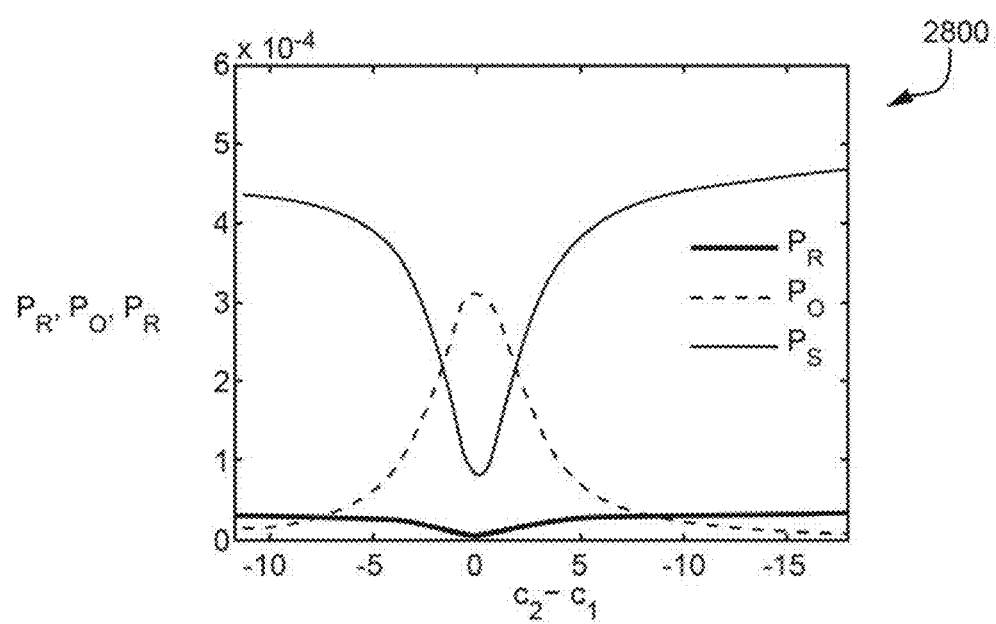
FIG. 28 is a plot of an example of the same constants as in FIG. 25 except $\eta_1=0.001$.

FIG. 28 is a plot 2800 of an example of the same constants as in FIG. 25 except $\eta_1$=0.001.

This is much better but not the maximum power. The maximum power absorbed by the observer can be found when $\eta_1$=0.0007.

Figure 29:
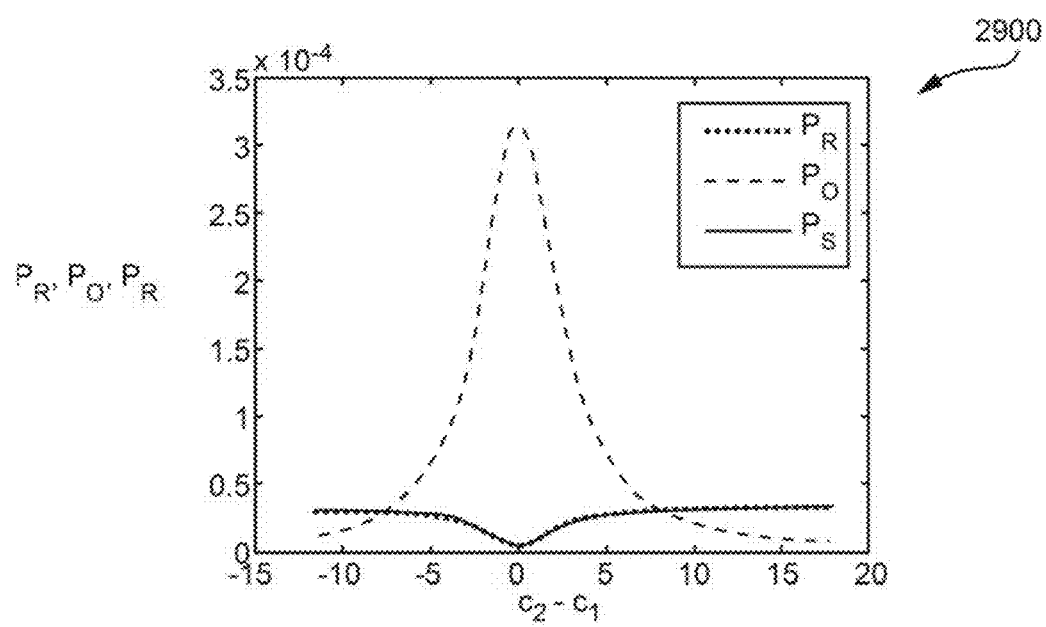
FIG. 29 is a plot of an example using the same constants as in FIG. 25 except $\eta_1=0.00007$.

FIG. 29 is a plot 2900 of an example using the same constants as in FIG. 25 except $\eta_1$=0.00007.

Now we examine the power at the observer as a function of $\eta_1$ values.

Figure 30:
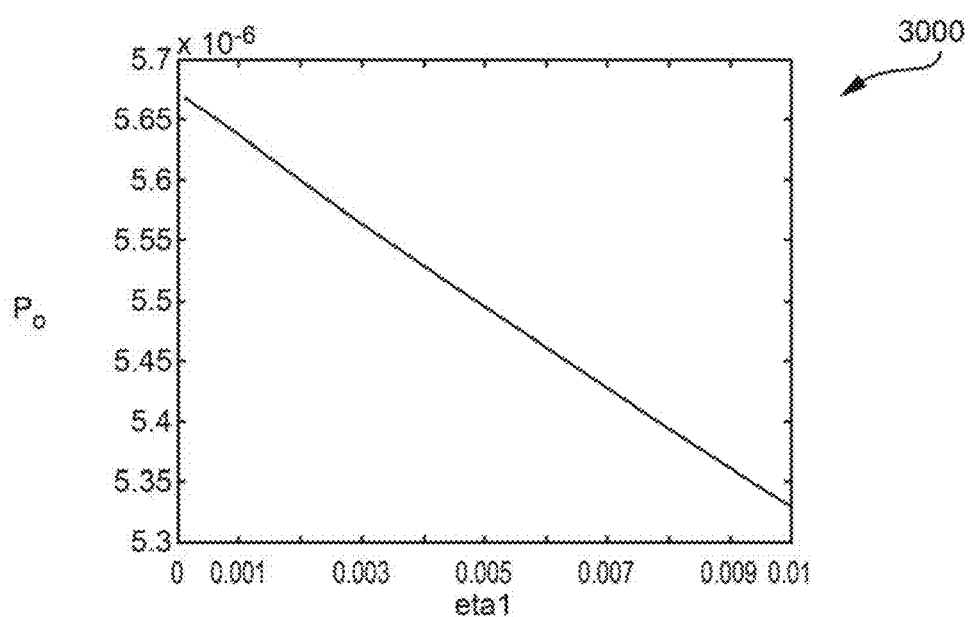
FIG. 30 is a plot of an example power at the observer ($P^O$) as a function of $\eta_1$ using the same constants as in FIG. 29.

FIG. 30 is a plot 3000 of an example power at the observer ($P_O$) as a function of $\eta_1$ using the same constants as in FIG. 29.

Confirmation of Example Results

In this section, we use equations from "Harvesting Wave Energy with Resonant Observers," Alfred Hubler and Thomas Kirsh, *Complexity*, 20, 67 (2015). An image representation can be shown in FIG. 31.

Figure 31:
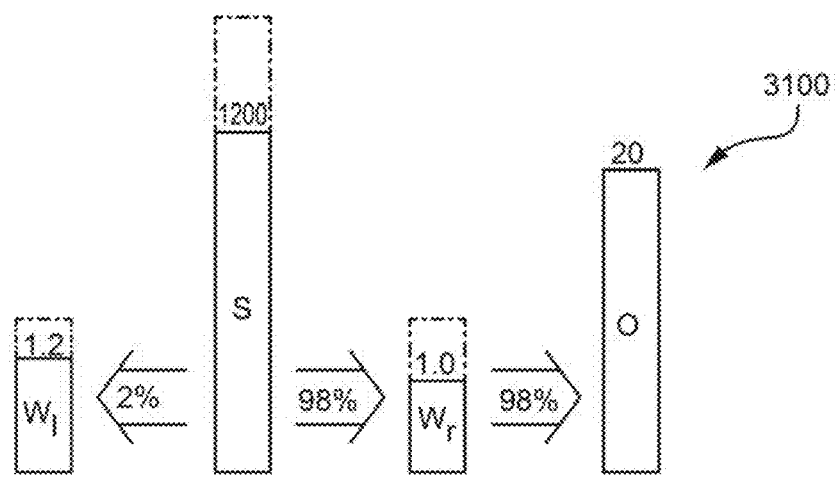
FIG. 31 is an example plot of an image representation of a system.

FIG. 31 is an example plot 3100 of an image representation of a system.

A sender is placed between a left receiver $x_l$ and a right receiver $x_r$. The equation for the sender is given by $$\ddot{x} - 0.001\left(1 - \frac{1}{2}\dot{x}^2 - 6x^2\right)\dot{x} + 12x = 0.4(x_l - x) + 0.4(x_r - x) \quad (77)$$

The equation for the left receiver is $$\ddot{x}_l + 0.01\dot{x}_l = 0.4(x - x_l) \quad (78)$$

and the right receiver is described by the equation $$\ddot{x}_r + 0.01\dot{x} = 0.4(x - x_r) \quad (79)$$

We can calculate the average power at each receiver by using the general equation $$P_{l,r} = \frac{1}{T}\int_0^T F_{l,r} \cdot \dot{x}dx \quad (80)$$

When we calculate the average power for the system above for the left and right receiver, we see that $$P_l = P_r = 6.4759 \times 10^{-5} \quad (81)$$

and this was predicted herein. Now, we add an observer to the right of the right receiver. With this new addition, the equation of the right observer becomes $$\ddot{x}_r + 0.01\dot{x} = 0.4(x - x_r) + 0.4(x_o - x_r) \quad (82)$$

and the equation of the observer is $$\ddot{x}_o + 0.01\dot{x}_o + 12.5x_o = 0.4(x_r - x_o) \quad (83)$$

The power at the observer can be found by $$P_o = \frac{1}{T}\int_0^T F_o \cdot \dot{x}_o = 0.4(x_r - x_o) \cdot \dot{x}_o \quad (84)$$

In one example, the value of the frictional constant, $\eta$ was kept at the value $\eta$=0.001. However, this is not the optimal $\eta$ that produces the maximum power at the observer and at the left and right receivers. If we first consider the case where there is no observer, then our equations are Equation 77-79. There are two cases, one for small $\eta$ values and one for large $\eta$ values. The two cases are plotted below.

Figure 32:
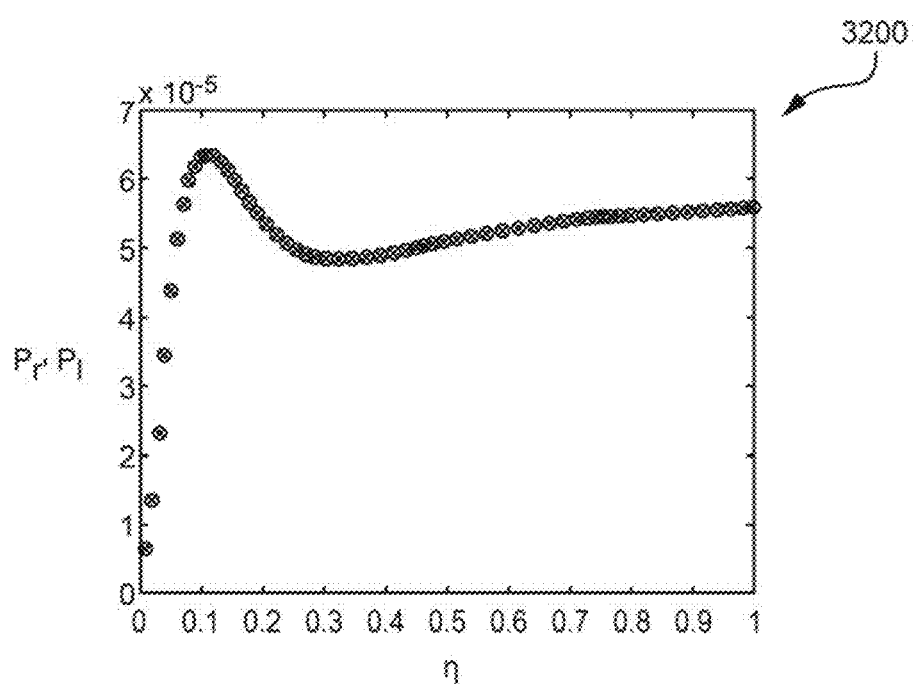
FIG. 32 is a graph of an example power for the left (denoted with x's) and right (denoted with p's) receivers for different larger values of $\eta$.

FIG. 32 is a graph 3200 of an example power for the left (denoted with x's) and right (denoted with p's) receivers for different larger values of $\eta$.

We can see that at the same $\eta$ value the two receivers have the same power and the power is $P_r = P_l = 0.0064$.

Now we consider the case for which we do have an observer. Our equation for the right receiver becomes Equation 82 and the equation for the observer is Equation 83. Again, there are two cases, one for small values of $\eta$ and one for larger $\eta$ values. These are shown below.

Figure 33:
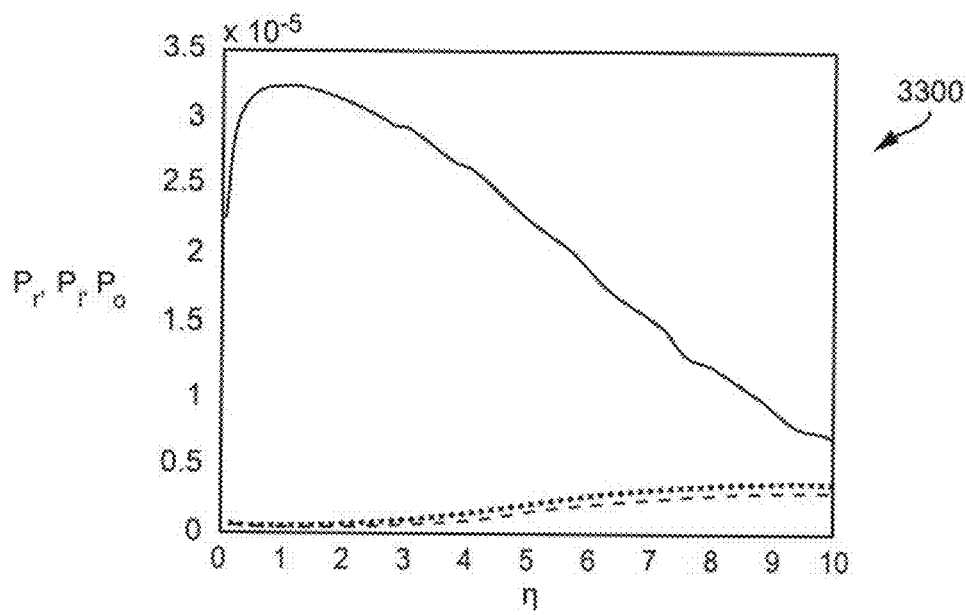
FIG. 33 is a plot of an example power at the left and right receivers, and the observer for different larger values of $\eta$.

FIG. 33 is a plot 3300 of an example power at the left and right receivers, and the observer for different larger values of $\eta$. The left receiver is denoted by the solid line, the right receiver is denoted with the dashed line, and the observer is denoted with the dotted line.

Here the maximum power at the observer is 0.0032 and at the same $\eta$ value, the power at the left and right receivers are $P_l$=4.8530×10⁻⁵ and $P_r$=4.4928×10⁻⁵. The percent of power going through the right receiver is 98.5% and the percentage of power through the left receiver is 1.5%.

Next we look at the power at the sender with and without the observer. We use the equation $$P_s = \langle F \cdot v \rangle = \frac{1}{T}\int_0^T (0.4(x_l - x) + 0.4(x_r - x))\dot{x}dt \quad (85)$$

Figure 34:
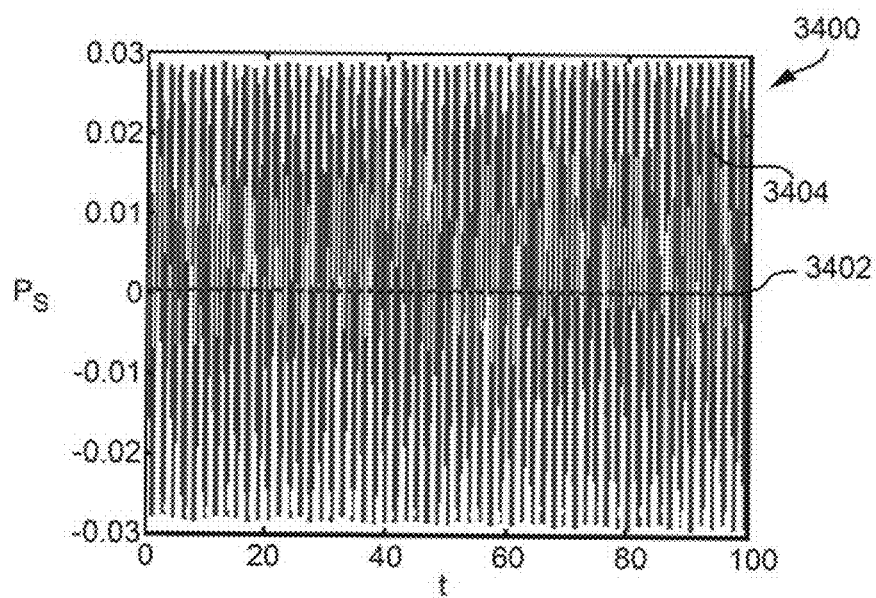
FIG. 34 is a graph of an example power at the sender without the observer with initial values $x_s=x_l=x_r=0.1$ and $\eta=0.001$.

FIG. 34 is a graph 3400 of an example power at the sender without the observer with initial values $x_s = x_l = x_r = 0.1$ and $\eta$=0.001. The average power is the dashed green line 3402 while the instantaneous power is the solid blue line 3404.

The average power without the observer is 0.252 (W). The power at the sender with the observer is shown below as a function of time.

Figure 35:
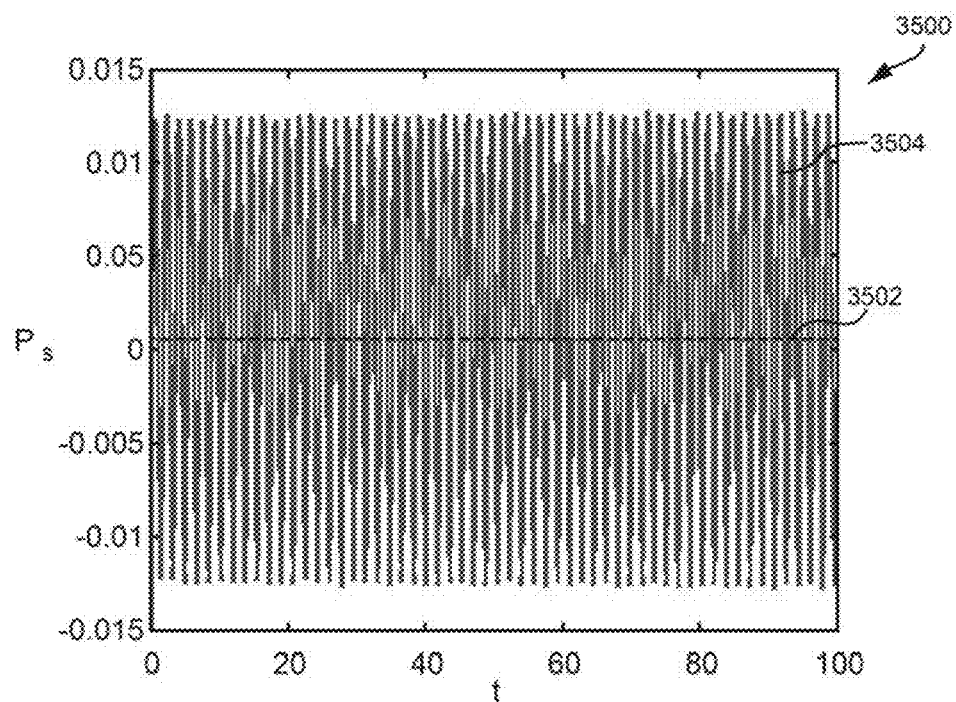
FIG. 35 is a plot of an example power dissipated through the sender over a period of 100 seconds with initial values of $x_s=x_l=x_r x_o=0.1$ and $\eta=0.001$.

FIG. 35 is a plot 3500 of an example power dissipated through the sender over a period of 100 seconds with initial values of $x_s = x_l = x_r = x_o = 0.1$ and $\eta$=0.001. The average power is the dashed green line 3502 while the instantaneous power is the solid blue line 3504.

The average power dissipated through the sender with an observer is 0.4917 (W).

Figure 36:
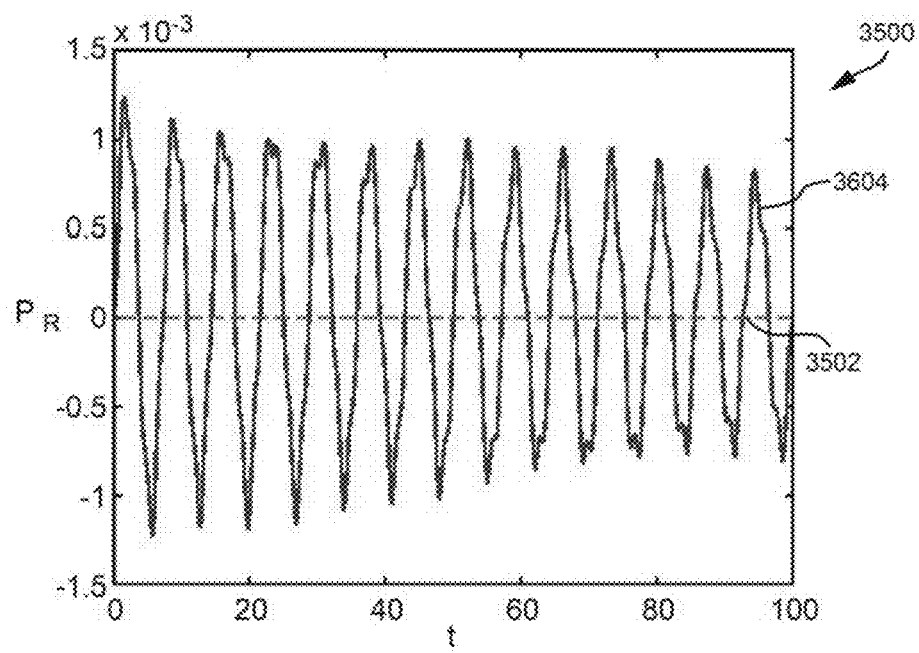
FIG. 36 is a plot of an example power dissipated through the right receiver with an observer.

FIG. 36 is a plot 3600 of an example power dissipated through the right receiver with an observer. The average power is the dashed green line 3602 while the instantaneous power is the solid blue line 3604. The average power dissipated at the right receiver with an observer is −0.1685 (W).

Figure 37:
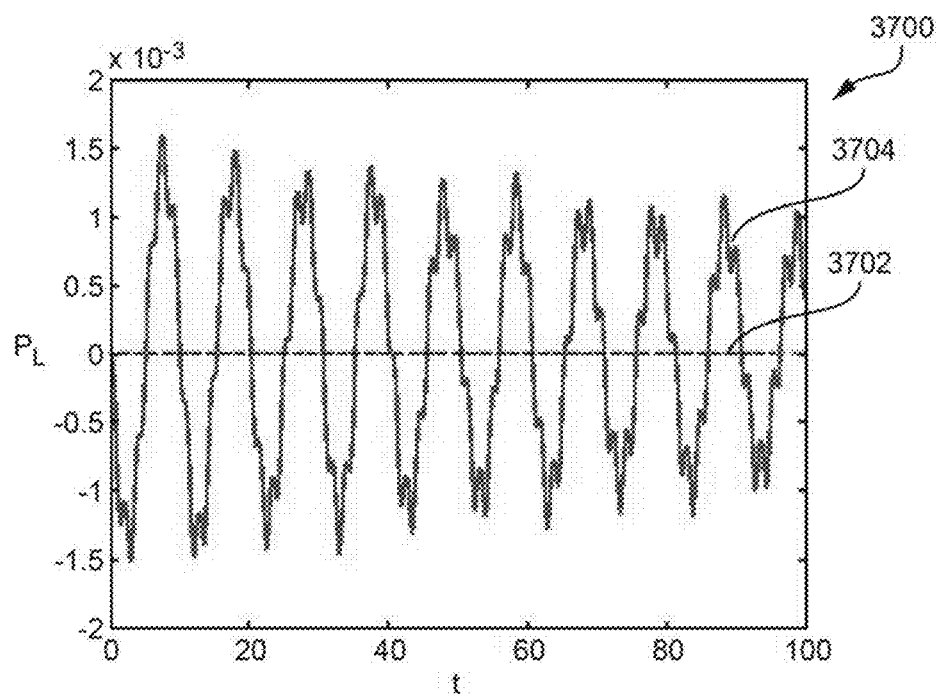
FIG. 37 is a plot of an example power dissipated through the left receiver with an observer.

FIG. 37 is a plot 3700 of an example power dissipated through the left receiver with an observer. The average power is the dashed green line 3702 while the instantaneous power is the solid blue line 3704. The average power dissipated at the left receiver with an observer is 0.1269 (W).

Figure 38:
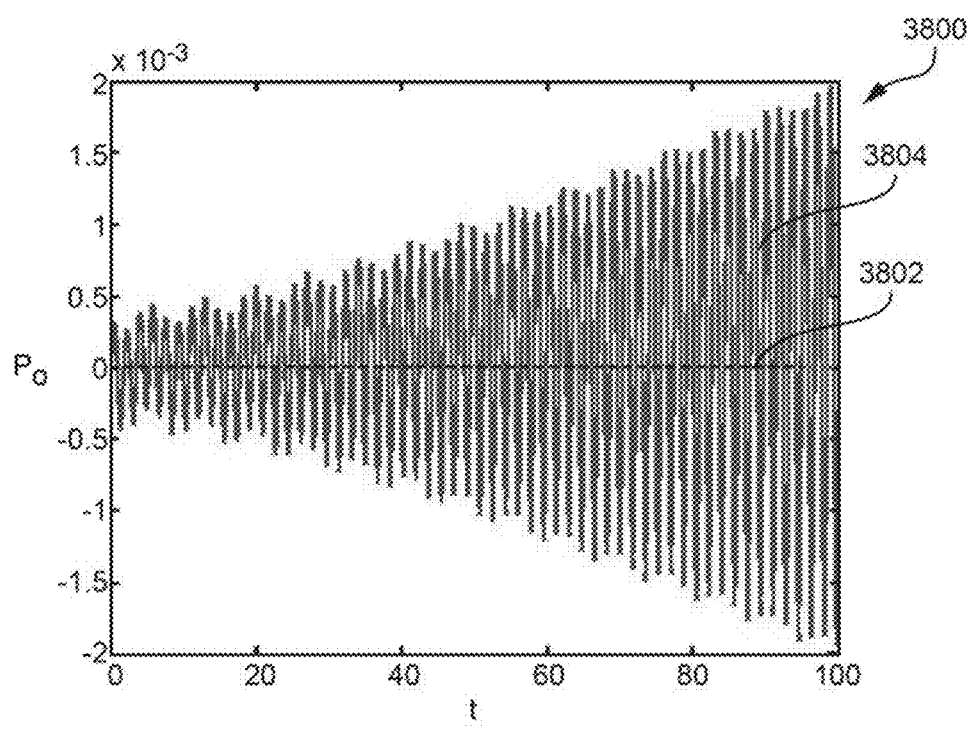
FIG. 38 is a plot of an example power dissipated through the observer.

FIG. 38 is a plot 3800 of an example power dissipated through the observer. The average power is the dashed green line 3802 while the instantaneous power is the solid blue line 3804. The average power at the observer is 0.8696 (W).

Figure 39:
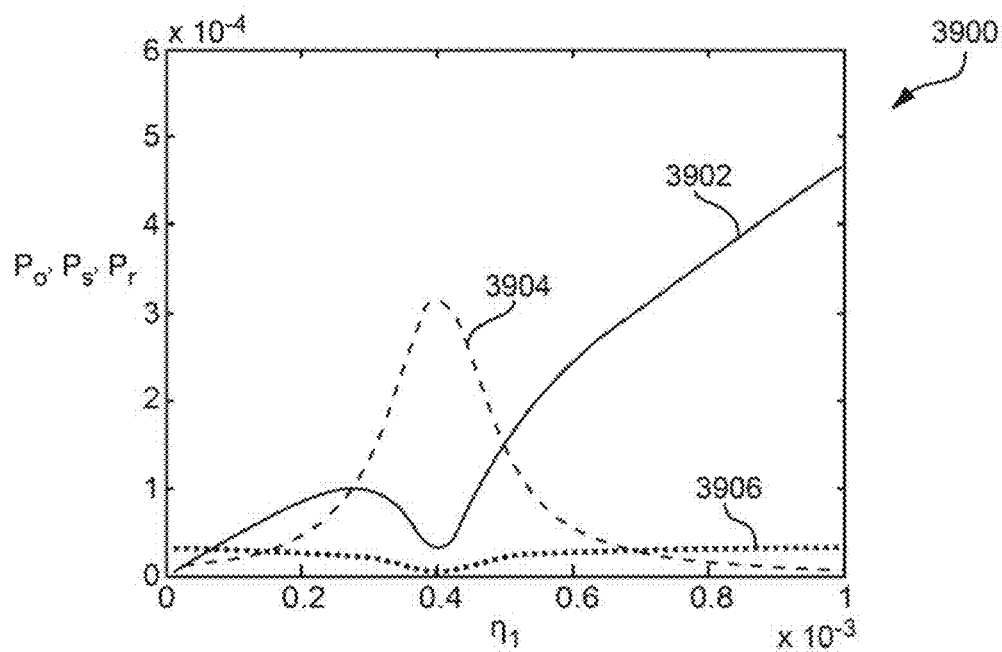
FIG. 39 is a plot of example power at the observer, $P^O$, power at the receiver, $P_R$, and power at the sender $P_S$.

FIG. 39 is a plot 3900 of example power at the observer, $P_O$, power at the receiver, $P_R$, and power at the sender $P_S$. $P_S$ is given in solid red 3902, $P_O$ is given in dashed green 3904, and $P_R$ is given in solid blue 3906. The constants are the same as in FIG. 28 but $\eta_1$ is a variable in addition to $c_2$.

As you can see, the most power is at the observer for $n_1=0.4$ and the sender holds on to more power as the $\eta_1$ value increases.

Intensity and Wave Interference

Now, we examine the intensity given by two sources at different distances d apart. The intensity is given by the following equation.

$$I = \left( \frac{\sin\left(k\sqrt{(x-d)^2 + y^2}\right)}{\sqrt{(x-d)^2 + y^2}} + \frac{\sin\left(k\sqrt{(x+d)^2 + y^2} + \phi\right)}{\sqrt{(x+d)^2 + y^2}} \right)^2 \quad (86)$$

where $$k = \frac{2\pi}{\lambda}$$

and ϕ is the phase shift between the two sources. We began with the case d=0 or both sources are in the same location, acting as one.

Figure 40:
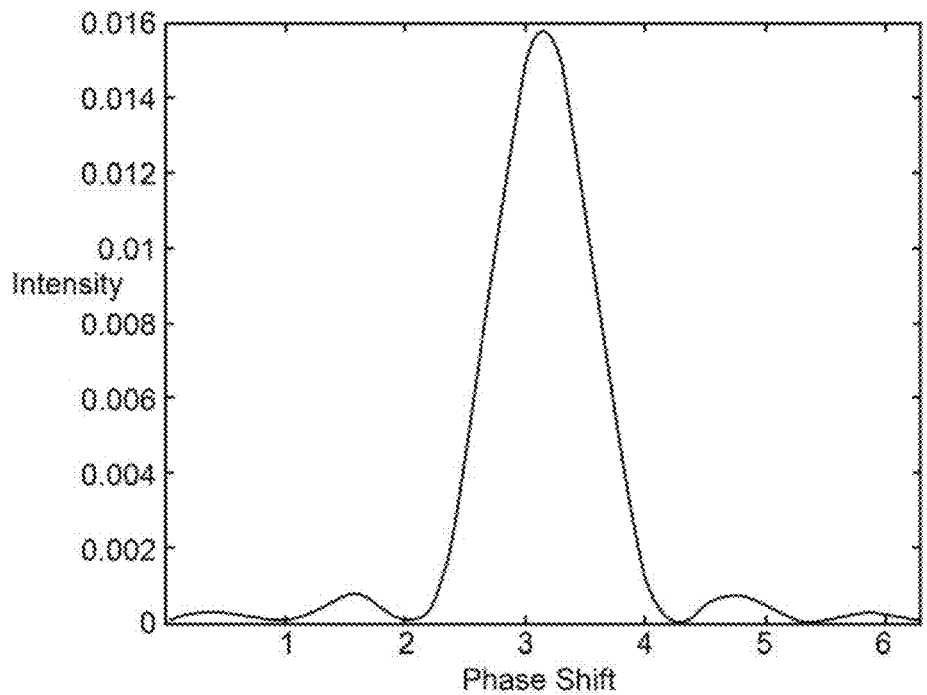
FIG. 40 is a plot of an example case where d=0.

FIG. 40 is a plot 4000 of an example case where d=0.

This is what we expect a single-slit intensity to look like, which acts in constructive interference. Next, we examine the case where $$d = \frac{\lambda}{2}.$$

Figure 41:
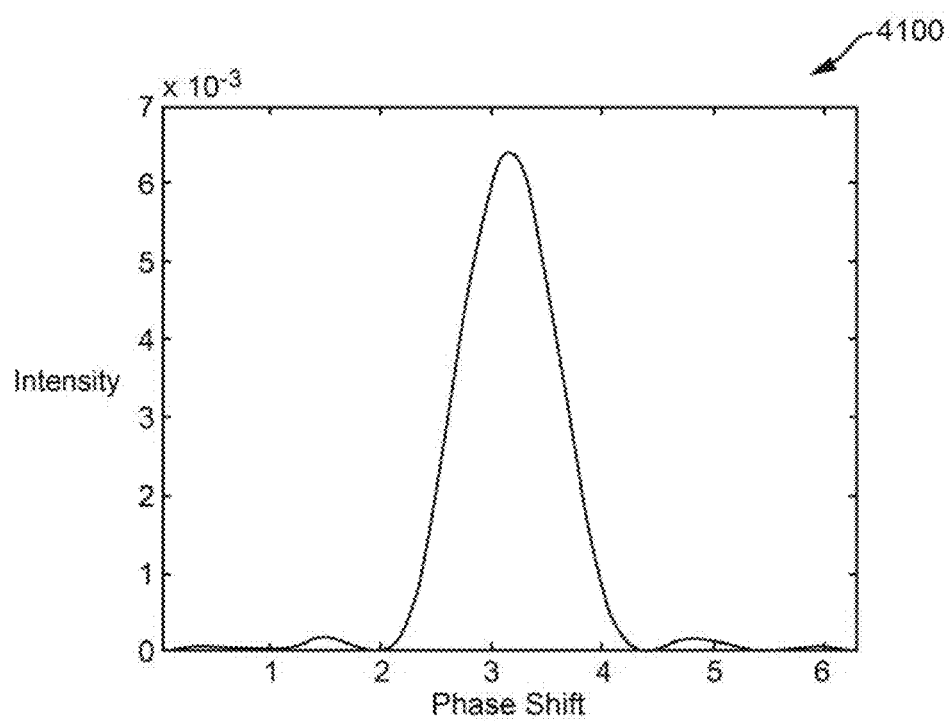
FIG. 41 is a plot of an example case where d is half the wavelength

FIG. 41 is a plot 4100 of an example case where d is half the wavelength

Again, the sources interfere constructively.

Figure 42:
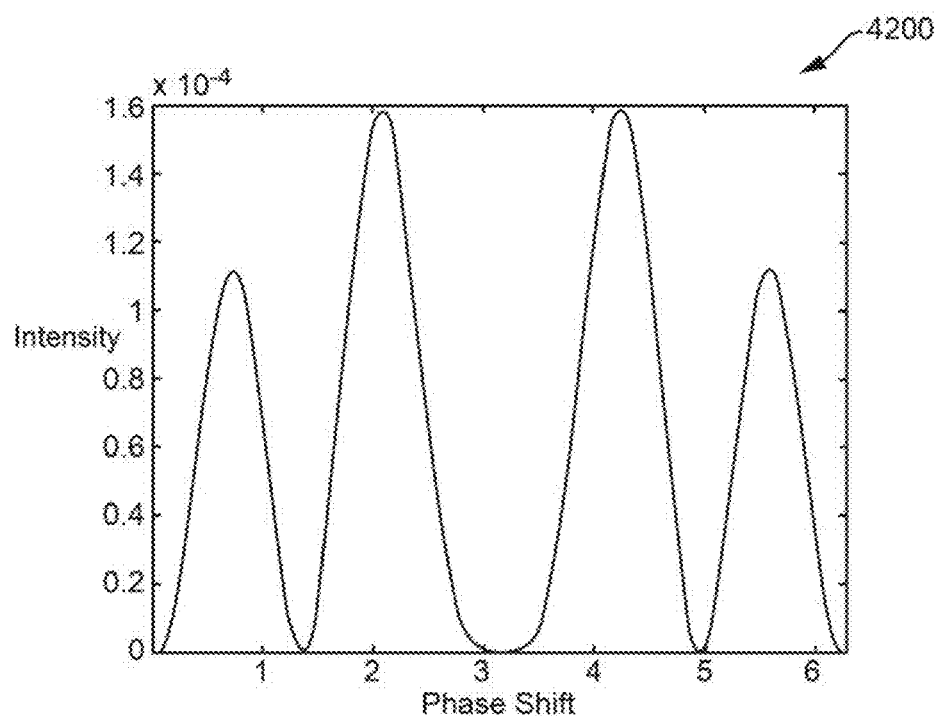
FIG. 42 is a plot of an example case where d is the wavelength.

FIG. 42 is a plot 4200 of an example case where d is the wavelength.

Figure 43:
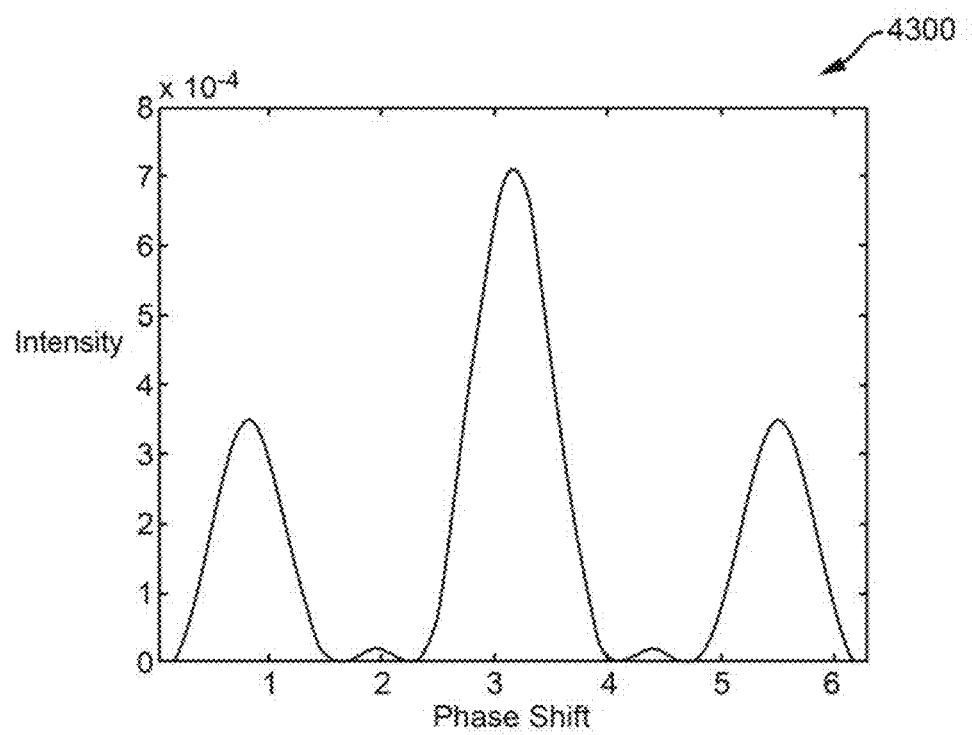
FIG. 43 is a plot of an example case where d is 3/2 times the wavelength.

FIG. 43 is a plot 4300 of an example case where d is 3/2 times the wavelength.

Figure 44:
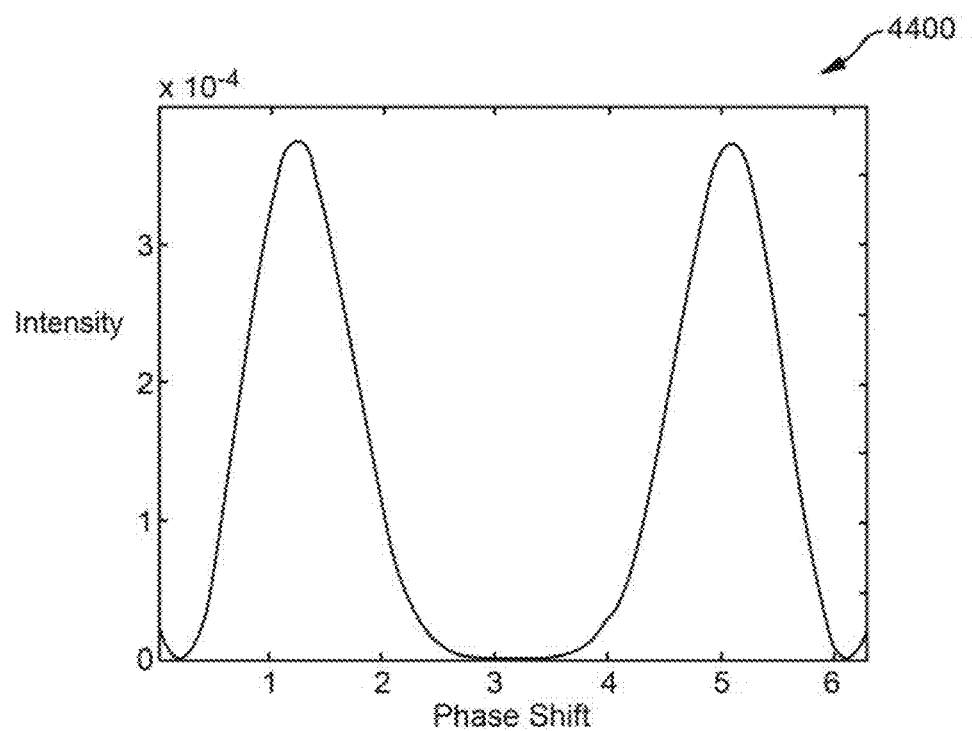
FIG. 44 is a plot of an example case where d is twice the wavelength.

FIG. 44 is a plot 4400 of an example case where d is twice the wavelength.

Figure 45:
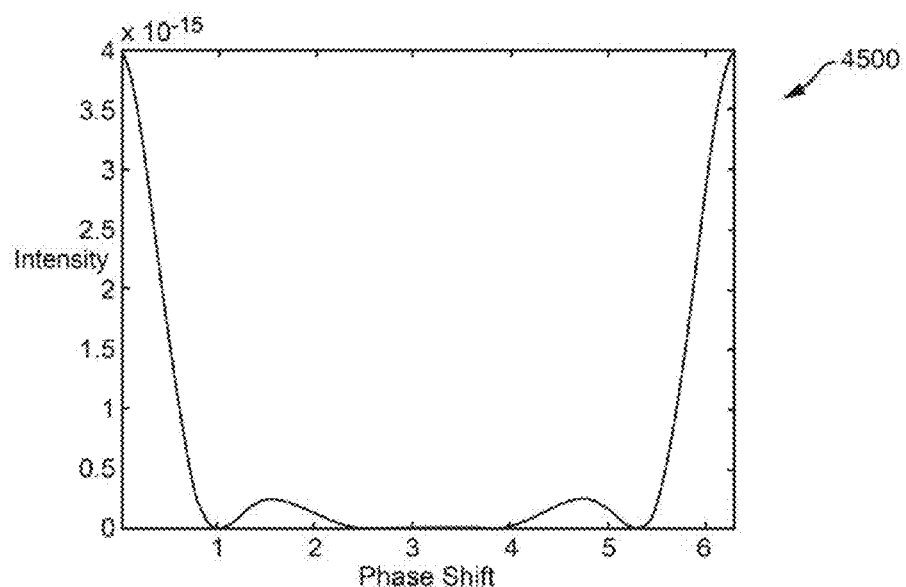
FIG. 45 is a plot of an example case where d=1000λ.

FIG. 45 is a plot 4500 of an example case where d=1000λ.

$$S_{wave} = \sin(k\sqrt{(x-d)^2+y^2}) + \sin(k\sqrt{(x+d)^2+y^2}+\phi) \quad (87)$$

Next, we simulate the wave propagation pattern for the two sinusoidal curves in Equation 87. For all these simulations, λ=100 nm, ϕ changes, and d is fractions of λ.

Figure 46:
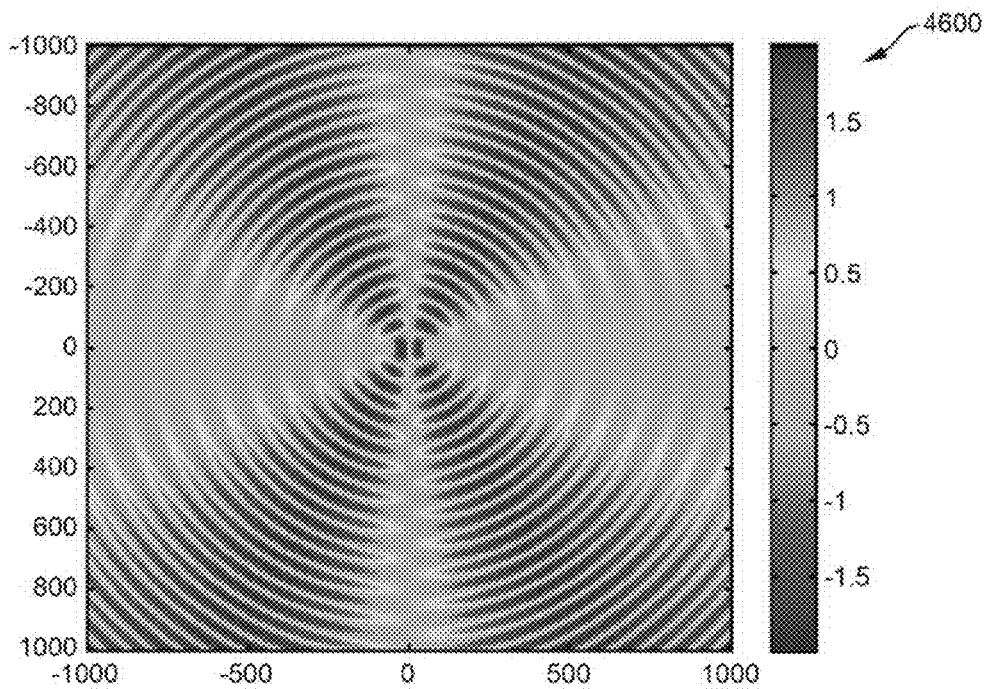
FIG. 46 is a plot of an example wave pattern where d=λ and φ=π.

FIG. 46 is a plot 4600 of an example wave pattern where d=λ and ϕ=π.

The green lines represent the nodal lines for out-of-phase oscillations for the two oscillators at a separation distance of λ.

Figure 47:
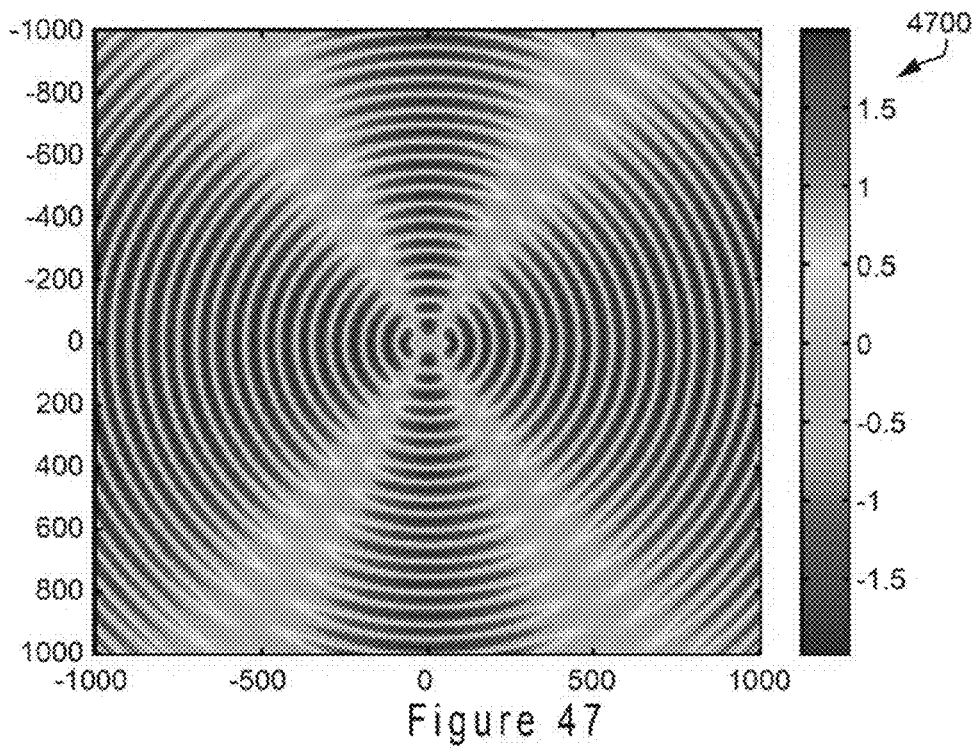
FIG. 47 is a plot of an example wave pattern where d=λ and φ=2π.

FIG. 47 is a plot 4700 of an example wave pattern where d=λ and ϕ=2π.

The green lines represent the nodal lines for in-phase oscillations for the two oscillators at a separation distance of λ.

Figure 48:
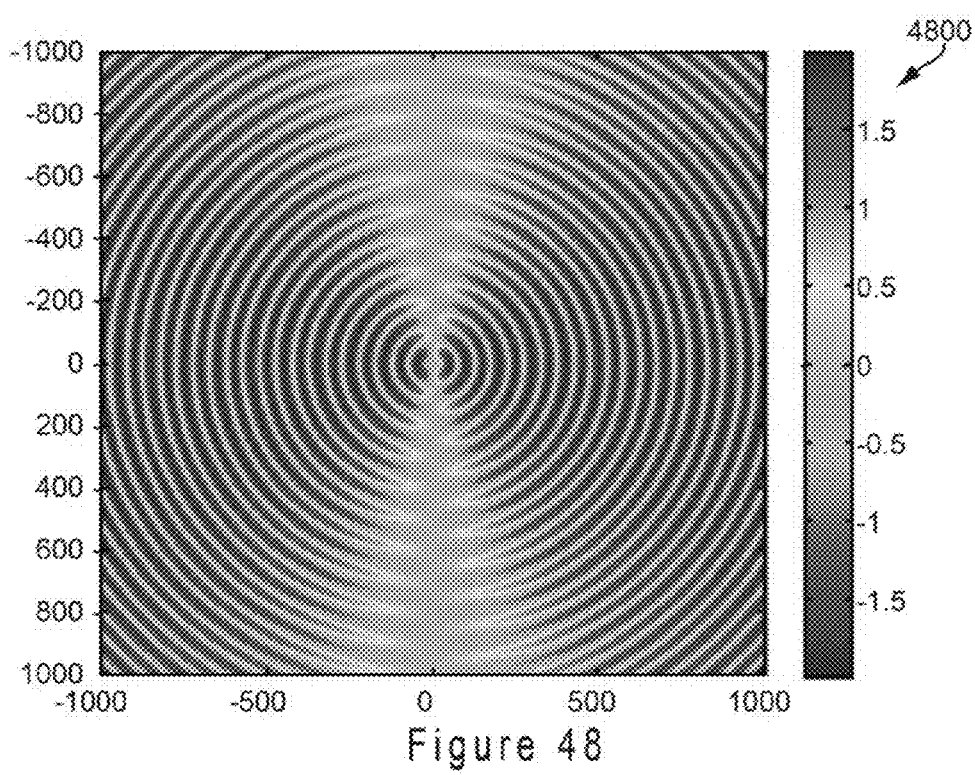
FIG. 48 is a plot of an example wave pattern where d=λ/2 and φ=π.

FIG. 48 is a plot 4800 of an example wave pattern where d=λ/2 and ϕ=π.

Figure 49:
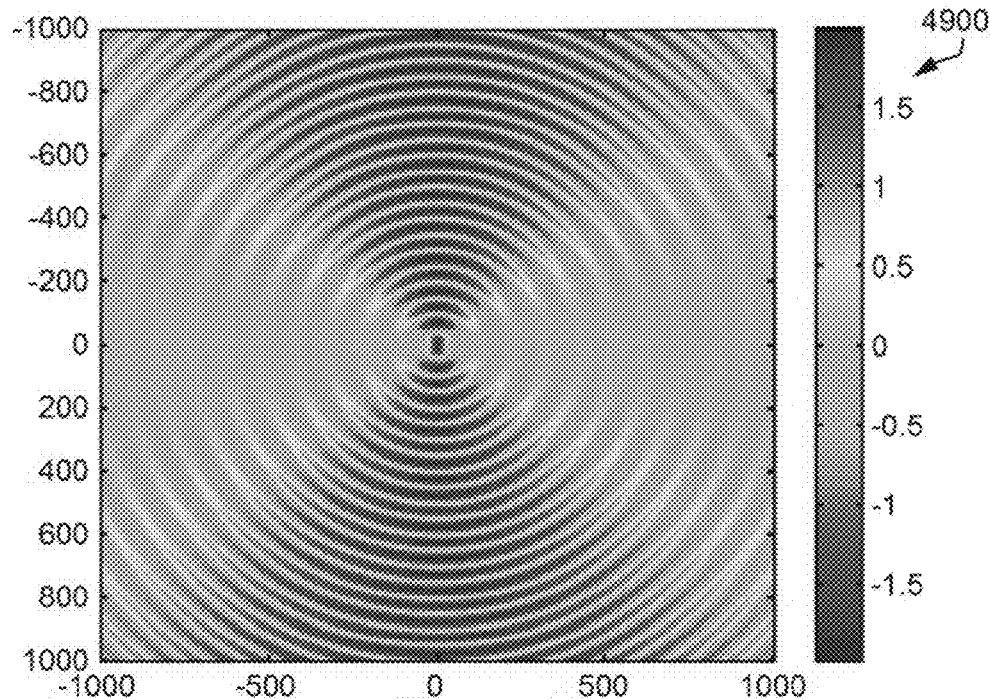
FIG. 49 is a plot of an example wave pattern where d=λ/2 and φ=2π.

FIG. 49 is a plot 4900 of an example wave pattern where d=λ/2 and ϕ=2π.

Figure 50:
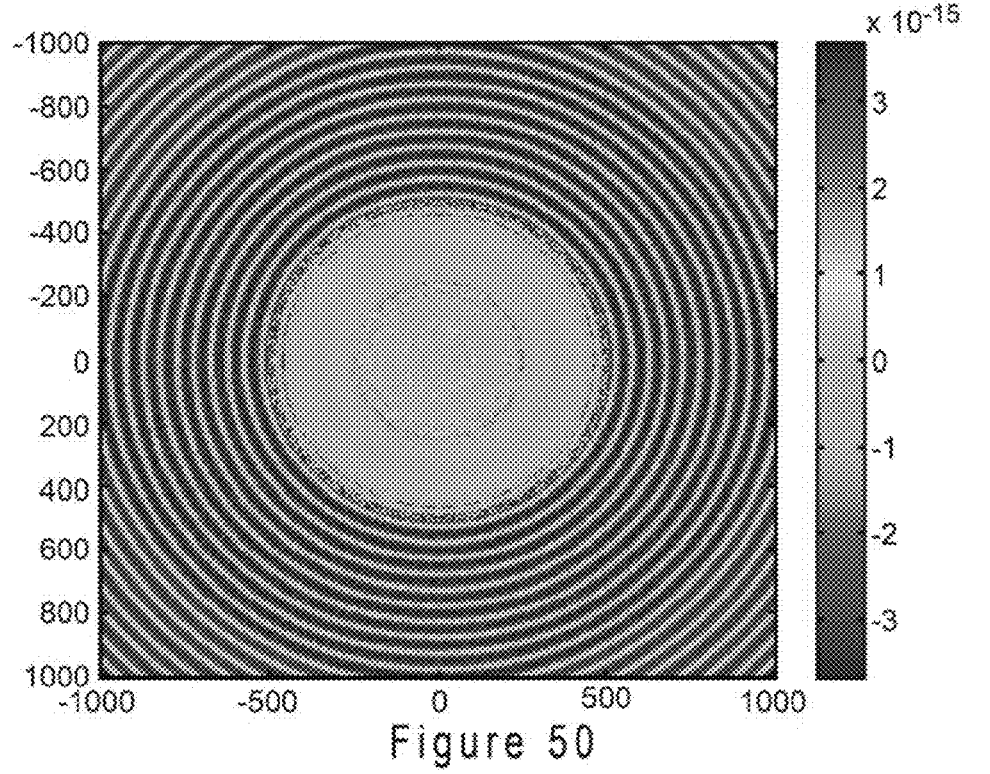
FIG. 50 is a plot of an example wave pattern where d=0 and φ=π.

FIG. 50 is a plot 5000 of an example wave pattern where d=0 and ϕ=π.

Figure 51:
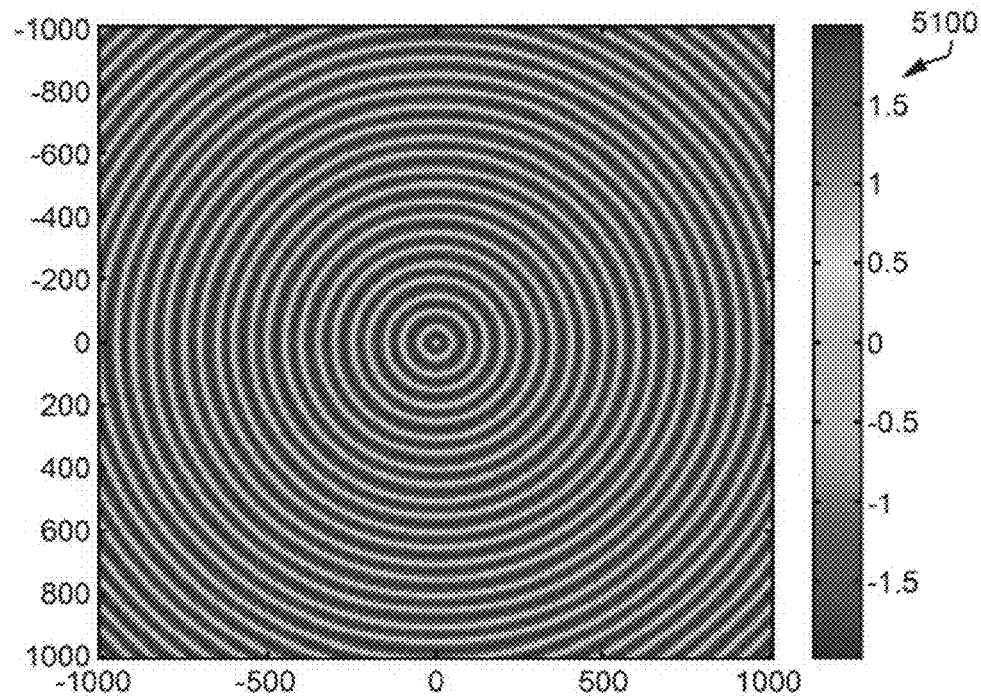
FIG. 51 is a plot of an example wave pattern where d=0 and φ=2π.

FIG. 51 is a plot 5100 of an example wave pattern where d=0 and ϕ=2π.

Figure 52:
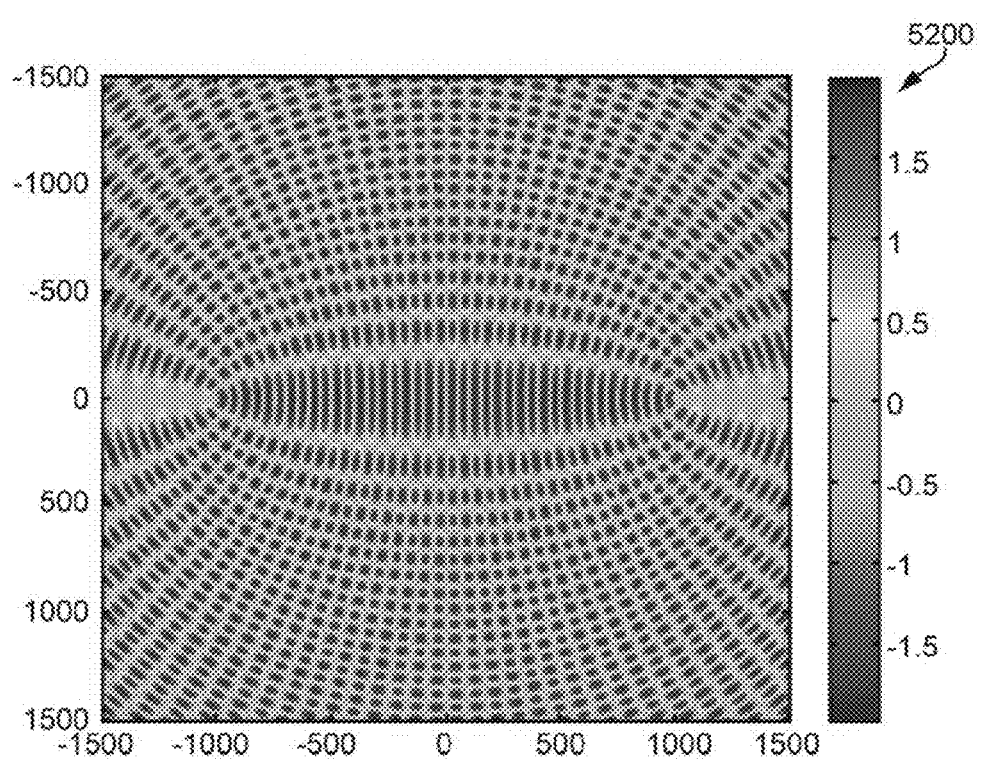
FIG. 52 is a plot of an example wave pattern where d=20λ and φ=π.

FIG. 52 is a plot 5200 of an example wave pattern where d=20λ and ϕ=π.

Figure 53:
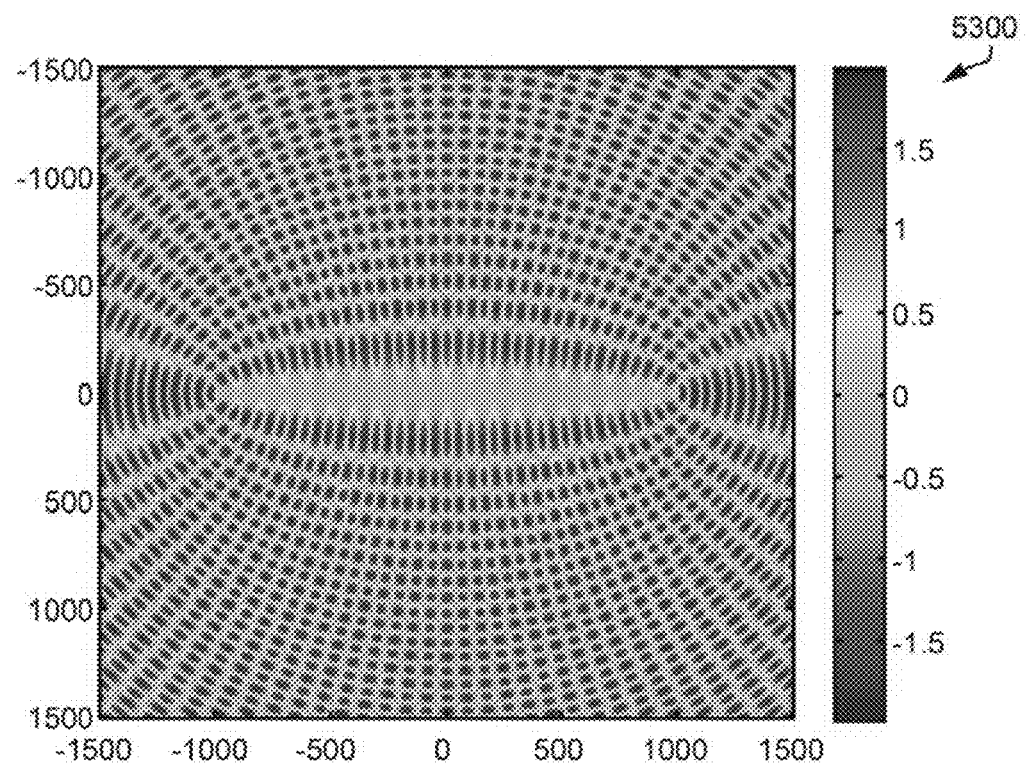
FIG. 53 is a plot of an example wave pattern where d=20λ and φ=2π.

FIG. 53 is a plot 5300 of an example wave pattern where d=20λ and ϕ=2π.

FIG. 53 shows that the two oscillators interfere in such a way that the energy flows from the left to the one on the right.

Figure 54:
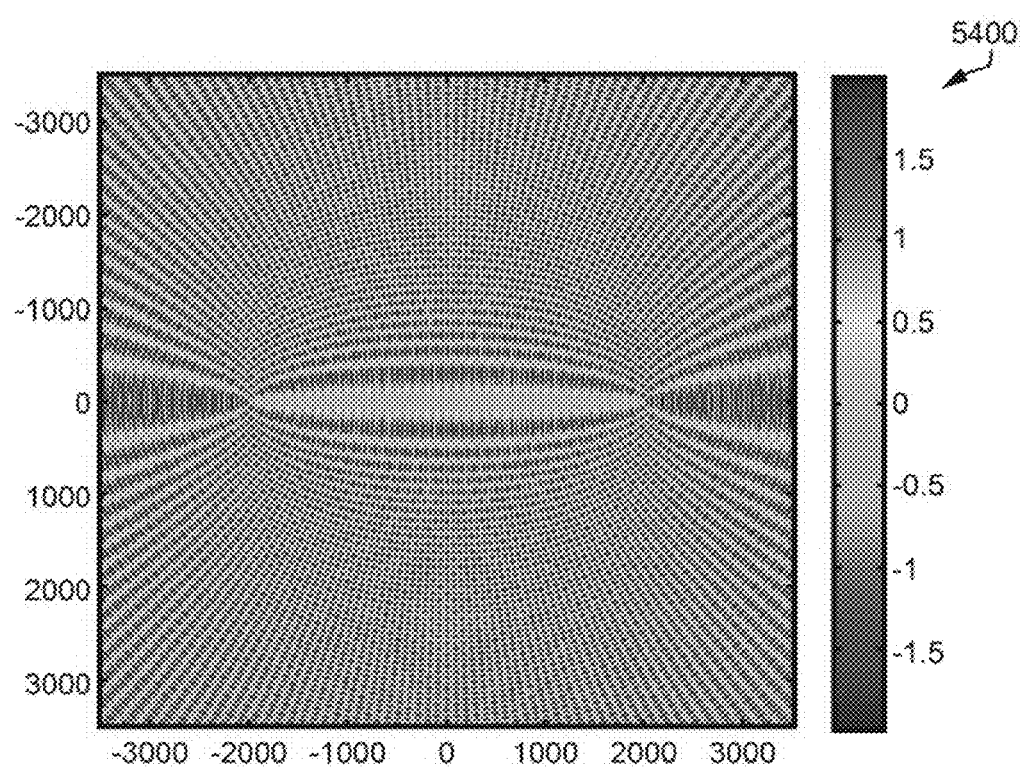
FIG. 54 is a plot of an example wave pattern where d=40λ and φ=2π.

FIG. 54 is a plot 5400 of an example wave pattern where d=40λ and ϕ=2π.

Figure 55:
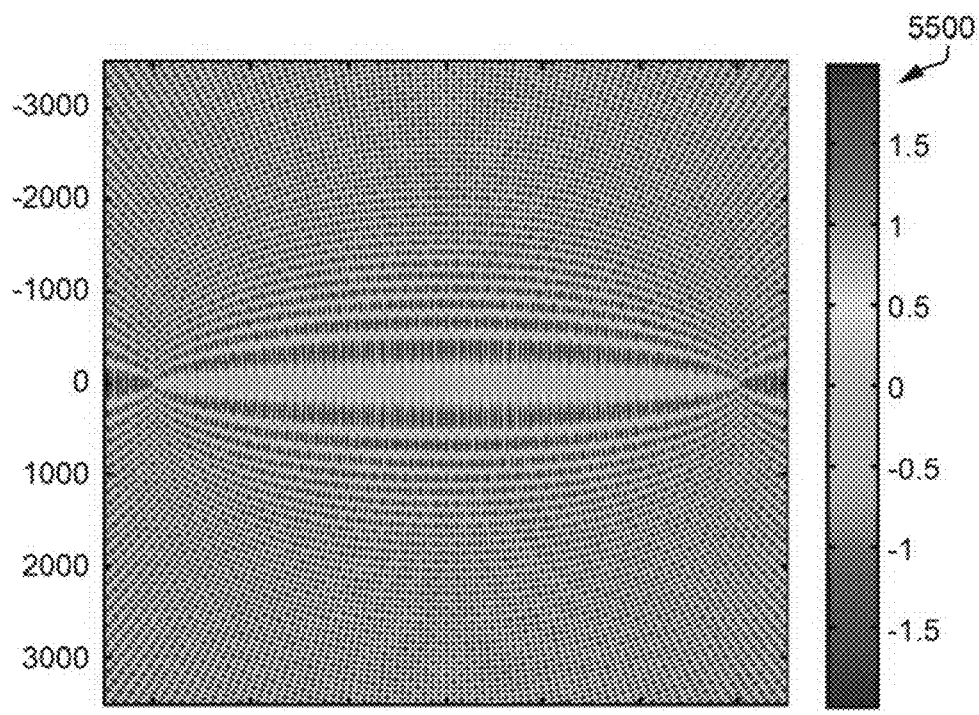
FIG. 55 is a plot of an example wave pattern where d=60λ and φ=2π.

FIG. 55 is a plot 5500 of an example wave pattern where d=60λ and ϕ=2π.

From these graphs, we can see that the overall pattern remains the same for greater separation distances.

Figure 56:
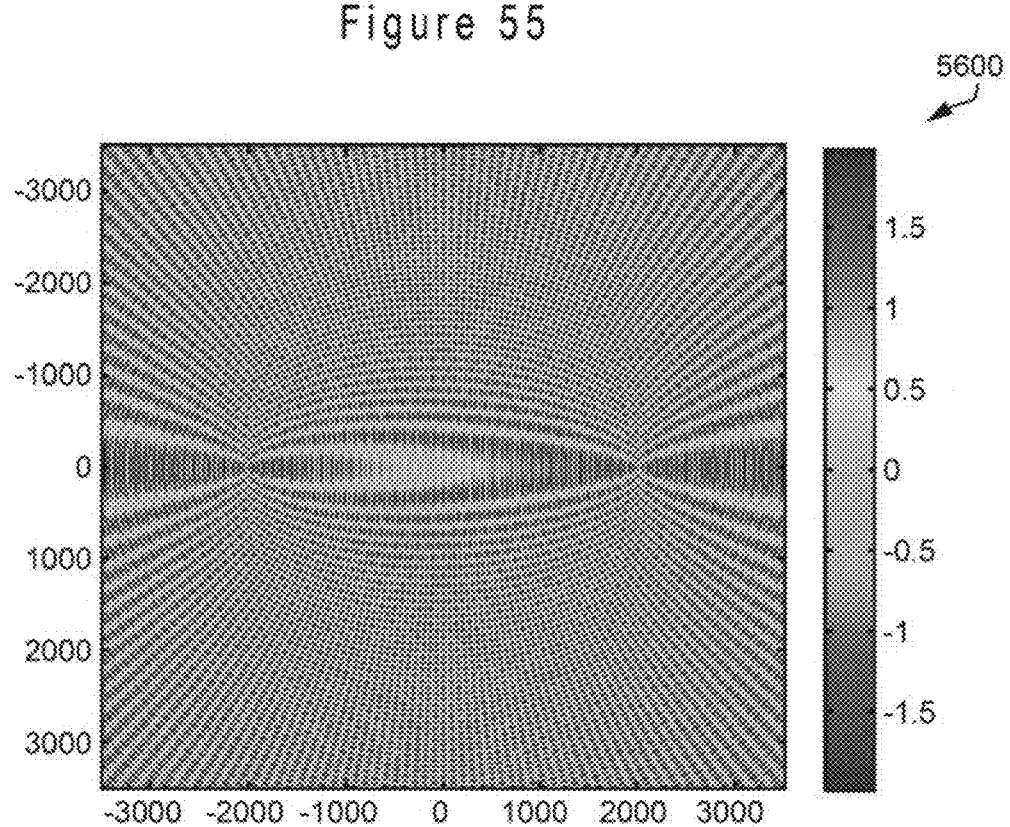
FIG. 56 is a plot of an example time dependent wave pattern for d=40λ and φ=2π.

FIG. 56 is a plot 5600 of an example time dependent wave pattern for d=40λ and ϕ=2π.

Figure 57:
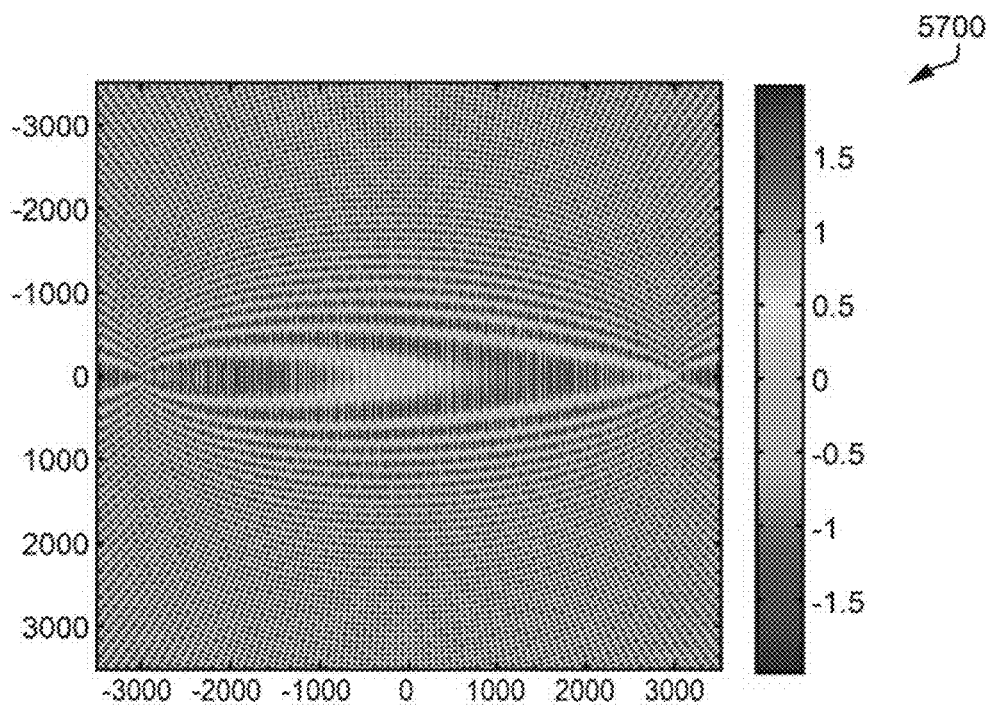
FIG. 57 is a plot of an example time dependent wave pattern for d=60λ and φ=2π.

FIG. 57 is a plot 5700 of an example time dependent wave pattern for d=60λ and ϕ=2π.

Figure 58:
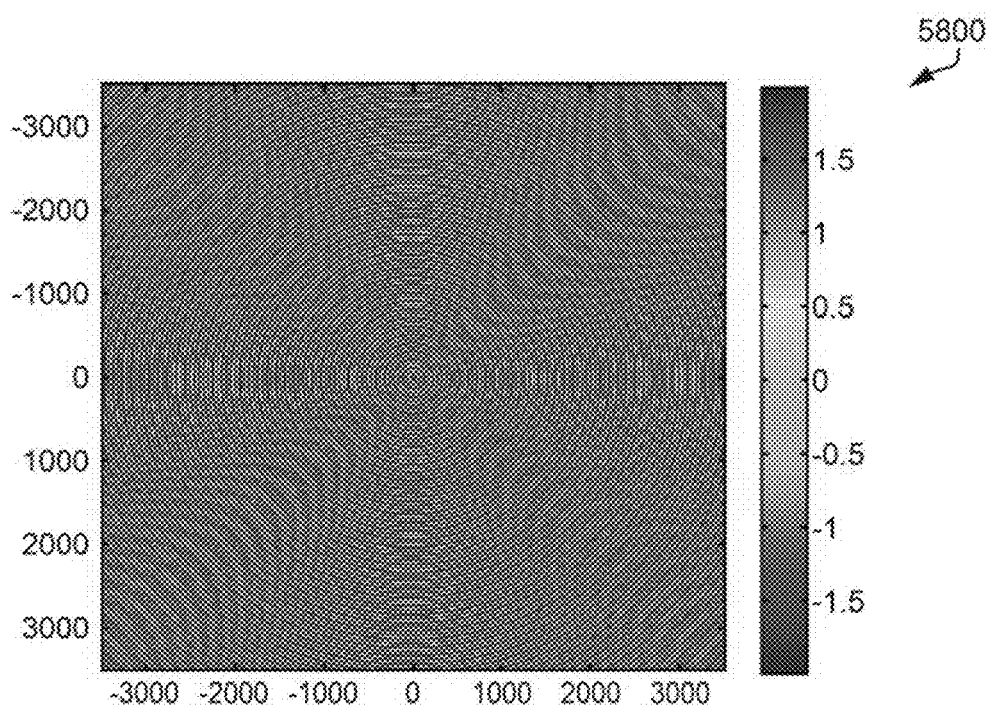
FIG. 58 is a plot of an example wave pattern for a single source with no phase shift.

FIG. 58 is a plot 5800 of an example wave pattern for a single source with no phase shift.

Figure 59:
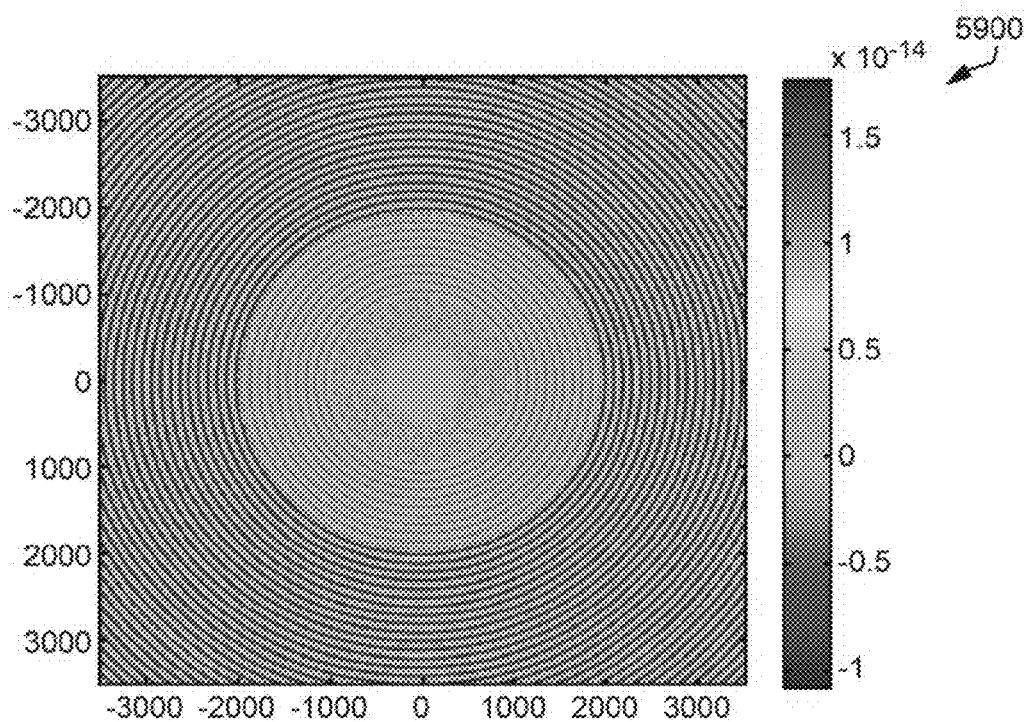
FIG. 59 is a plot of an example wave pattern where d=0 and φ=π.

FIG. 59 is a plot 5900 of an example wave pattern where d=0 and ϕ=π.

The waves are cancelled within a radius of 2000 and then start to propagate weakly beyond that. The wave propagation is $10^{-14}$ which is basically zero. Thus, there are no waves in the far field.

Figure 60:
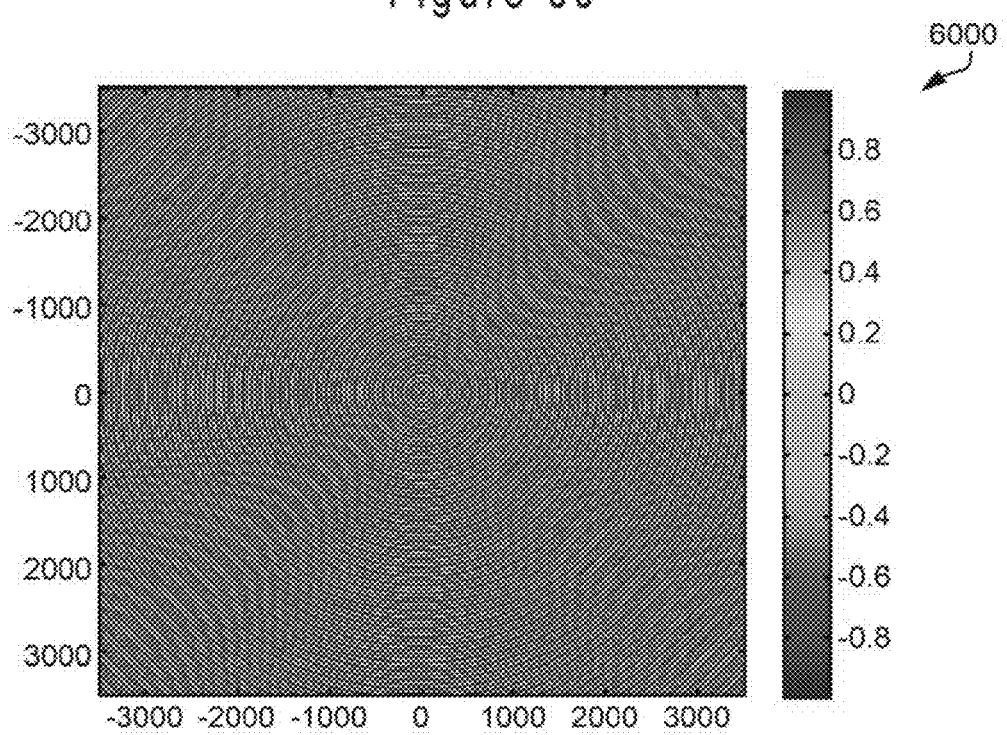
FIG. 60 is a plot of an example wave pattern for d=0, φ=π, and one of the amplitudes is 2.

FIG. 60 is a plot 6000 of an example wave pattern for d=0, ϕ=π, and one of the amplitudes is 2.

Figure 61:
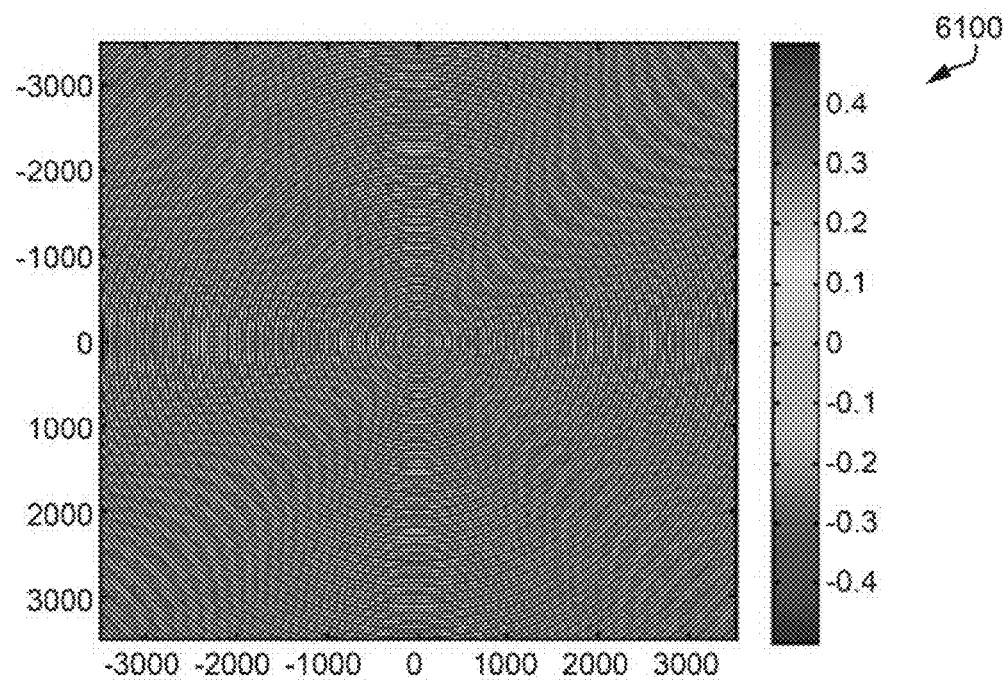
FIG. 61 is a plot of an example wave pattern for d=0, φ=π, and one of the amplitudes is 0.5.

FIG. 61 is a plot 6100 of an example wave pattern for d=0, ϕ=π, and one of the amplitudes is 0.5.

When the amplitudes of the two sources are different, they act as one source even if they are out of phase.

Next we calculate the power at different points from the origin in phase and out of phase. Since we have the intensity, we can calculate the power using the following equation:

$$P = \int I dA \quad (88)$$

where the area is $4\pi(R)^2$.

Figure 62:
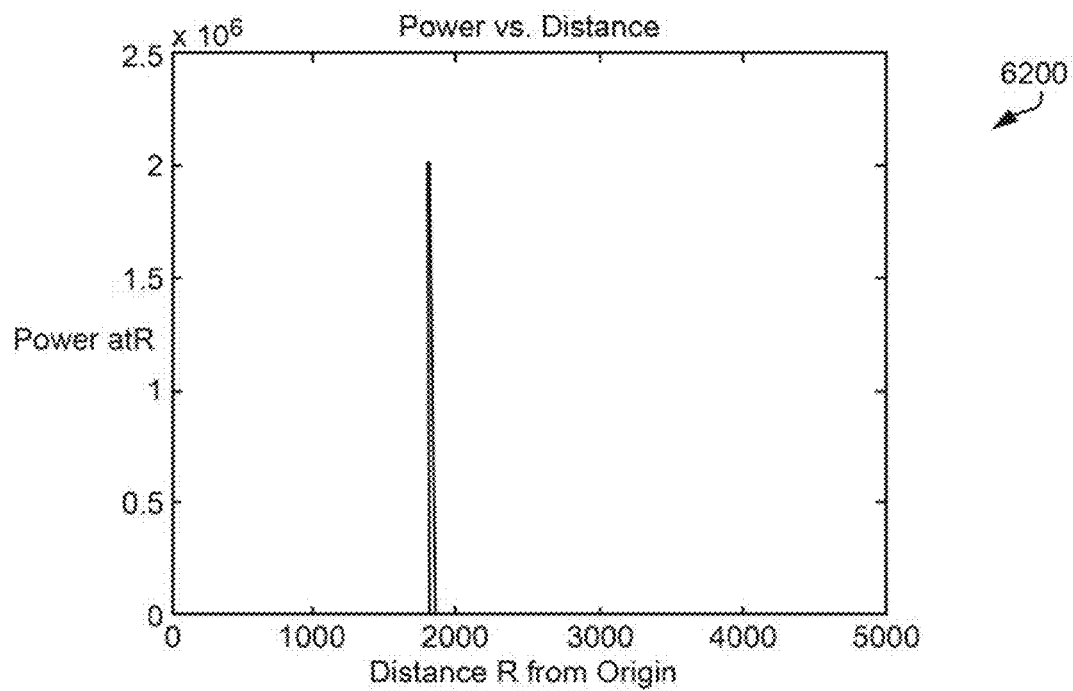
FIG. 62 is a plot of an example power for two sources at a distance R from the origin.

FIG. 62 is a plot 6200 of an example power for two sources at a distance R from the origin.

Figure 63:
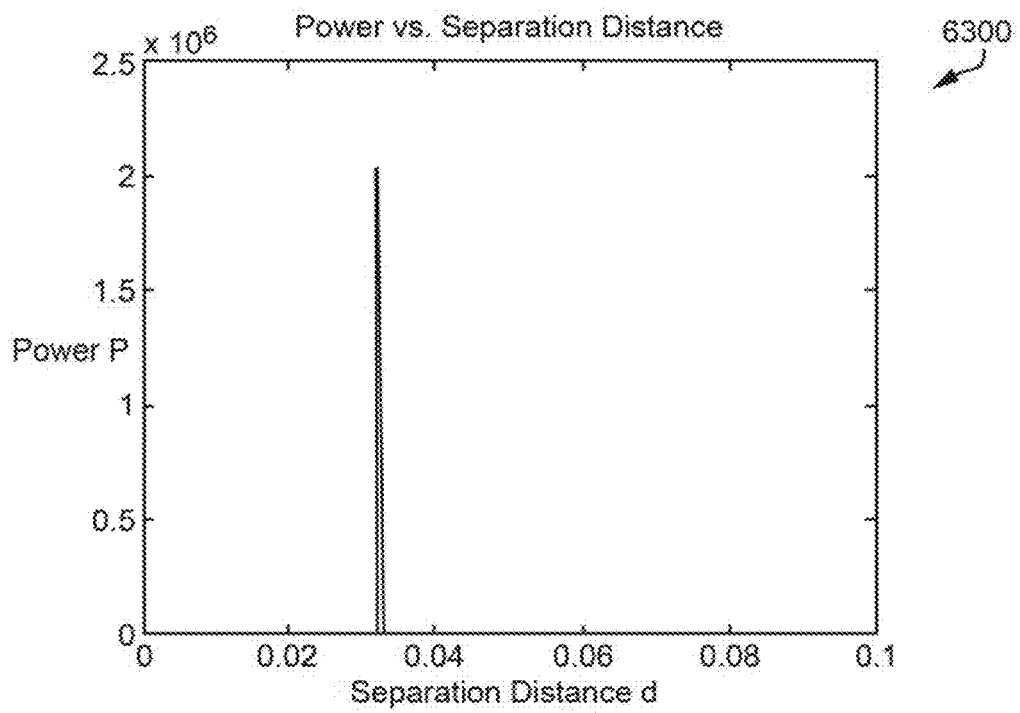
FIG. 63 is a plot of an example normalized power at a distance R from the origin as a function of the separation distance between the two oscillators.

FIG. 63 is a plot 6300 of an example normalized power at a distance R from the origin as a function of the separation distance between the two oscillators.

The maximum power occurs when $d=6.34d_0$. A smaller peak occurs at $d=3.18d_0$. MATLAB has been known to shift my graphs slightly so these can very well be at $d=\pi d_0$ and $d=2\pi d_0$.

We derived an analytical solution to determine the maximum values for d using the small angle approximation. The intensity for the two-slit interference is $$I_2 = 2A^2 \cos^2\left(\frac{2\pi d \sin\theta}{\lambda}\right) \quad (89)$$

where A is the amplitude of the waves.

Figure 64:
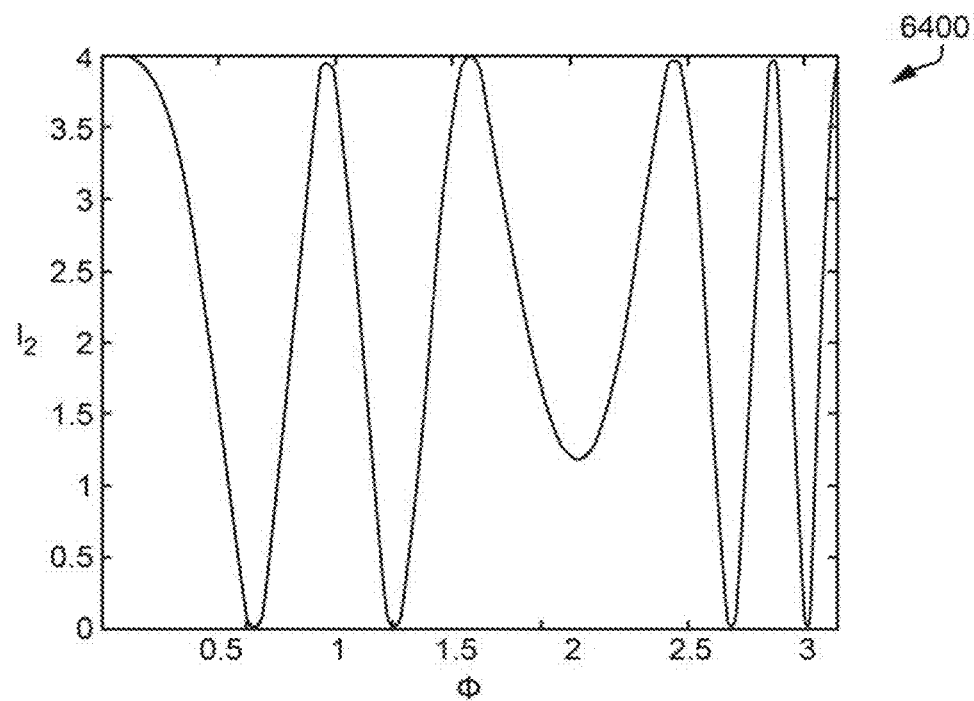
FIG. 64 is a plot of an example of Equation 89 plotted from θ=0 to θ=π.

FIG. 64 is a plot 6400 of an example of Equation 89 plotted from $\theta=0$ to $\theta=\pi$.

For a single source (d=0), $I_1=4I_0$, Therefore, the ratio between intensities is $$\frac{I_2}{I_1} = \cos^2\left(\frac{2\pi d \sin\theta}{\lambda}\right) \quad (90)$$

This ratio is plotted below.

Figure 65:
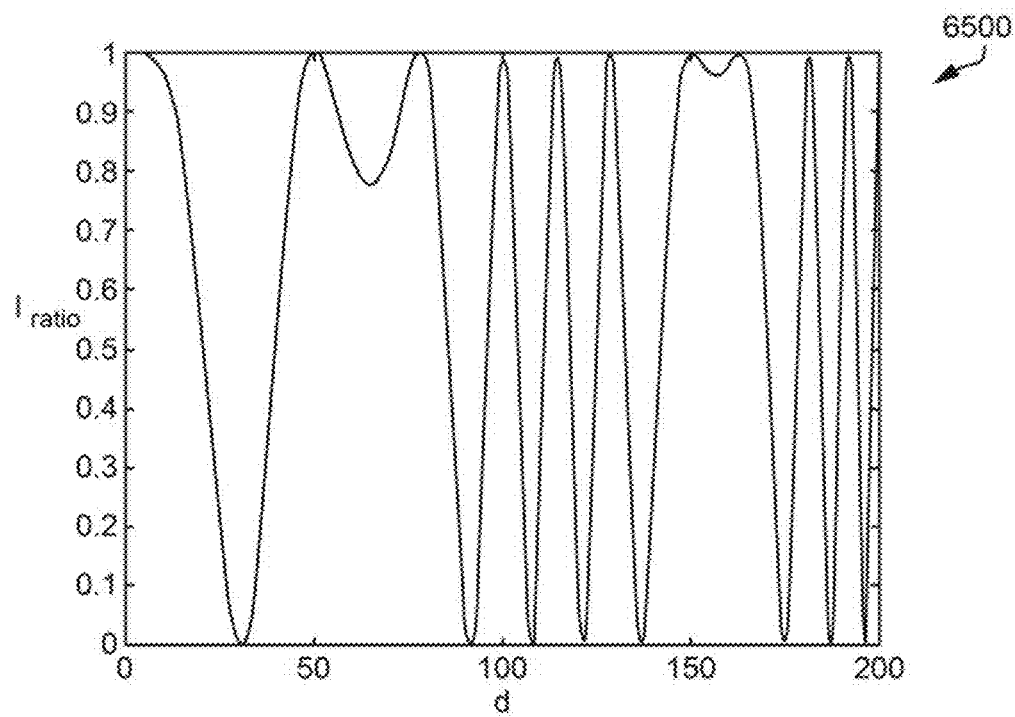
FIG. 65 is a plot of an example of general two-slit intensity ratios from Equation 90.

FIG. 65 is a plot 6500 of an example of general two-slit intensity ratios from Equation 90.

To determine the maximum d's, we differentiate the ratio with respect to d and set that result equal to zero.

$$\frac{d\left(\frac{I_2}{I_1}\right)}{dd} = -2\sin\left(\frac{2\pi d \sin(\theta)}{\lambda}\right)\cos\left(\frac{2\pi d \sin(\theta)}{\lambda}\right)\left(\frac{2\pi \sin(\theta)}{\lambda}\right) = 0 \quad (91)$$

From this relationship, the derivative is zero when $$\frac{2\pi d \sin(\phi)}{\lambda} = \frac{n\pi}{2} \quad (92)$$

where n is an integer and $\phi$ is the phase shift. Thus, d is a maximum when $$d = \frac{n\lambda}{4\sin(\phi)} \quad (93)$$

where $$\phi = \tan^{-1}\left(\frac{y}{x}\right).$$

Figure 66:
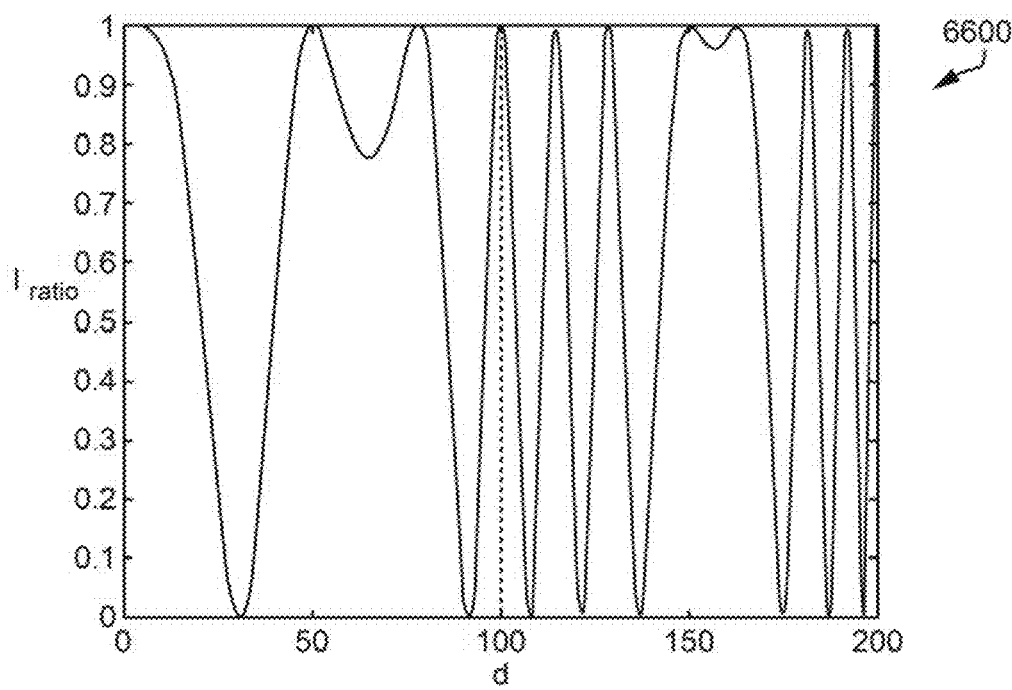
FIG. 66 is a plot of an example general two-slit intensity ratio (Eq. 90) with maximum (Eq. 93).

FIG. 66 is a plot 6600 of an example general two-slit intensity ratio (Eq. 90) with maximum (Eq. 93).

Figure 67:
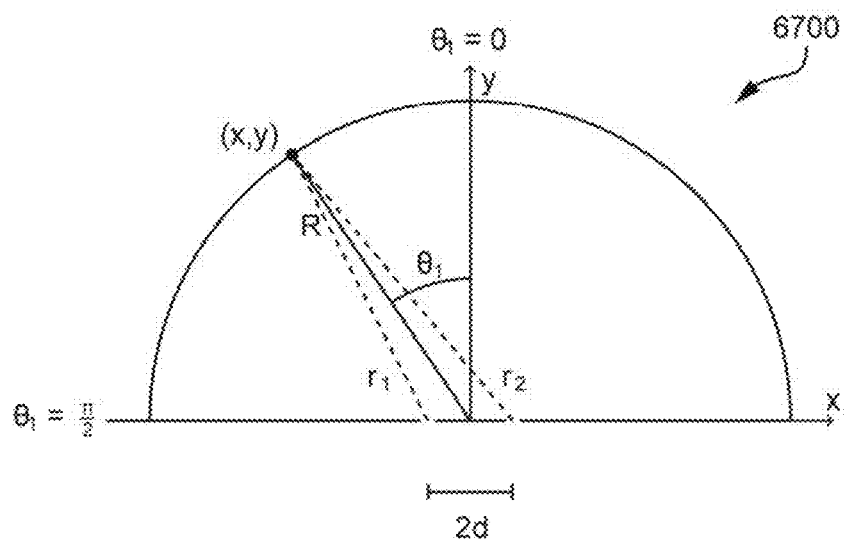
FIG. 67 is diagram of example two sources approximated as two slits.

FIG. 67 is diagram 6700 of example two sources approximated as two slits. The intensity is analyzed at a radial distance R from the origin. The slits are located at points (−d,0) and (d,0), with a separation distance of 2d. Now we analyze FIG. 67 the same way we analyze the two-slit case. Beginning with the law of cosines, we see that $$r_1^2 = R^2 + d^2 - 2dR\cos\left(\frac{\pi}{2} - \theta_1\right) \quad (94)$$

$$r_2^2 = R^2 + d^2 - 2dR\cos\left(\frac{\pi}{2} + \theta_1\right) \quad (95)$$

Using trig properties, $$r_1^2 = R^2 + d^2 - 2dR\sin\theta_1 \quad (96)$$

$$r_2^2 = R^2 + d^2 + 2dR\sin\theta_1 \quad (97)$$

Subtracting Equation 96 from Equation 97 yields $$r_2^2 - r_1^2 = 4dR\sin\theta_1 \quad (98)$$

In the limit R>>d, $r_1+r_2 \approx 2R$. Therefore, Equation 98 becomes $$r_2^2 - r_1^2 = (r_2+r_1)(r_2-r_1) \approx 2R(r_2-r_1) = 4dR\sin\theta_1 \quad (99)$$

Thus, the path difference is $$\delta = r_2 - r_1 = 2d\sin\theta_1 \quad (1000)$$

For our specific case where the superposition of the waves is $$S_{wave} = \sin(k\sqrt{(x+d)^2+y^2} - \omega t) + \sin(k\sqrt{(x-d)^2+y^2} - \omega t + \phi) \quad (101)$$

Suppose we want to know the intensity at a given radius as in FIG. 59. We see that $$x = -R\sin\theta \quad (102)$$

$$y = R\cos\theta$$

Plugging into Equation 104 we get $$S_{wave} = \sin(k\sqrt{R^2+2dR\sin\theta+d^2} - \omega t) + \sin(k\sqrt{R^2-2dR\sin\theta+d^2} - \omega t + \phi) \quad (103)$$

But the position term is the same as the law of cosines we derived earlier. Substituting Equation 96 and 97 in, we see that $$S_{wave} = \sin(kr_2 - \omega t) + \sin(kr_1 - \omega t + \phi) \quad (104)$$

The complete superposition is $$S_r = \frac{A\sin(kr_2 - \omega t)}{r_2} + \frac{A\sin(kr_1 - \omega t + \phi)}{r_1} \quad (105)$$

where A is the amplitude of the waves. This equation can be expanded to $$S_r = A\left(\frac{\sin(kr_2 - \omega t)}{r_2} + \frac{\sin(kr_1 - \omega t)\cos\phi}{r_1} + \frac{\cos(kr_1 - \omega t)\sin\phi}{r_1}\right) \quad (106)$$

Taking the square of Equation 106 gives $$S_r^2 = A\left(\frac{\sin^2\phi\cos^2(kr_1 - \omega t)}{r_1^2} + \frac{\cos^2\phi\sin^2(kr_1 - \omega t)}{r_1^2} + \frac{2\sin\phi\cos\phi\sin(kr_1 - \omega t)\cos(kr_1 - \omega t)}{r_1^2} + \frac{2\sin\phi\cos(kr_1 - \omega t)\sin(kr_2 - \omega t)}{r_1 r_2} + \frac{2\cos\phi\sin(kr_1 - \omega t)\sin(kr_2 - \omega t)}{r_1 r_2} + \frac{\sin^2(kr_2 - \omega t)}{r_2^2}\right) \quad (107)$$

The intensity is proportional to the time-averaged square of $S_r$.

$$I_r = A^2 <S_r^2> = \\ A^2\left[\frac{1}{2r_1^2} + \frac{1}{2r_2^2} + \frac{\sin\phi\sin(k(r_1-r_2)) + \cos\phi\cos(k(r_1-r_2))}{r_1 r_2}\right] \quad (108)$$

Thus, $$I_r = A^2\left[\frac{1}{2r_1^2} + \frac{1}{2r_2^2} + \frac{\cos(k(r_2-r_1)+\phi)}{r_1 r_2}\right] \quad (109)$$

Now, using Equation 96

$$\frac{1}{r_1^2} = \frac{1}{R^2 + d^2 - 2dR\sin\theta} = \\ \frac{1}{R^2\left(1+\left(\frac{d}{R}\right)^2 - 2\left(\frac{d}{R}\right)\sin\theta\right)} = \frac{1}{R^2}\left[1+\left(\frac{d}{R}\right)^2 - 2\left(\frac{d}{R}\right)\sin\theta\right]^{-1} \quad (110)$$

Recalling our original assumption that R>>d, we can make the following Taylor expansion.

$$\frac{1}{r_1^2} \approx \frac{1}{R^2}\left[1 + 2\left(\frac{d}{R}\right)\sin\theta - \left(\frac{d}{R}\right)^2\right] \approx \frac{1+2\left(\frac{d}{R}\right)\sin\theta}{R^2} \quad (111)$$

Similarly, $$\frac{1}{r_2^2} \approx \frac{1-2\left(\frac{d}{R}\right)\sin\theta}{R^2} \quad (112)$$

Now looking at the third term in Equation 109

$$\frac{1}{r_1 r_2} = \frac{1}{\sqrt{(R^2+d^2-2dR\sin\theta)(R^2+d^2+2dR\sin\theta)}} \quad (113) \\ = \frac{1}{\sqrt{R^4 + d^4 + 2d^2 R^2 \cos(2\theta)}} \\ = \frac{1}{\sqrt{R^4\left(1+\left(\frac{d}{R}\right)^4 + 2\left(\frac{d}{R}\right)^2\cos 2\theta\right)}} \\ = \frac{1}{R^2\sqrt{1+\left(\frac{d}{R}\right)^4 + 2\left(\frac{d}{R}\right)^2\cos 2\theta}} \\ = \frac{1}{R^2}\left[1+\left(\frac{d}{R}\right)^4 + 2\left(\frac{d}{R}\right)^2\cos 2\theta\right]^{-\frac{1}{2}} \\ \approx \frac{1}{R^2}\left[1-\frac{1}{2}\left(\frac{d}{R}\right)^4 - \left(\frac{d}{R}\right)^2 \cos 2\theta\right] \\ \approx \frac{1-\left(\frac{d}{R}\right)^2 \cos 2\theta}{R^2}$$

Substituting these in for Equation 109 gives $$I_r = A^2\left[\frac{1+2\left(\frac{d}{R}\right)\sin\theta}{2R^2} + \frac{1-2\left(\frac{d}{R}\right)\sin\theta}{2R^2} + \right. \\ \frac{\left(1-\left(\frac{d}{R}\right)^2\cos 2\theta\right)\cos(2kd\sin\theta)\cos\phi}{R^2} - \\ \left.\frac{\left(1-\left(\frac{d}{R}\right)^2\cos 2\theta\right)\sin(2kd\sin\theta)\sin\phi}{R^2}\right] \quad (114) \\ = A^2\left[\frac{1}{R^2} + \frac{\cos(2dk\sin\theta)\cos\phi - \sin\phi\sin(2kd\sin\theta)}{R^2} - \right. \\ \left.\frac{\left(\frac{d}{R}\right)^2\cos 2\theta\cos(2kd\sin\theta+\phi)}{R^2}\right] \\ = A^2\left[\frac{1}{R^2} + \frac{\left(1-\left(\frac{d}{R}\right)^2\cos 2\theta\right)\cos(2kd\sin\theta+\phi)}{R^2}\right] \\ \approx \frac{A^2}{R^2}[1+\cos(2kd\sin\theta+\phi)] = \frac{2A^2}{R^2}\cos^2\left(kd\sin\theta + \frac{\phi}{2}\right) \\ = \frac{I_0}{R^2}\cos^2\left(kd\sin\theta + \frac{\phi}{2}\right)$$

Thus, $$I_r = \frac{I_0}{R^2}\cos^2\left(kd\sin\theta + \frac{\phi}{2}\right) \quad (115)$$

Spherical Waves

In this section we assume that our waves are in 3 dimensions and are spherical in form. The monochromatic wave form is $$u(r,t) = \frac{A}{r}e^{i(kr-\omega t)} \quad (116)$$

The intensity is just $$I = |u(r,t)|^2 = \frac{A^2}{r^2} \quad (117)$$

assuming A is real. For a superposition of two sources on top of each other, $$S = \frac{A}{r}e^{i(kr-\omega t)} + \frac{A}{r}e^{i(kr-\omega t+\phi)} \quad (118)$$

Then the intensity for these two wave is $$I_S = |S|^2 \quad (119) \\ = \frac{A^2}{r^2}[e^{i(kr-\omega t)} + e^{i(kr-\omega t+\phi)}][e^{-i(kr-\omega t)} + e^{-i(kr-\omega t+\phi)}] \\ = \frac{A^2}{r^2}\left[\begin{array}{l}e^{i(kr-\omega t)}e^{-i(kr-\omega t)} + e^{i(kr-\omega t+\phi)}e^{-i(kr-\omega t)} + \\ e^{i(kr-\omega t)}e^{-i(kr-\omega t+\phi)} + e^{i(kr-\omega t+\phi)}e^{-i(kr-\omega t+\phi)}\end{array}\right] \\ = \frac{A^2}{r^2}[1 + e^{ikr-i\omega t+i\phi-ikr+i\omega t} + e^{ikr-i\omega t-ikr+i\omega t-i\phi} + 1]$$

$$I_S = \frac{A^2}{r^2}[1 + 1 + e^{i\phi} + e^{-i\phi}] = \frac{2A^2}{r^2}[1 + \cos\phi] \quad (120)$$

The limiting cases here are when $\phi=0$, in which case we get four times the intensity in Equation 117, and when $\phi=\pi$, in which case we get zero intensity.

Now for our case where the two sources are not on top of each other. The positions of the two sources in 3 dimensions become $$x = -R\sin\theta_2\sin\theta_1$$
$$y = R\sin\theta_2\cos\theta_1 \quad (121)$$
$$z = R\cos\theta_2$$
$$r = \sqrt{x^2 + y^2 + z^2}$$

$$r_1 = \sqrt{(x-d)^2 + y^2 + z^2} = \sqrt{R^2 - 2dR\sin\theta_2\sin\theta_1 + d^2} \quad (122)$$

$$r_2 = \sqrt{(x+d)^2 + y^2 + z^2} = \sqrt{R^2 + 2dR\sin\theta_2\sin\theta_1 + d^2} \quad (123)$$

In that case, our superposition of the two waves is $$S_r = \frac{A}{r_1}e^{i(kr_1 - \omega t + \phi)} + \frac{A}{r_2}e^{i(kr_2 - \omega t)} \quad (124)$$

where $r_1$ and $r_2$ are given by Equation 122 and Equation 123, respectively.

$$|S_r|^2 = A^2\left[\frac{e^{i(kr_1-\omega t+\phi)}}{r_1} + \frac{e^{i(kr_2-\omega t)}}{r_2}\right]\left[\frac{e^{-i(kr_1-\omega t+\phi)}}{r_1} + \frac{e^{-i(kr_2-\omega t)}}{r_2}\right] \quad (125)$$

$$= A^2\left[\frac{1}{r_1^2} + \frac{e^{i(kr_1-\omega t+\phi)}e^{-i(kr_2-\omega t)}}{r_1 r_2} + \frac{e^{i(kr_2-\omega t)}e^{-i(kr_1-\omega t+\phi)}}{r_1 r_2} + \frac{1}{r_2^2}\right]$$

$$|S_r|^2 = A^2\left[\frac{1}{r_1^2} + \frac{e^{i(k(r_1-r_2)+\phi)}}{r_1 r_2} + \frac{e^{i(k(r_2-r_1)-\phi)}}{r_1 r_2} + \frac{1}{r_2^2}\right] \quad (126)$$

$$|S_r|^2 = A^2\left[\frac{1}{r_1^2} + \frac{1}{r_2^2} + \frac{e^{-i(k(r_2-r_1)-\phi)}}{r_1 r_2} + \frac{e^{i(k(r_2-r_1)-\phi)}}{r_1 r_2}\right] \quad (127)$$

Using Euler's formula, we see that $$e^{i(k(r_2-r_1)-\phi)} + e^{-i(k(r_2-r_1)-\phi)} = 2\cos(k(r_1-r_2)-0) \quad (128)$$

Therefore, the final intensity for two sources is $$I_r = |S_r|^2 = A^2\left[\frac{1}{r_1^2} + \frac{1}{r_2^2} + \frac{2\cos(k(r_2-r_1)-\phi)}{r_1 r_2}\right] \quad (129)$$

Here, the limiting case is when $r_1=r_2$. When that happens, we reproduce Equation 120 just as expected. The path difference in 3D is $$r_2^2 - r_1^2 = (r_2+r_1)(r_2-r_1) = 4dR\sin\theta_2\sin\theta_1 \quad (130)$$

In the limit where $R\gg d$, $r_2+r_1 \approx 2R$. Therefore, $$r_2^2 - r_1^2 \approx 2R(r_2-r_1) = 4dR\sin\theta_2\sin\theta_1 \quad (131)$$

Thus, the new path difference is $$r_2 - r_1 = 2d\sin\theta_2\sin\theta_1 \quad (132)$$

$$I_r = A^2\left[\frac{1}{r_1^2} + \frac{1}{r_2^2} + \frac{2\cos(2kd\sin\theta_1\sin\theta_2 - \phi)}{r_1 r_2}\right] \quad (133)$$

Recalling our earlier assumption that $R\gg d$, we can use Equation 111, Equation 113, Equation 112 to reduce Equation 133 to $$I_R = \frac{4A^2}{R^2}\cos^2\left(kd\sin\theta_1\sin\theta_2 - \frac{\phi}{2}\right) \quad (134)$$

When Equation 134 has a separation distance $d=0$, the tow sources are on top of each other and we reproduce Equation 120 at a radius $r=R$. If $\phi=\pi$ when $d=0$, then we see that $I_r=0$.

Figure 68:
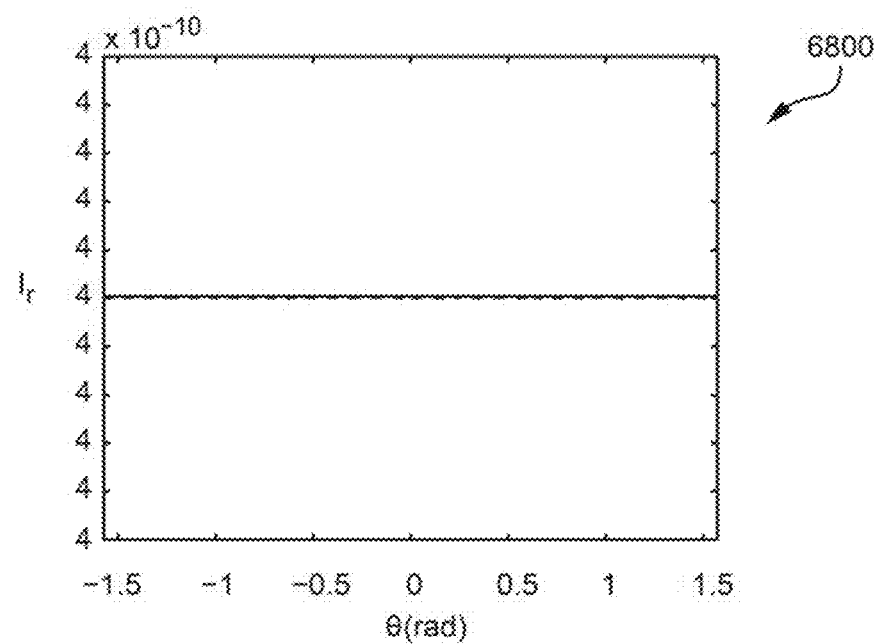
FIG. 68 is an example graph showing Equation 124 and Equation 133 plotted as the dashed and solid lines, respectively.

FIG. 68 is an example graph 6800 showing Equation 124 and Equation 133 plotted as the dashed and solid lines, respectively. In this case, A=1, $\lambda=100$, $k=2\pi/\lambda$, and $\omega=k$. Equation 122 and Equation 123 give the equations for $r_1$ and $r_2$, respectively, where $R=1000\lambda$ and $\theta_2=\pi/2$. For this plot, $d=0$ and $\phi=0$. Both lines are flat because when $d=0$, the $\theta$-dependence goes away and we're left with constant intensity, similar to Equation 120

Figure 69:
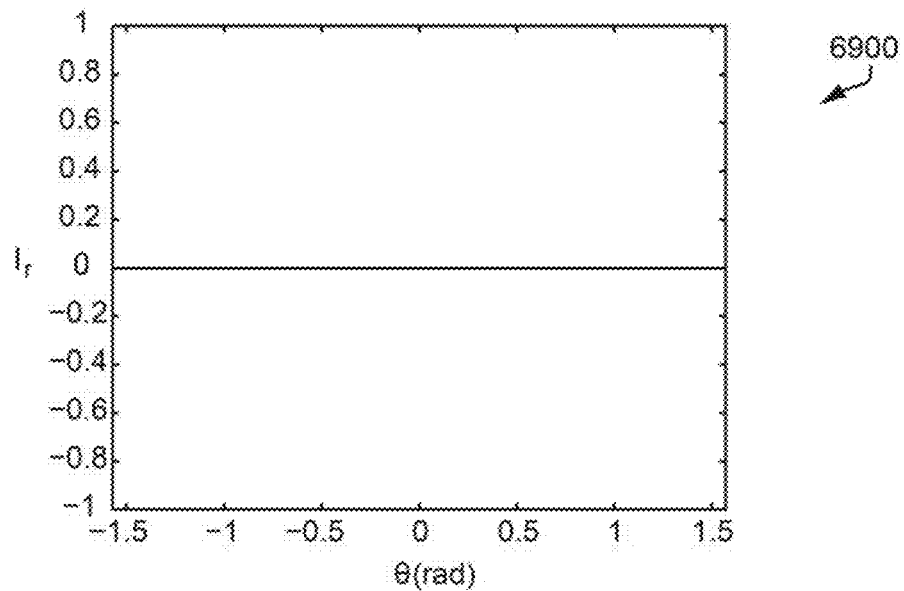
FIG. 69 is an example graph showing Equation 124 and Equation 133 plotted as the dashed and solid lines, respectively.

FIG. 69 is an example graph 6900 showing Equation 124 and Equation 133 plotted as the dashed and solid lines, respectively. In this case, A=1, $\lambda=100$, $k=2\pi/\lambda$, and $\omega=k$. Equation 122 and Equation 123 give the equations for $r_1$ and $r_2$, respectively, where $R=1000\lambda$ and $\theta_2=\pi/2$. For this plot, $d=0$ and $\phi=\pi$. Both lines are zero because we reproduce Equation 120 when $d=0$ and the waves cancel each other out.

Figure 70:
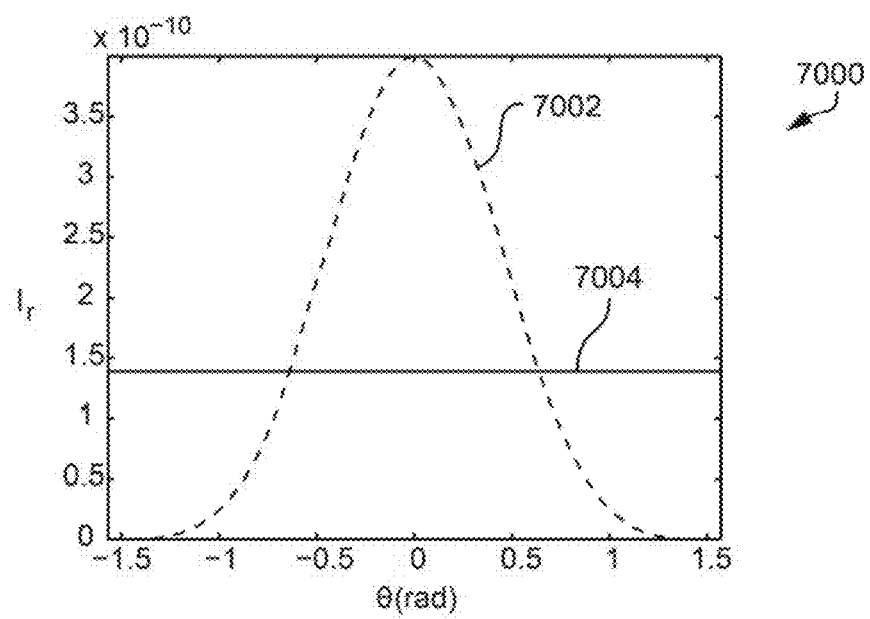
FIG. 70 is an example graph showing Equation 124 and Equation 133 plotted as the dashed and solid lines, respectively.

FIG. 70 is an example graph 7000 showing Equation 124 and Equation 133 plotted as dashed line 7002 and solid line 7004, respectively. In this case, A=1, $\lambda=100$, $k=2\pi/\lambda$, and $\omega=k$. Equation 122 and Equation 123 give the equations for $r_1$ and $r_2$, respectively, where $R=1000\lambda$ and $\theta_2=\pi/2$. For this plot, $d=\lambda/2$ and $\phi=0$.

However, the straight line in FIG. 70 is not really a straight line. In fact, it's actually sinusoidal but with a very small amplitude. A zoomed-in version of the graph is shown below.

Figure 71:
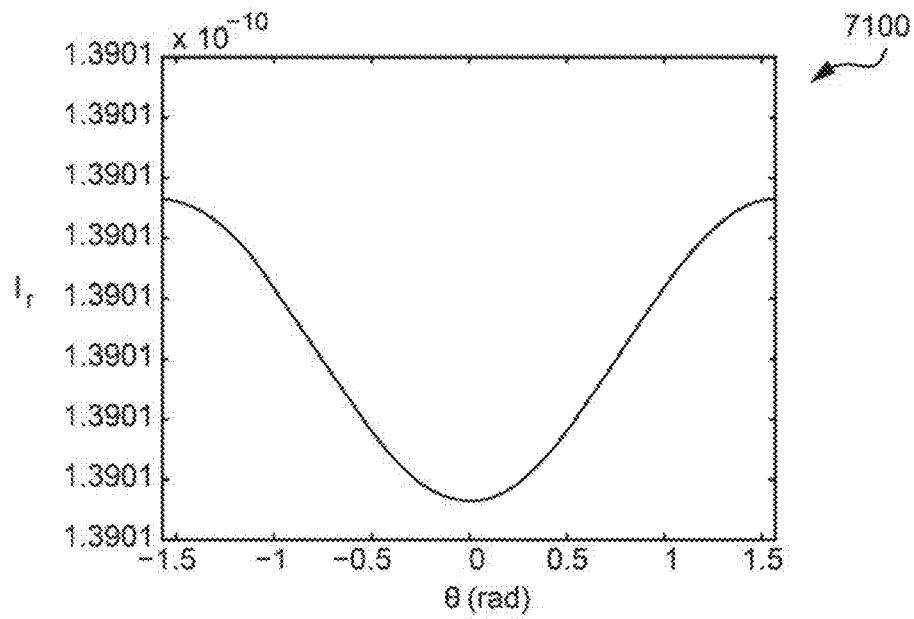
FIG. 71 is an example plot of Equation 133 where A=1, λ=100, k=2π/λ, and ω=k.

FIG. 71 is an example plot 7100 of Equation 133 where A=1, $\lambda=100$, $k=2\pi/\lambda$, and $\omega=k$. Equation 122 and Equation 123 give the equations for $r_1$ and $r_2$, respectively, where $R=1000\lambda$, and $\theta_2=\pi/2$. For this plot, $d=\lambda/2$ and $\phi=0$.

To test if these two plots really are the same, we can integrate Equation 124 and Equation 133 and expect the same total intensity as shown below $$I_{tot} = \int_{-\frac{\pi}{2}}^{\frac{\pi}{2}}\int_0^{\pi}|S_r|^2 R^2\sin\theta_2 d\theta_2 d\theta_1 = \int_{-\frac{\pi}{2}}^{\frac{\pi}{2}}\int_0^{\pi} I_r R^2\sin\theta_2 d\theta_2 d\theta_1 \quad (135)$$

where $\theta_2$ is the altitudal angle adjacent to the z-axis pointing out of the page in FIG. 6 and $\theta_1$ is the angle in the figure. Looking at the integrals for the graphs in FIG. 7 gives a result of $4.3716\times10^{-10}$ and $4.3672\times10^{-10}$, which have a percent error of 0.1006%, therefore the total intensities are basically the same.

Figure 72:
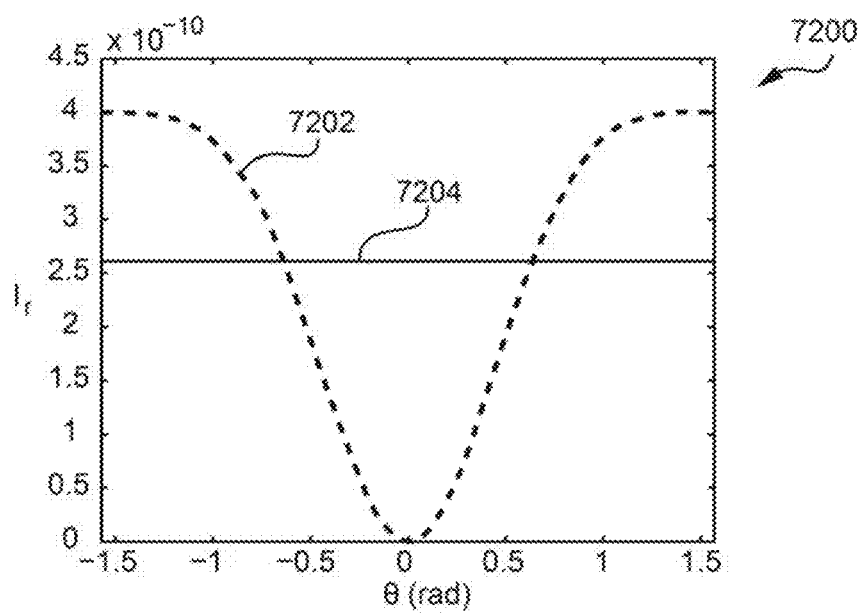
FIG. 72 is an example graph showing Equation 124 and Equation 133 plotted as the dashed and solid lines, respectively.

FIG. 72 is an example graph 7200 showing Equation 124 and Equation 133 plotted as the dashed line 7202 and solid line 7204, respectively. In this case, A=1, $\lambda=100$, $k=2\pi/\lambda$, and $\omega=k$. Equation 122 and Equation 123 give the equations for $r_1$ and $r_2$, respectively, where $R=1000\lambda$, and $\theta_2=\pi/2$. For this plot, $d=\lambda/2$ and $\phi=0$.

Again, the solid line is actually sinusoidal and can be seen in the figure below.

Figure 73:
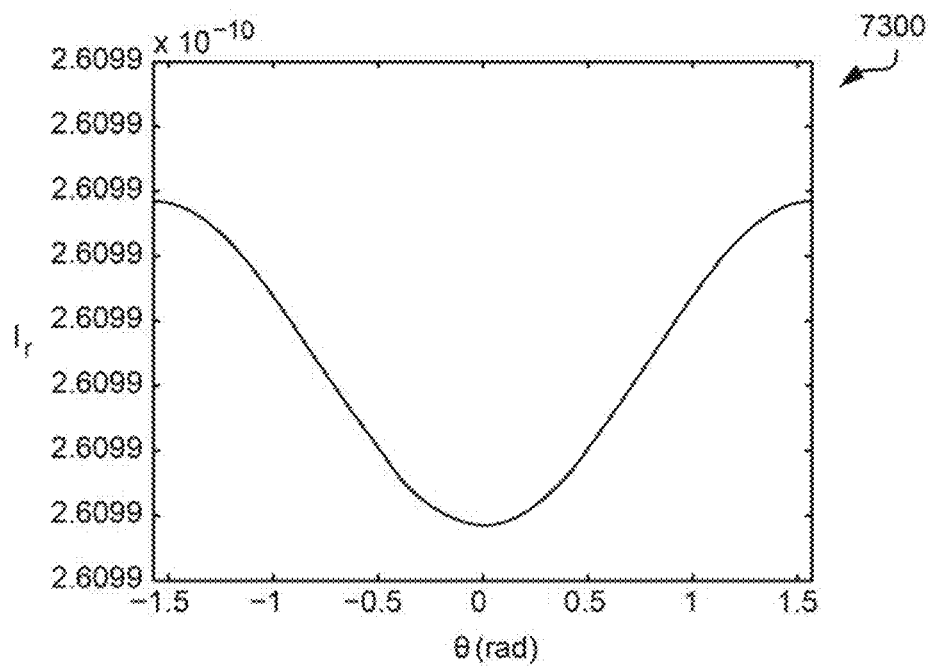
FIG. 73 is an example plot of Equation 133 where A=1, λ=100, k=2π/λ, and ω=k.

FIG. 73 is an example plot 7300 of Equation 133 where $A=1$, $\lambda=100$, $k=2\pi/\lambda$, and $\omega=k$. Equation 122 and Equation 123 give the equations for $r_1$ and $r_2$, respectively, where $R=1000\lambda$, and $\theta_2=\pi/2$. For this plot, $d=\lambda/2$ and $\phi=\pi$.

Comparing the total intensities using Equation 135, we get values of $8.1948\times10^{-10}$ and $8.1992\times10^{-10}$ having a percent error of 0.0537%.

Figure 74:
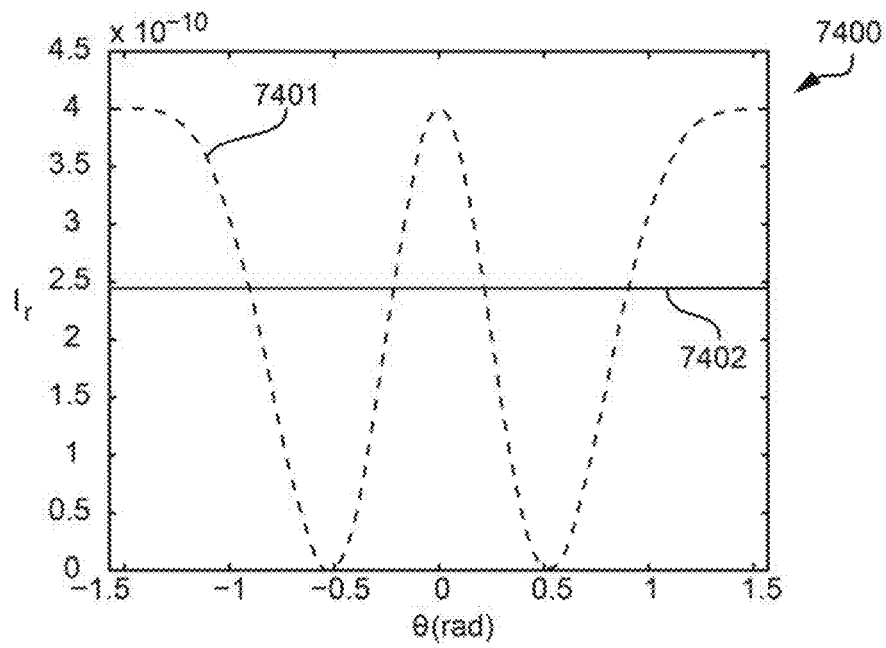
FIG. 74 is an example graph showing Equation 124 and Equation 133 plotted as the dashed and solid lines, respectively.

FIG. 74 is an example graph 7400 showing Equation 124 and Equation 133 plotted as the dashed line 7402 and solid line 7404, respectively. In this case, $A=1$, $\lambda=100$, $k=2\pi/\lambda$, and $\omega=k$. Equation 122 and Equation 123 give the equations for $r_1$ and $r_2$, respectively, where $R=1000\lambda$, and $\theta_2=\pi/2$. For this plot, $d=\lambda/2$ and $\phi=0$.

The solid line in the previous figure actually is sinusoidal again as shown below.

Figure 75:
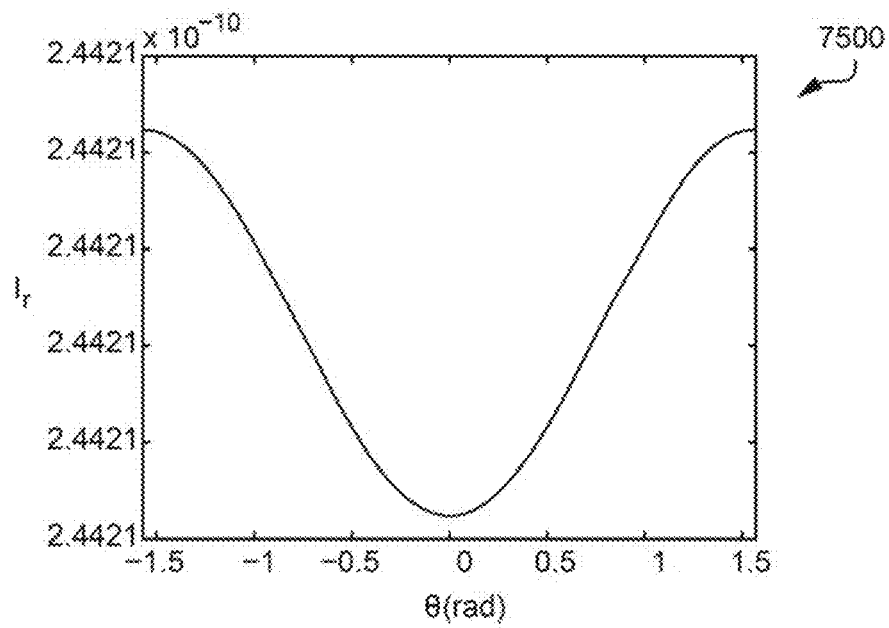
FIG. 75 is an example plot of Equation 133 where A=1, λ=100, k=2π/λ, and ω=k.

FIG. 75 is an example plot 7500 of Equation 133 where $A=1$, $\lambda=100$, $k=2\pi/\lambda$, and $\omega=k$. Equation 122 and Equation 123 give the equations for $r_1$ and $r_2$, respectively, where $R=1000\lambda$, and $\theta_2=\pi/2$. For this plot, $d=\lambda$ and $\phi=0$.

Repeating our previous comparison using Equation 135, we get total intensity values of $7.6672\times10^{-10}$ and $7.6721\times10^{-10}$, giving a percent error of 0.0643%.

Figure 76:
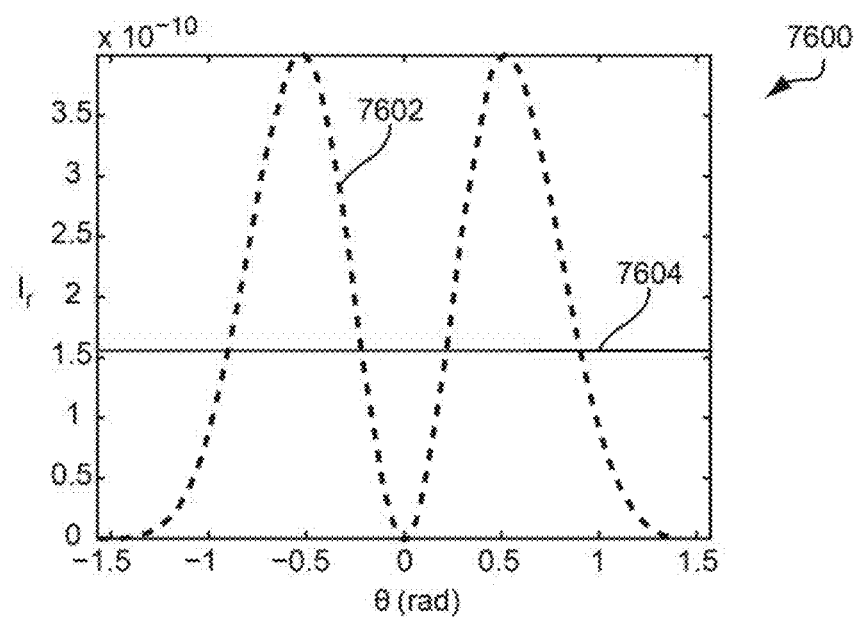
FIG. 76 is an example graph showing Equation 124 and Equation 133 plotted as the dashed and solid lines, respectively.

FIG. 76 is an example graph 7600 showing Equation 124 and Equation 133 plotted as the dashed line 7602 and solid line 7604, respectively. In this case, $A=1$, $\lambda=100$, $k=2\pi/\lambda$, and $\omega=k$. Equation 122 and Equation 123 give the equations for $r_1$ and $r_2$, respectively, where $R=1000\lambda$, and $\theta_2=\pi/2$. For this plot, $d=\lambda$ and $\phi=\pi$.

Once again, the solid line in the previous figure is actually sinusoidal, as showen below.

Figure 77:
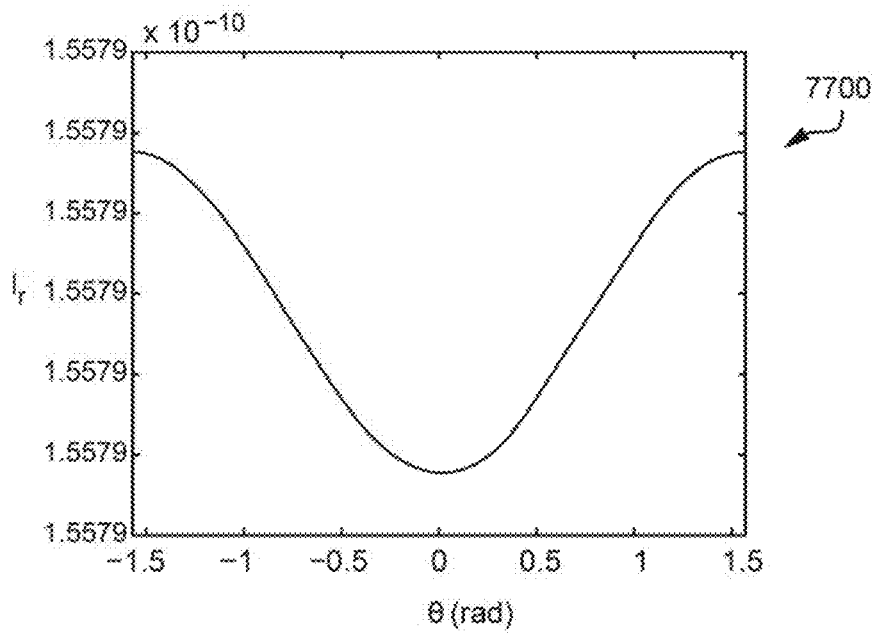
FIG. 77 is an example plot of Equation 133 where A=1, λ=100 k=2π/λ, and ω=k.

FIG. 77 is an example plot 7700 of Equation 133 where $A=1$, $\lambda=100$, $k=2\pi/\lambda$, and $\omega=k$. Equation 122 and Equation 123 give the equations for $r_1$ and $r_2$, respectively, where $R=1000\lambda$, and $\theta_2=\pi/2$. For this plot, $d=\lambda$ and $\phi=\pi$.

Using Equation 135, we get values of $4.8991\times10^{-10}$ and $4.8942\times10^{-10}$, and a percent error of 0.099%

We can derive an approximate analytical solution for the total intensity by integrating Equation 134 over a half-sphere.

$$I_{tot} = \int_{-\frac{\pi}{2}}^{\frac{\pi}{2}} \int_0^{\pi} \frac{2A^2}{R^2}[1+\cos(2kd\sin\theta_2\sin\theta_1 - \phi)]R^2\sin(\theta_2)d\theta_2 d\theta_1 \quad (136)$$

The R's cancel and the integral becomes $$I_{tot} = 2A^2 \int_{-\frac{\pi}{2}}^{\frac{\pi}{2}} \int_0^{\pi} \sin\theta_2 d\theta_2 d\theta_1 + \quad (137)$$

$$2A^2 \int_{-\frac{\pi}{2}}^{\frac{\pi}{2}} \int_0^{\pi} \cos(2kd\sin\theta_2\sin\theta_1 - \phi)\sin\theta_1 d\theta_2 d\theta_1$$

Thus, the total intensity is $$I_{tot} = 4\pi A^2 + 4A^2 \int_{-\frac{\pi}{2}}^{\frac{\pi}{2}} \int_0^{\pi} \cos(2kd\sin\theta_2\sin\theta_1 - \phi)d\theta_2 d\theta_1 \quad (138)$$

This integral can be split to separate the $\theta$ and $\phi$-dependence $$I_{tot} = 4\pi A^2 + 4A^2\cos\phi \int_{-\frac{\pi}{2}}^{\frac{\pi}{2}} \int_0^{\pi} \cos(2kd\sin\theta_2\sin\theta_1)d\theta_2 d\theta_1 + \quad (139)$$

$$4A^2\sin\phi \int_{-\frac{\pi}{2}}^{\frac{\pi}{2}} \int_0^{\pi} \sin(2kd\sin\theta_2\sin\theta_1)d\theta_2 d\theta_1$$

The third term is zero because the integrand is odd. Thus, $$I_{tot} = 4\pi A^2 + 4A^2\cos\phi \int_{-\frac{\pi}{2}}^{\frac{\pi}{2}} \int_0^{\pi} \cos(2kd\sin\theta_2\sin\theta_1)d\theta_2 d\theta_1 \quad (140)$$

Total Intensity

A more accurate total intensity can be found by integrating Equation 133.

$$I_{tot_r} = \int I_r R^2 \sin\theta_2 d\theta_2 d\theta_1 = \quad (141)$$

$$A^2 R^2 \left[ \int_{-\frac{\pi}{2}}^{\frac{\pi}{2}} \int_0^{\pi} \frac{\sin\theta_2}{r_1^2} d\theta_2 d\theta_1 + \int_{-\frac{\pi}{2}}^{\frac{\pi}{2}} \int_0^{\pi} \frac{\sin\theta_2}{r_2^2} d\theta_2 d\theta_1 + \right.$$

$$2\cos\phi \int_{-\frac{\pi}{2}}^{\frac{\pi}{2}} \int_0^{\pi} \frac{\cos(2kd\sin\theta_2\sin\theta_1)\sin\theta_2}{r_1 r_2} d\theta_2 d\theta_1 +$$

$$\left. 2\sin\phi \int_{-\frac{\pi}{2}}^{\frac{\pi}{2}} \int_0^{\pi} \frac{\sin(2kd\sin\theta_2\sin\theta_1)\sin\theta_2}{r_1 r_2} d\theta_2 d\theta_1 \right]$$

Using Equation 122 and Equation 123, the previous equation becomes $$I_{tot_r} = A^2 R^2 \left[ \int_{-\frac{\pi}{2}}^{\frac{\pi}{2}} \int_0^{\pi} \frac{\sin\theta_2 d\theta_2 d\theta_1}{R^2 + d^2 - 2dR\sin\theta_2\sin\theta_1} + \right. \quad (142)$$

$$\int_{-\frac{\pi}{2}}^{\frac{\pi}{2}} \int_0^{\pi} \frac{\sin\theta_2 d\theta_2 d\theta_1}{R^2 + d^2 + 2dR\sin\theta_2\sin\theta_1} +$$

$$2\cos\phi \int_{-\frac{\pi}{2}}^{\frac{\pi}{2}} \int_0^{\pi} \frac{\cos(2kd\sin\theta_2\sin\theta_1)\sin\theta_2 d\theta_2 d\theta_1}{\sqrt{(R^2+d^2)^2 - (2dR\sin\theta_2\sin\theta_1)^2}} +$$

$$\left. 2\sin\phi \int_{-\frac{\pi}{2}}^{\frac{\pi}{2}} \int_0^{\pi} \frac{\sin(2kd\sin\theta_2\sin\theta_1)\sin\theta_2 d\theta_2 d\theta_1}{\sqrt{(R^2+d^2)^2 + (2dR\sin\theta_2\sin\theta_1)^2}} \right]$$

The fourth integral in Equation 142 is odd with respect to $\theta_1$. When we let $\theta_1=-\theta_1$, then $$I_4 = 2\sin\phi \int_{-\frac{\pi}{2}}^{\frac{\pi}{2}} \int_0^{\pi} \frac{\sin(2kd\sin\theta_2\sin(-\theta_1))\sin\theta_2 d\theta_2 d\theta_1}{\sqrt{(R^2+d^2)^2 + (2dR\sin\theta_2\sin(-\theta_1))^2}} \quad (143)$$

Using $\sin(-\theta)=-\sin\theta$, $$I_4 = 2\sin\phi \int_{-\frac{\pi}{2}}^{\frac{\pi}{2}} \int_0^{\pi} -\frac{\sin(2kd\sin\theta_2\sin\theta_1)\sin\theta_2 d\theta_2 d\theta_1}{\sqrt{(R^2+d^2)^2+(-2dR\sin\theta_2\sin\theta_1)^2}} \qquad (144)$$

which is $$I_4 = -2\sin\phi \int_{-\frac{\pi}{2}}^{\frac{\pi}{2}} \int_0^{\pi} \frac{\sin(2kd\sin\theta_2\sin\theta_1)\sin\theta_2 d\theta_2 d\theta_1}{\sqrt{(R^2+d^2)^2+(2dR\sin\theta_2\sin\theta_1)^2}} \qquad (145)$$

Thus, $I_4=-I_4$ and therefore Equation 143 is odd and the integration is zero.

Figure 78:
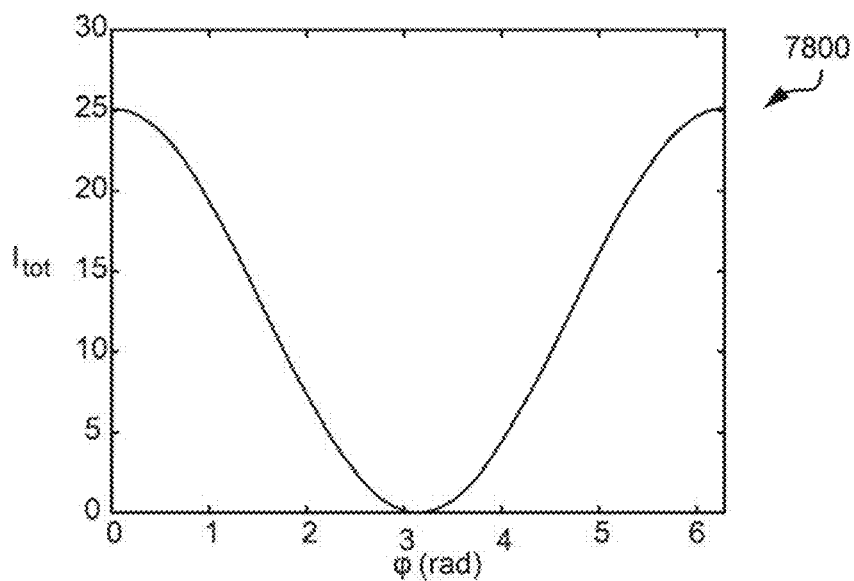
FIG. 78 is an example plot of Equation 142 where A=1, λ=100, k=2π/λ, and ω=k.

FIG. 78 is an example plot 7800 of Equation 142 where $A=1$, $\lambda=100$, $k=2\pi/\lambda$, and $\omega=k$. Equation 122 and Equation 123 give the equations for $r_1$ and $r_2$, respectively, where $R=1000\lambda$, and $\theta_2=\pi/2$. For this plot, $d=0$.

For FIG. 78, the value of the first three integrals in Equation 142 are $\pi \times 10^{-10}$ and the value of the fourth integral is 0. Thus, the $\cos\phi$ term dominates.

Figure 79:
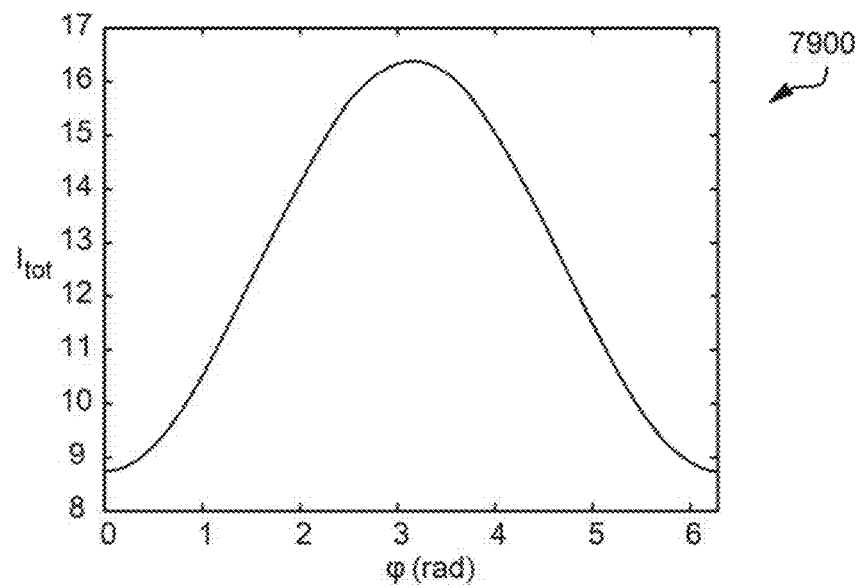
FIG. 79 is an example plot of Equation 142 where A=1, λ=100, k=2π/λ, and ω=k.

FIG. 79 is an example plot 7900 of Equation 142 where $A=1$, $=100$, $k=2\pi/\lambda$, and $\omega=k$. Equation 122 and Equation 123 give the equations for $r_1$ and $r_2$, respectively, where $R=1000\lambda$ and $\theta_2=\pi/2$. For this plot, $d=\lambda/2$.

Once again, the values for the first and second integrals in Equation 142 are $\pi \times 10^{-10}$. In this case, the third and fourth integral have values of $-9.5581 \times 10^{-11}$ and $-7.3507 \times 10^{-27}$.

Figure 80:
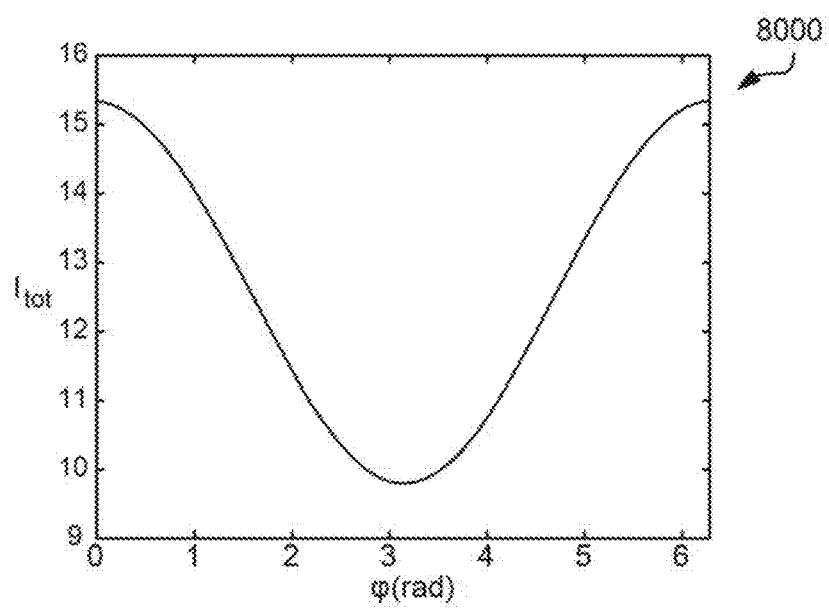
FIG. 80 is an example plot of Equation 142 where A=1, λ=100, k=2π/λ, and ω=k.

FIG. 80 is an example plot 8000 of Equation 142 where $A=1$, $\lambda=100$, $k=2\pi/\lambda$, and $\omega=k$. Equation 122 and Equation 123 give the equations for $r_1$ and $r_2$, respectively, where $R=1000\lambda$ and $\theta_2=\pi/2$. For this plot, $d=\lambda$.

Again, the first integral and second integral in Equation 142 have values of $\pi \times 10^{-10}$ (and for all subsequent cases). The values for the third and fourth integrals are $6.9202 \times 10^{-11}$ and $-2.5272 \times 10^{-27}$, respectively.

Figure 81:
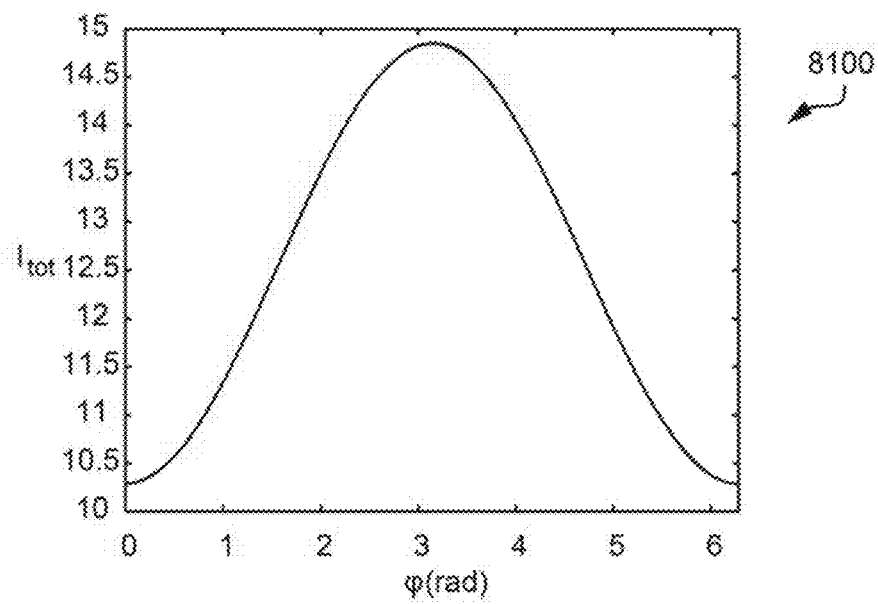
FIG. 81 is an example plot of Equation 142 where A=1, λ=100, k=2π/λ, and ω=k.

FIG. 81 is an example plot 8100 of Equation 142 where $A=1$, $\lambda=100$, $k=2\pi/\lambda$, and $\omega=k$. Equation 122 and Equation 123 give the equations for $r_1$ and $r_2$, respectively, where $R=1000\lambda$ and $\theta_2=\pi/2$. For this plot, $d=2\lambda$.

In this case, the third integral and fourth integral in Equation 142 have values of $-5.6929 \times 10^{-11}$ and $2.0321 \times 10^{-27}$.

Figure 82:
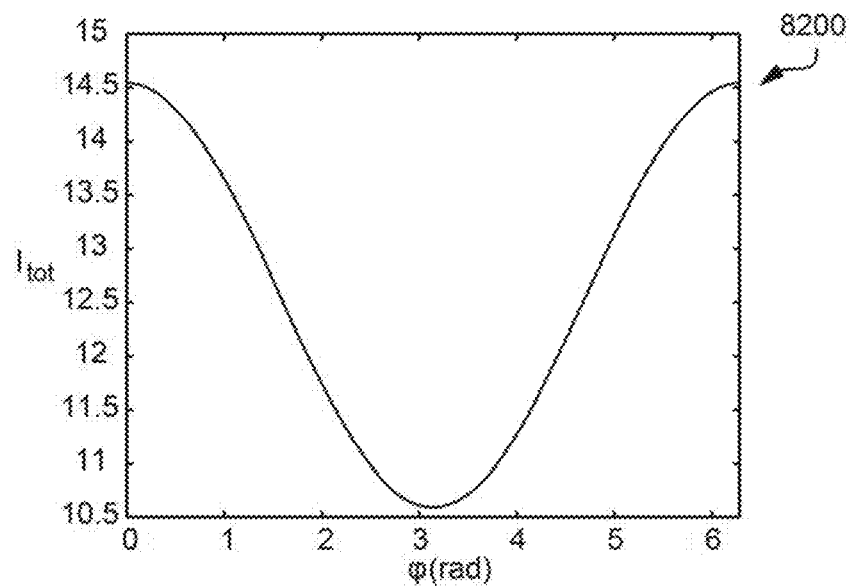
FIG. 82 is an example plot of Equation 142 where A=1, λ=100, k=2π/λ, and ω=k.

FIG. 82 is an example plot 8200 of Equation 142 where $A=1$, $\lambda=100$, $k=2\pi/\lambda$, and $\omega=k$. Equation 122 and Equation 123 give the equations for $r_1$ and $r_2$, respectively, where $R=1000\lambda$ and $\theta_2=\pi/2$. For this plot, $d=2\lambda$.

In this case, the values of the third integral and fourth integral in Equation 142 are $4.9482 \times 10^{-11}$ and $-2.9182 \times 10^{-27}$.

Figure 83:
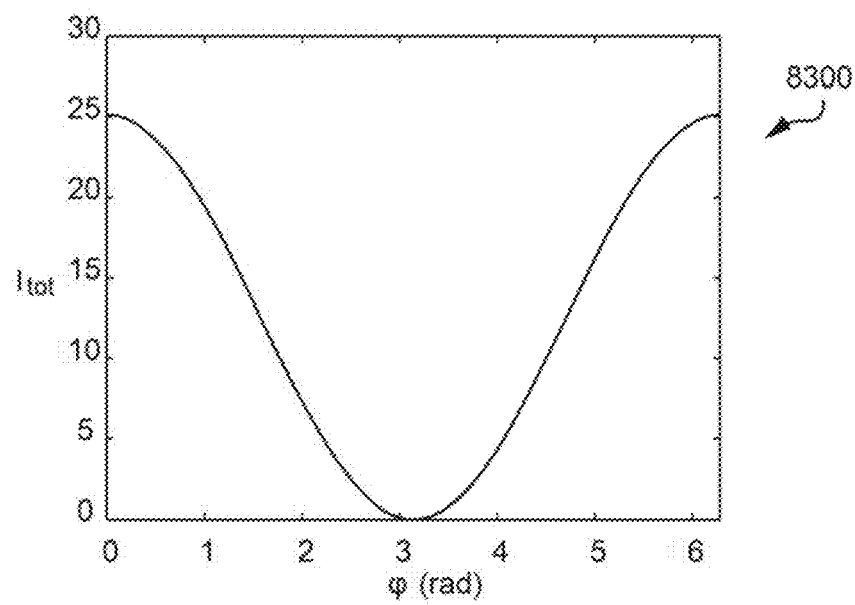
FIG. 83 is an example plot of Equation 100 where A=1, λ=100, k=2π/λ, and ω=k.

FIG. 83 is an example plot 8300 of Equation 100 where $A=1$, $\lambda=100$, $k=2\pi/\lambda$, and $\omega=k$. Equation 122 and Equation 123 give the equations for $r_1$ and $r_2$, respectively, where $R=1000\lambda$ and $\theta_1=\pi/2$. For this plot, $d=0$.

In FIG. 83, the values of the first, second, and third integrals in Equation 142 are $2 \times 10^{-10}$. The value of the fourth integral is zero.

Figure 84:
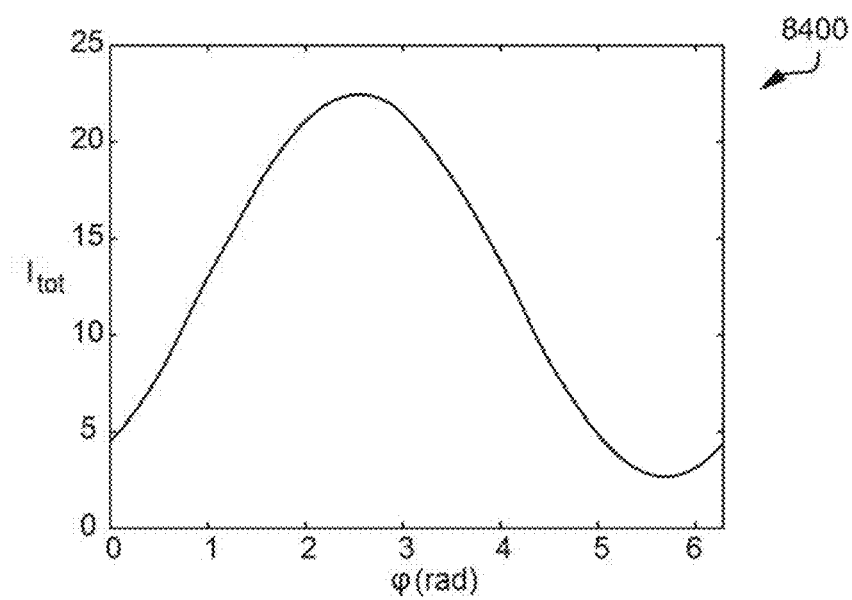
FIG. 84 is an example plot of Equation 142 where A=1, λ=100, k=2π/λ, and ω=k.

FIG. 84 is an example plot 8400 of Equation 142 where $A=1$, $\lambda=100$, $k=2\pi/\lambda$, and $\omega=k$. Equation 122 and Equation 123 give the equations for $r_1$ and $r_2$, respectively, where $R=1000\lambda$ and $\theta_1=\pi/2$. For this plot, $d=\lambda/4$.

In FIG. 84, the values of the first and second integrals in Equation 142 are $2.0008 \times 10^{-10}$ and $1.9982 \times 10^{-10}$ respectively. The values of the third and fourth integrals are $-1.2978 \times 10^{-10}$ and $8.1415 \times 10^{-11}$ respectively.

Figure 85:
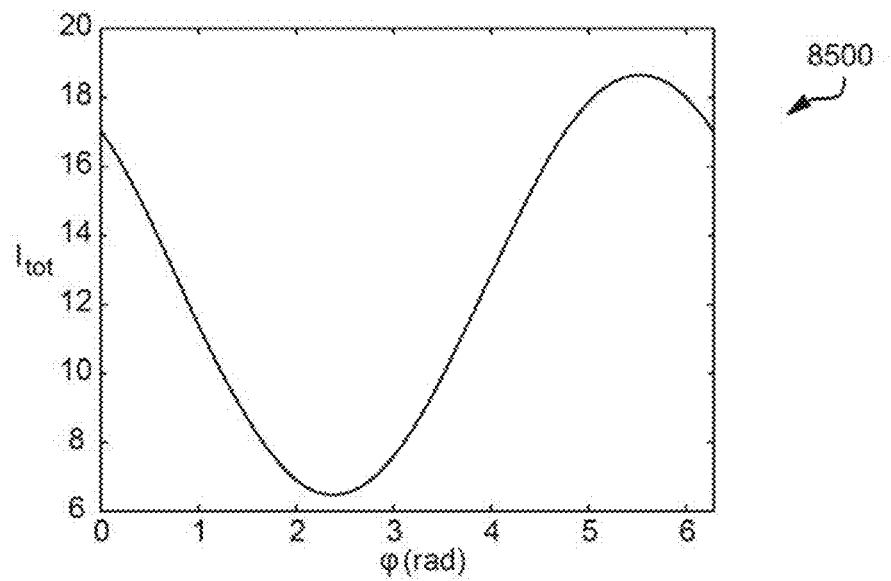
FIG. 85 is an example plot of Equation 142 where A=1, λ=100, k=2π/λ, and ω=k.

FIG. 85 is an example plot 8500 of Equation 142 where $A=1$, $\lambda=100$, $k=2\pi/\lambda$, and $\omega=k$. Equation 122 and Equation 123 give the equations for $r_1$ and $r_2$, respectively, where $R=1000\lambda$ and $\theta_1=\pi/2$. For this plot, $d=\lambda/2$.

In FIG. 85, the values of the first and second integrals in Equation 142 are $2.0016 \times 10^{-10}$ and $19984 \times 10^{-10}$ respectively. The values of the third and fourth integrals are $7.0339 \times 10^{-11}$ and $-6.6722 \times 10^{-11}$ respectively.

Figure 86:
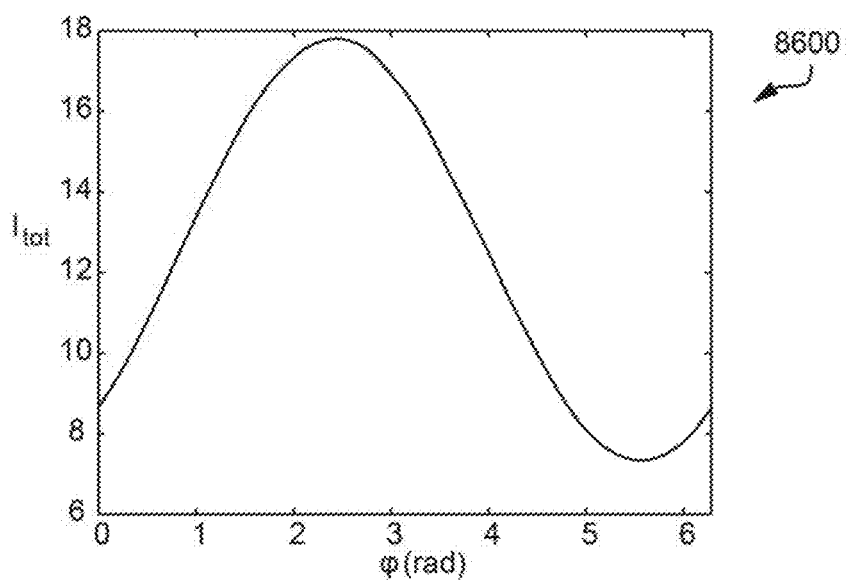
FIG. 86 is an example plot of Equation 100 where A=1, λ=100, k=2π/λ, and ω=k.

FIG. 86 is an example plot 8600 of Equation 100 where $A=1$, $\lambda=100$, $k=2\pi/\lambda$, and $\omega=k$. Equation 122 and Equation 123 give the equations for $r_1$ and $r_2$, respectively, where $R=1000\lambda$ and $\theta_1=\pi/2$. For this plot, $d=3\lambda/4$.

In FIG. 86 the values of the first and second integrals in Equation 8 are $2.0024 \times 10^{-10}$ and $1.9976 \times 10^{-10}$ respectively. The values of the third and fourth integrals are $-6.2286 \times 10^{-11}$ and $5.5520 \times 10^{-11}$ respectively.

Figure 87:
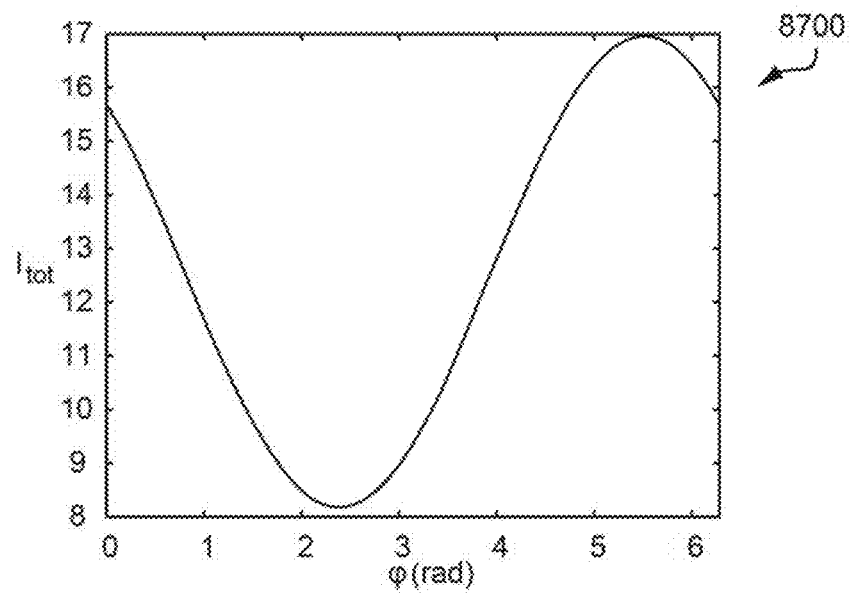
FIG. 87 is an example plot of Equation 142 where A=1, λ=100, k=2π/λ, and ω=k.

FIG. 87 is an example plot 8700 of Equation 142 where $A=1$, $\lambda=100$, $k=2\pi/\lambda$, and $\omega=k$. Equation 122 and Equation 123 give the equations for $r_1$ and $r_2$, respectively, where $R=1000\lambda$ and $\theta_1=\pi/2$. For this plot, $d=\lambda$.

In FIG. 87 the values of the first and second integrals in Equation 142 are $2.0031 \times 10^{-10}$ and $1.9969 \times 10^{-10}$ respectively. The values of the third and fourth integrals are $5.0282 \times 10^{-11}$ and $-4.8547 \times 10^{-11}$ respectively.

The fourth integral in Equation 142 is zero when $\theta_2=\pi/2$. The integrand of the fourth integral, $$f_4 = \frac{\sin(2kd\sin\theta_2\sin\theta_1)\sin\theta_2}{\sqrt{(R^2+d^2)^2+(2dR\sin\theta_2\sin\theta_1)^2}} \qquad (146)$$

is shown in the next five figures.

Figure 88:
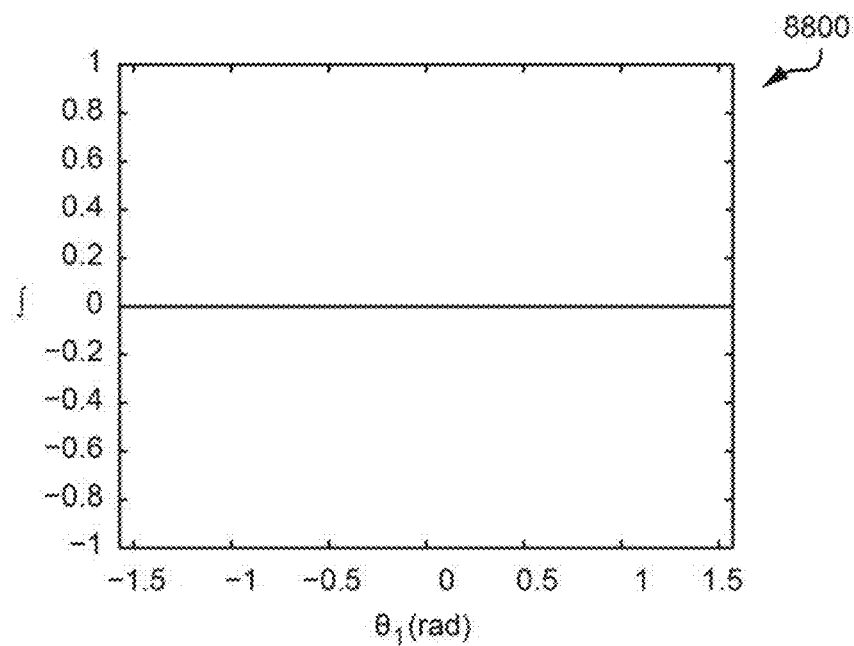
FIG. 88 is a plot of an example fourth integrand from Equation 142 plotted above, where A=1, λ=100, k=2π/λ, and ω=k.

FIG. 88 is a plot 8800 of an example fourth integrand from Equation 142 plotted above, where and $A=1$, $\lambda=100$, $k=2\pi/\lambda$, and $\omega=k$. Equation 122 and Equation 123 give the equations for $r_1$ and $r_2$, respectively, where $R=1000\lambda$ and $\theta_2=\pi/2$. For this plot, $d=0$.

Integrating FIG. 88 gives a value of 0.

Figure 89:
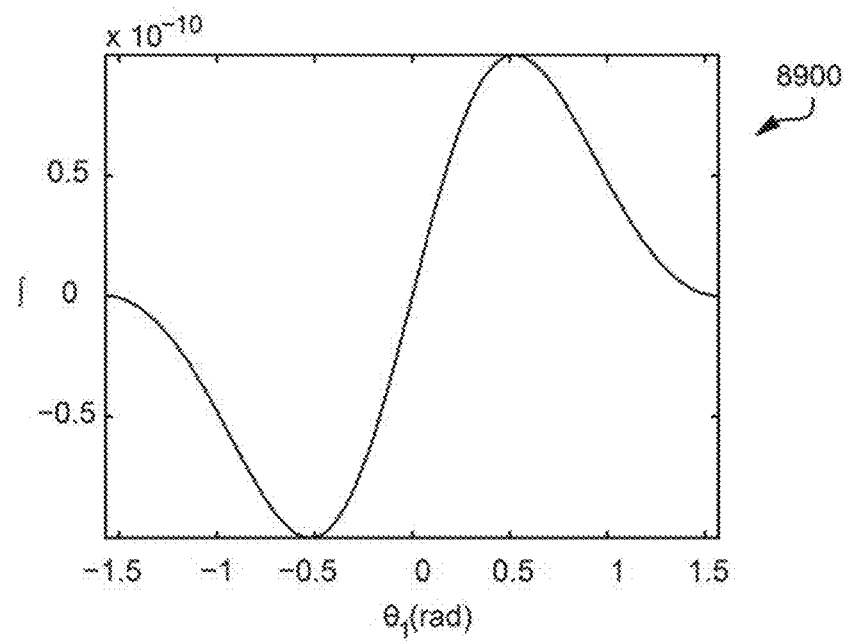
FIG. 89 is a plot of an example fourth integrand from Equation 142 plotted above, where A=1, λ=100, k=2π/λ, and ω=k.

FIG. 89 is a plot 8900 of an example fourth integrand from Equation 142 plotted above, where $A=1$, $\lambda=100$, $k=2\pi/\lambda$, and $\omega=k$. Equation 122 and Equation 123 give the equations for $r_1$ and $r_2$, respectively, where $R=1000\lambda$ and $\theta_2=\pi/2$. For this plot, $d=\lambda/4$.

Integrating FIG. 89 gives a value of $-2.1992 \times 10^{-25}$.

Figure 90:
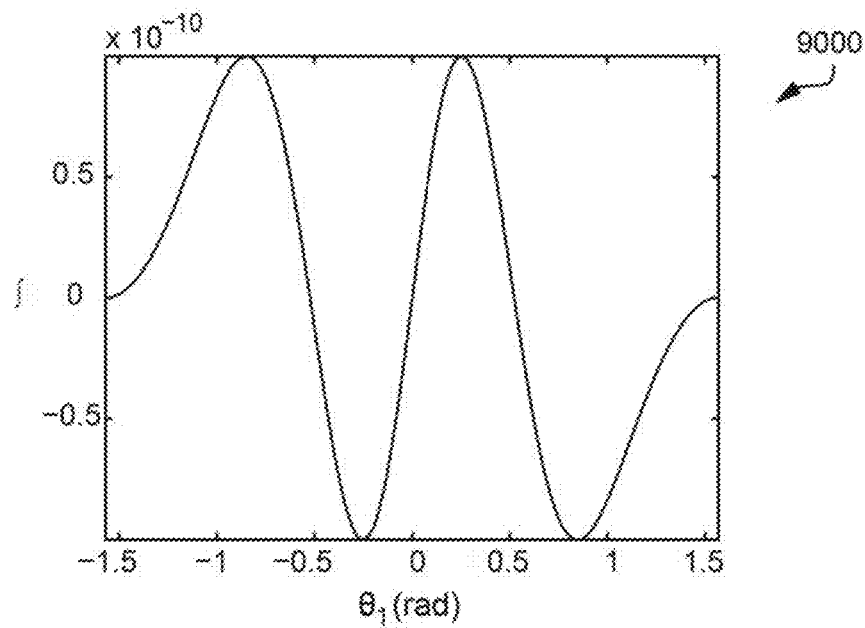
FIG. 90 is plot of an example fourth integrand from Equation 142 plotted above, where A=1, λ=100, k=2π/λ, and ω=k.

FIG. 90 is plot 9000 of an example fourth integrand from Equation 142 plotted above, where $A=1$, $\lambda=100$, $k=2\pi/\lambda$, and $\omega=k$. Equation 122 and Equation 123 give the equations for $r_1$ and $r_2$, respectively, where $R=1000\lambda$ and $\theta_2=\pi/2$. For this plot, $d=\lambda/2$.

Integrating FIG. 90 gives a value of $1.4431 \times 10^{-24}$.

Figure 91:
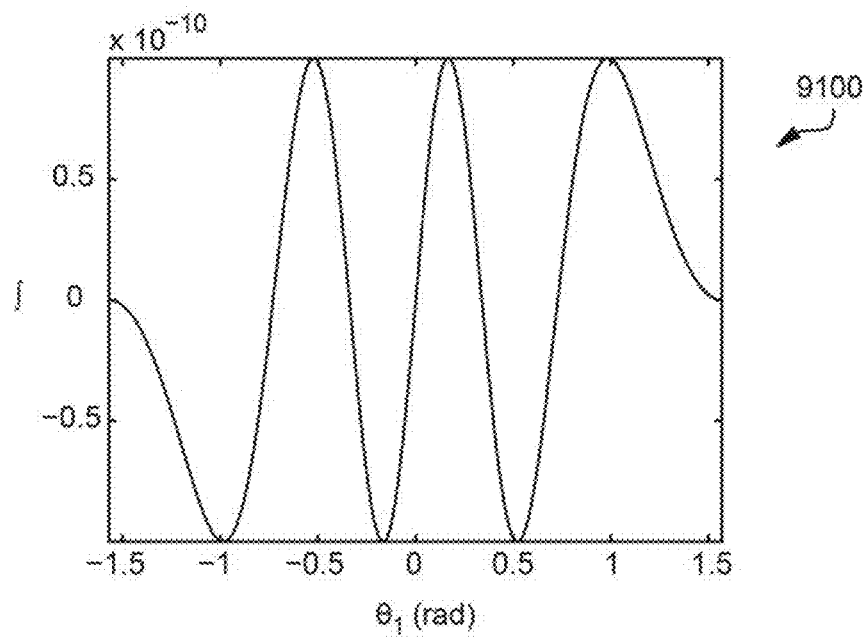
FIG. 91 is a plot of an example fourth integrand from Equation 142 plotted above, where A=1, λ=100, k=2π/λ, and ω=k.

FIG. 91 is a plot 9100 of an example fourth integrand from Equation 142 plotted above, where $A=1$, $\lambda=100$, $k=2\pi/\lambda$, and $\omega=k$. Equation 122 and Equation 123 give the equations for $r_1$ and $r_2$, respectively, where $R=1000\lambda$ and $\theta_2=\pi/2$. For this plot, $d=3\lambda/4$.

Integrating FIG. 91 gives a value of $-1.4405 \times 10^{-25}$.

Figure 92:
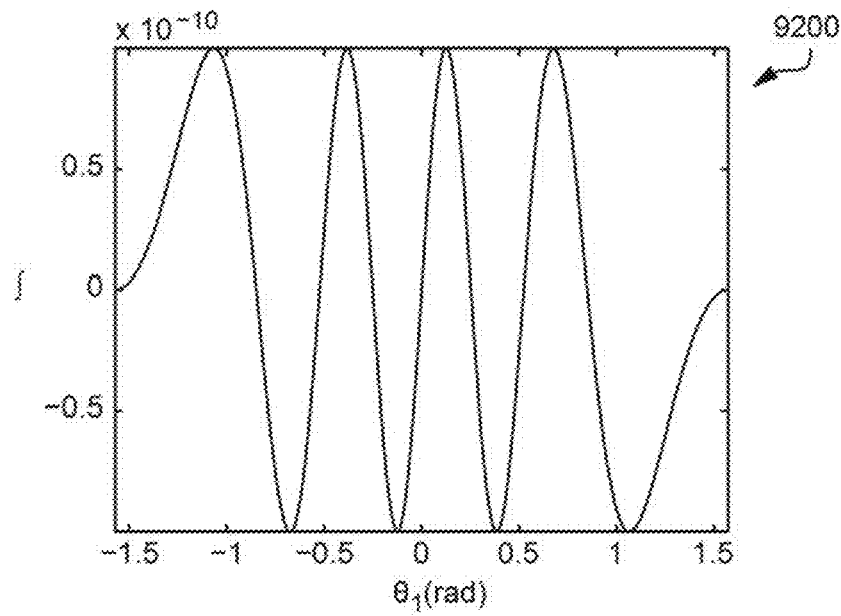
FIG. 92 is a plot of an example fourth integrand from Equation 142 plotted above, where A=1, λ=100, k=2π/λ, and ω=k.

FIG. 92 is a plot 9200 of an example fourth integrand from Equation 142 plotted above, where $A=1$, $\lambda=100$, $k=2\pi/\lambda$, and $\omega=k$. Equation 122 and Equation 123 give the equations for $r_1$ and $r_2$, respectively, where $R=1000\lambda$ and $\theta_2=\pi/2$. For this plot, $d=\lambda$.

Integrating FIG. 92 gives a value of $-4.9095 \times 10^{-24}$.

When $\theta_1 = \pi/2$, the fourth integral in Equation 142 is no longer zero.

Figure 93:
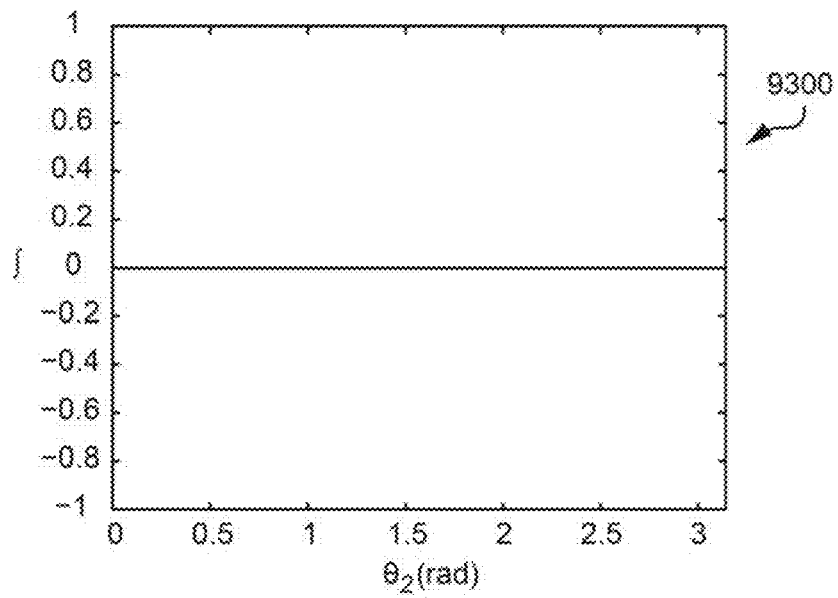
FIG. 93 is a plot of an example fourth integrand from Equation 142 plotted above, where A=1, λ=100, k=2π/λ, and ω=k.

FIG. 93 is a plot 9300 of an example fourth integrand from Equation 142 plotted above, where A=1, $\lambda$=100, k=$2\pi/\lambda$, and $\omega$=k. Equation 122 and Equation 123 give the equations for $r_1$ and $r_2$, respectively, where R=1000$\lambda$ and $\theta_1 = \pi/2$. For this plot, d=0.

Integrating FIG. 93 gives a value of 0.

Figure 94:
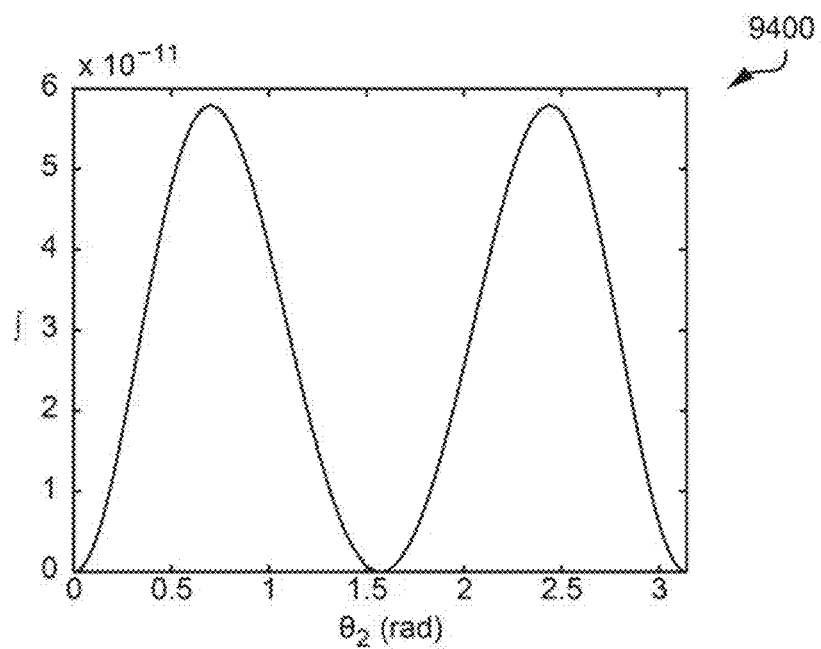
FIG. 94 is a plot of an example fourth integrand from Equation 142 plotted above, where A=1, λ=100, k=2π/λ, and ω=k.

FIG. 94 is a plot 9400 of an example fourth integrand from Equation 142 plotted above, where A=1, $\lambda$=100, k=$2\pi/\lambda$, and $\omega$=k. Equation 122 and Equation 123 give the equations for $r_1$ and $r_2$, respectively, where R=1000$\lambda$ and $\theta_1 = \pi/2$. For this plot, d=$\lambda$/4.

Integrating FIG. 94 gives a value of $2.8433 \times 10^{-8}$.

Figure 95:
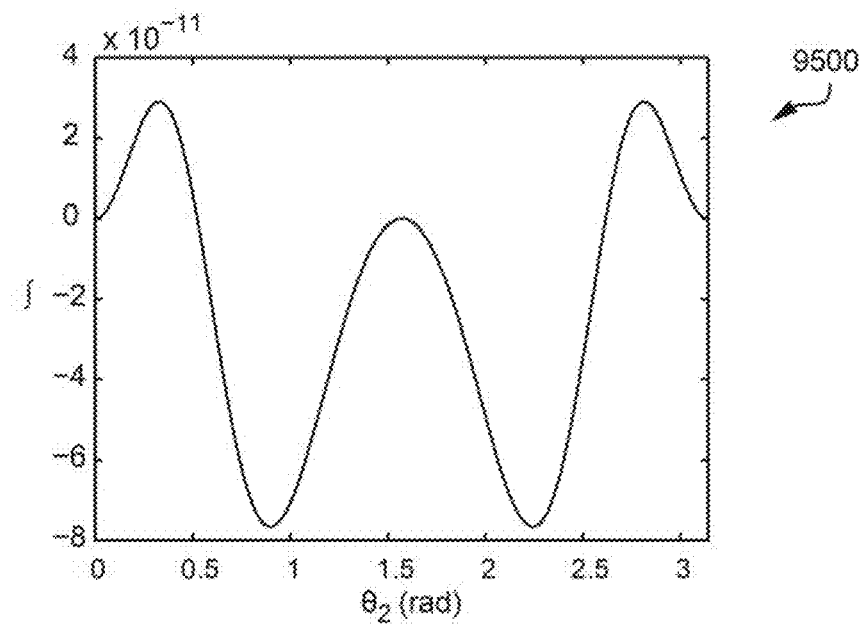
FIG. 95 is a plot of an example fourth integrand from Equation 142 plotted above, where A=1, λ=100, k=2π/λ, and ω=k.

FIG. 95 is a plot 9500 of an example fourth integrand from Equation 142 plotted above, where A=1, $\lambda$=100, k=$2\pi/\lambda$, and $\omega$=k. Equation 122 and Equation 123 give the equations for $r_1$ and $r_2$, respectively, where R=1000$\lambda$ and $\theta_1 = \pi/2$. For this plot, d=$\lambda$/2.

Integrating FIG. 95 gives a value of $-2.1217 \times 10^{-8}$.

Figure 96:
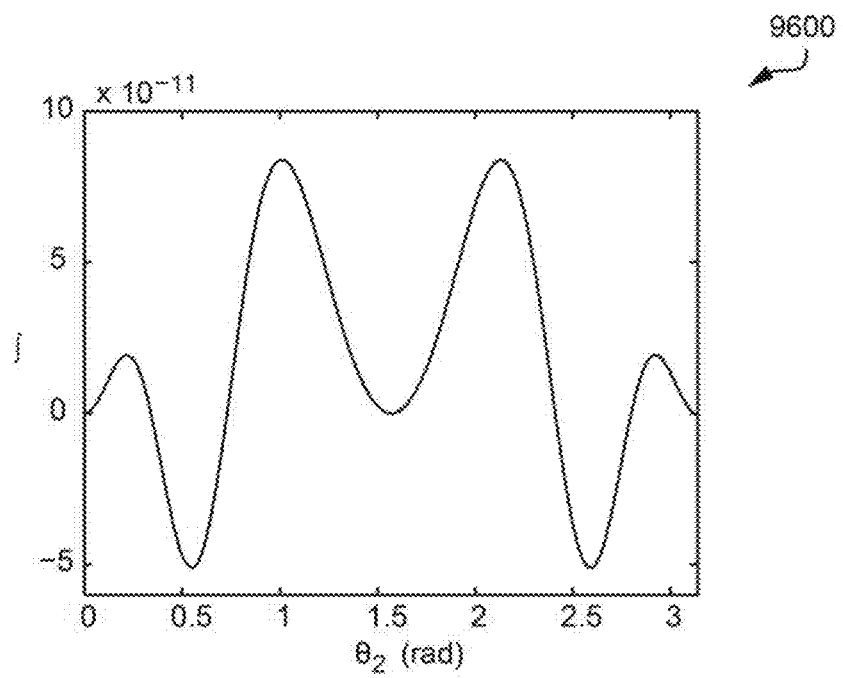
FIG. 96 is a plot of an example fourth integrand from Equation 142 plotted above, where A=1, λ=100, k=2π/λ, and ω=k.

FIG. 96 is a plot 9600 of an example fourth integrand from Equation 142 plotted above, where A=1, $\lambda$=100, k=$2\pi/\lambda$, and $\omega$=k. Equation 122 and Equation 123 give the equations for $r_1$ and $r_2$, respectively, where R=1000$\lambda$ and $\theta_1 = \pi/2$. For this plot, d=$3\lambda$/4.

Integrating FIG. 96 gives a value of $1.7655 \times 10^{-8}$.

Figure 97:
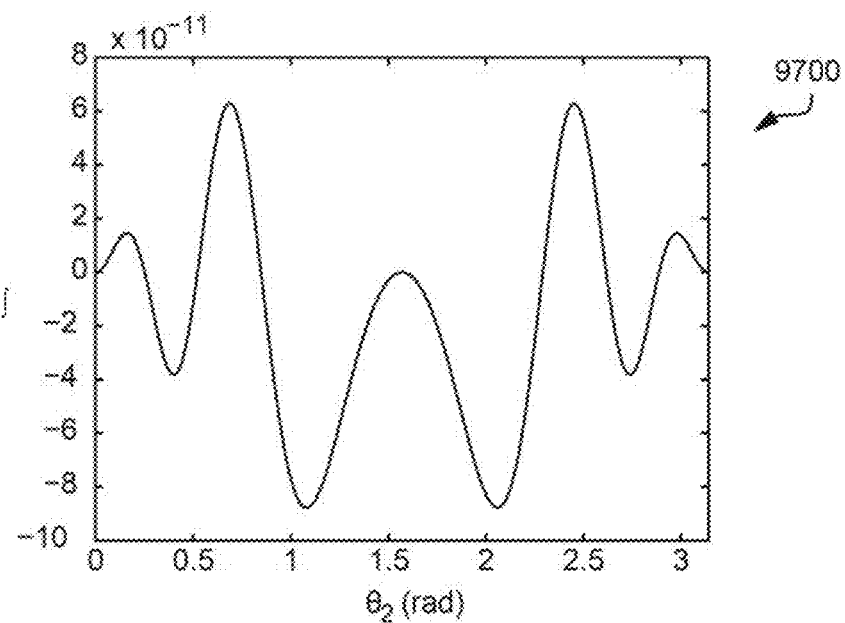
FIG. 97 is a plot of an example fourth integrand from Equation 142 plotted above, where A=1, λ=100, k=2π/λ, and ω=k.

FIG. 97 is a plot 9700 of an example fourth integrand from Equation 142 plotted above, where A=1, $\lambda$=100, k=$2\pi/\lambda$, and $\omega$=k. Equation 122 and Equation 123 give the equations for $r_1$ and $r_2$, respectively, where R=1000$\lambda$ and $\theta_1 = \pi/2$. For this plot, d=$\lambda$.

Integrating FIG. 97 gives a value of $-1.5438 \times 10^{-8}$.

When $r_1 = r_2 = R$, Equation 142 becomes $$I_{tot_r} = A^2 R^2 \left[ \int_{-\frac{\pi}{2}}^{\frac{\pi}{2}} \int_0^{\pi} \frac{\sin\theta_2 d\theta_2 d\theta_1}{R^2} + \int_{-\frac{\pi}{2}}^{\frac{\pi}{2}} \int_0^{\pi} \frac{\sin\theta_2 d\theta_2 d\theta_1}{R^2} + \right. \tag{147}$$
$$2\cos\phi \int_{-\frac{\pi}{2}}^{\frac{\pi}{2}} \int_0^{\pi} \frac{\cos(2kd\sin\theta_2 \sin\theta_1)\sin\theta_2 d\theta_2 d\theta_1}{R^2} +$$
$$\left. 2\sin\phi \int_{-\frac{\pi}{2}}^{\frac{\pi}{2}} \int_0^{\pi} \frac{\sin(2kd\sin\theta_2 \sin\theta_1)\sin\theta_2 d\theta_2 d\theta_1}{R^2} \right]$$

$$I_{tot_r} = A^2 \left[ \int_{-\frac{\pi}{2}}^{\frac{\pi}{2}} \int_0^{\pi} \sin\theta_2 d\theta_2 d\theta_1 + \int_{-\frac{\pi}{2}}^{\frac{\pi}{2}} \int_0^{\pi} \sin\theta_2 d\theta_2 d\theta_1 + \right. \tag{148}$$
$$2\cos\phi \int_{-\frac{\pi}{2}}^{\frac{\pi}{2}} \int_0^{\pi} \cos(2kd\sin\theta_2 \sin\theta_1)\sin\theta_2 d\theta_2 d\theta_1 +$$
$$\left. 2\sin\phi \int_{-\frac{\pi}{2}}^{\frac{\pi}{2}} \int_0^{\pi} \sin(2kd\sin\theta_2 \sin\theta_1)\sin\theta_2 d\theta_2 d\theta_1 \right]$$

The first two integrals are both $2\pi$ and the fourth integral is zero because the integrand is odd with respect to $\theta_1$. Thus, we see that the total intensity is $$I_{tot_R} = 2A^2 \left[ 2\pi + \cos\phi \int_{-\frac{\pi}{2}}^{\frac{\pi}{2}} \int_0^{\pi} \cos(2kd\sin\theta_2 \sin\theta_1)\sin\theta_2 d\theta_2 d\theta_1 \right] \tag{149}$$

Next, we analyze the ratio between the first term and the coefficient of the second term.

$$\text{ratio} = \frac{\int_{-\frac{\pi}{2}}^{\frac{\pi}{2}} \int_0^{\pi} \cos(2kd\sin\theta_2 \sin\theta_1)\sin\theta_2 d\theta_2 d\theta_1}{2\pi} \tag{150}$$

This ratio is plotted below as a function of d.

Figure 98:
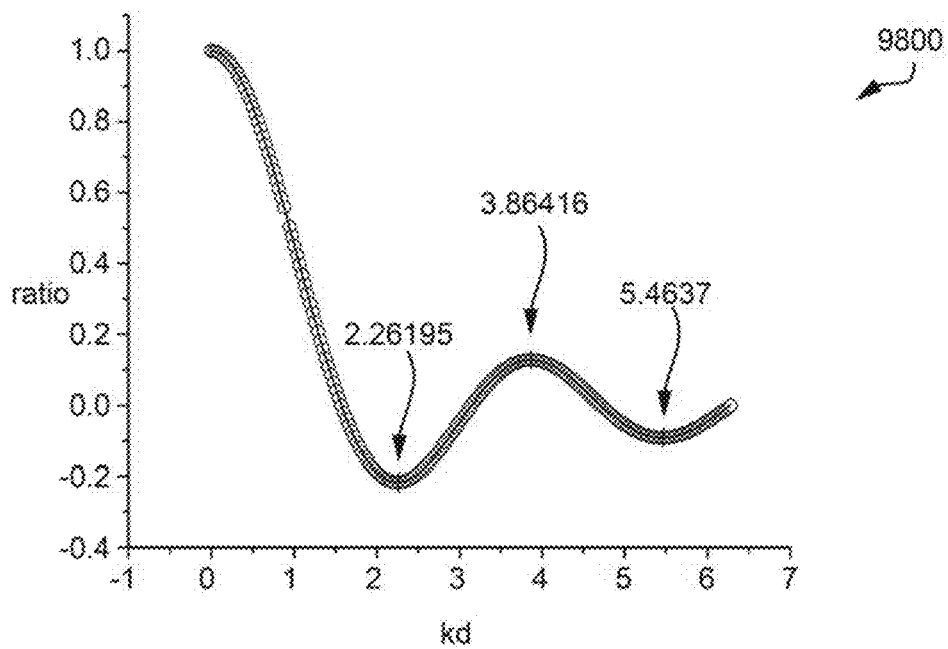
FIG. 98 is an example plot of Equation 150 plotted as a function of kd with a black fitted function.

FIG. 98 is an example plot 9800 of Equation 150 plotted as a function of kd with a black fitted function.

The minima for this graph are located at kd values of 2.26195 and 5.46637, while the maxima are located at kd values of 0 and 3.86416.

The fitting equation for FIG. 98 is $$\text{ratio} = 0.01098 + 0.30696 \left( e^{\frac{-kd}{5.09299}} \right) \cos\left( \frac{\pi(kd - 0.51404)}{1.67002} \right) + \tag{151}$$
$$0.86967 \left( e^{\frac{-kd}{1.12219}} \right) \sin\left( \frac{\pi(kd - 5.1545)}{3.19207} \right)$$

The r-squared value for this equation is 1 and the reduced chi-squared value is $9.1512 \times 10^{-8}$. Thus, the equation is a very good fit. Gaussian damping and just a single cosine damping fitting functions were also tried but the superposition of the sinusoidal damping works much better.

Figure 99:
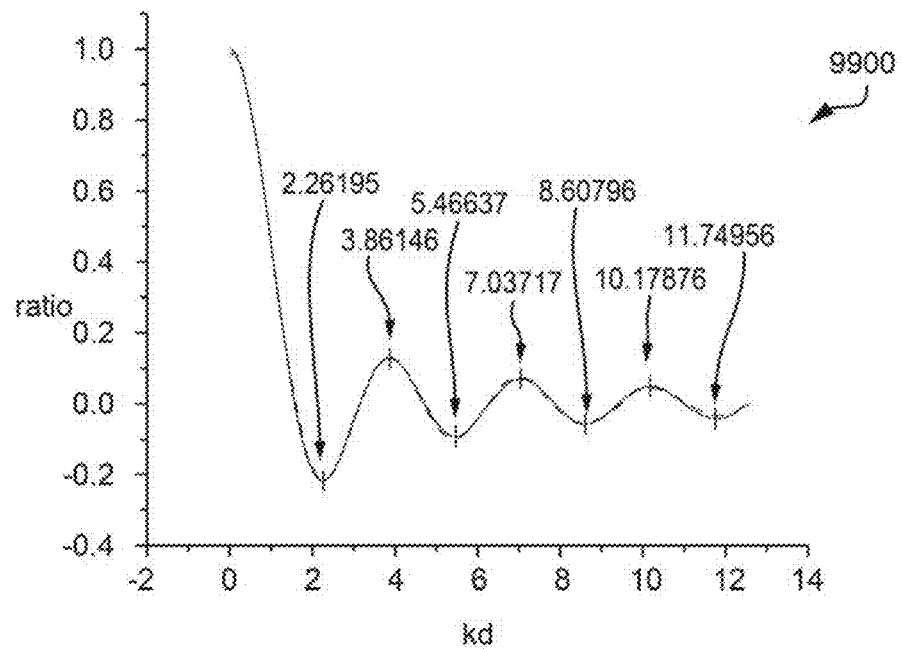
FIG. 99 is an example plot of Equation 150 plotted as a function of kd from 0 to 4π with a red fitted function.

FIG. 99 is an example plot 9900 of Equation 150 plotted as a function of kd from 0 to $4\pi$ with a red fitted function.

The minima and maxima are shown in FIG. 99. The ratio is zero for kd values of $\pi/2$, $\pi$, $3\pi/2$, $2\pi$, $5\pi/2$, $3\pi$, $7\pi/2$, and $4\pi$.

The fitting equation for FIG. 99 is $$\text{ratio} = 6.8957 \times 10^{-4} + 0.24999 e^{\frac{-kd}{5.93136}} \cos\left( \frac{\pi(kd - 0.69726)}{1.5898} \right) + \tag{152}$$
$$1.16731 e^{\frac{-kd}{0.81326}} \sin\left( \frac{\pi(kd - 4.15763)}{2.43856} \right)$$

The adjusted r-squared value for this equation is 0.99963 and the reduced chi-squared value is $2.16614 \times 10^{-5}$. Thus, this fit is still pretty good. Gaussian damping was also tried but didn't fit as well as the superposition of sinusoidal damping.

Figure 100:
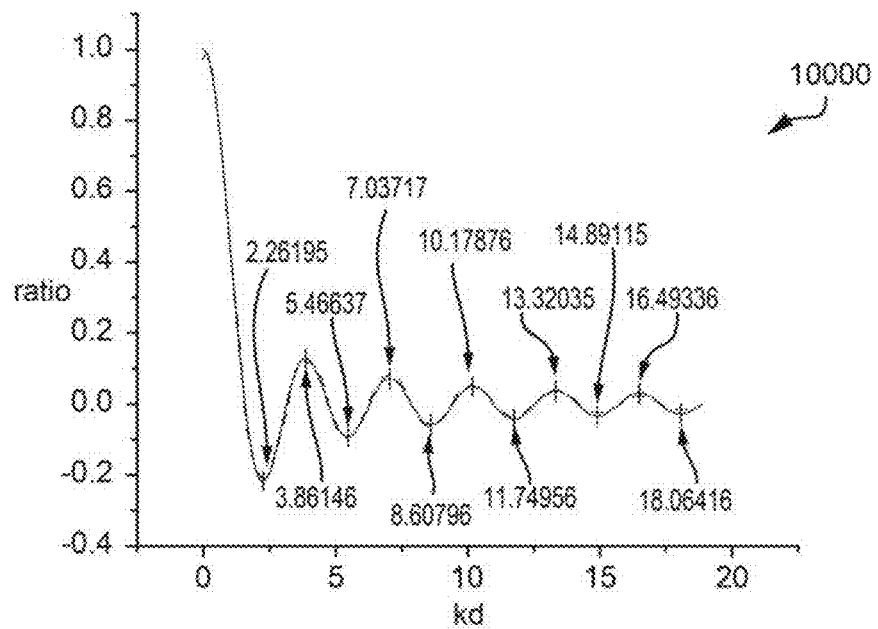
FIG. 100 is an example plot of Equation 150 plotted as a function of kd from 0 to 6π with a red fitted function.

FIG. 100 is an example plot 10000 of Equation 150 plotted as a function of kd from 0 to $6\pi$ with a red fitted function.

The minima and maxima are shown in FIG. 99. The ratio is zero for the kd values listed for FIG. 100 as well as $9\pi/2$, $5\pi$, $11\pi/2$ and $6\pi$.

The fitting equation for FIG. 100 is $$\text{ratio} = 6.65672 \times 10^{-4} + 0.21307 e^{\frac{-kd}{7.24405}} \cos\left( \frac{\pi(kd - 0.7131)}{1.8222} \right) + \tag{153}$$
$$1.20391 e^{\frac{-kd}{0.84317}} \sin\left( \frac{\pi(kd - 4.00166)}{2.33393} \right)$$

The adjusted r-squared value is 0.99914 and the reduced chi-squared value is $3.44499 \times 10^{-5}$. This fit is also pretty good. Gaussian damping was tried also but didn't fit as well as the sinusoidal damping.

Figure 101:
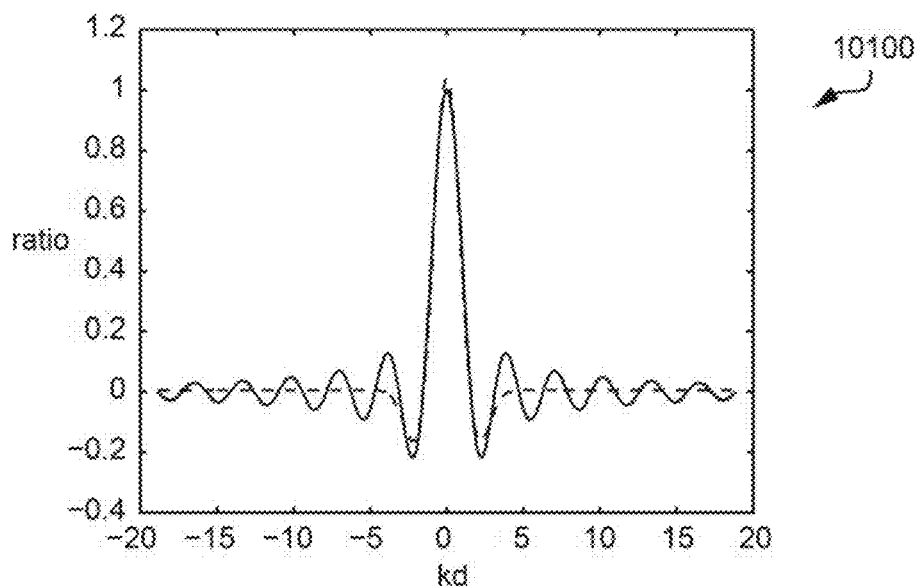
FIG. 101 is an example plot of Equation 150 plotted as a function of kd from −6π to −6π with a red fitted function.

FIG. 101 is an example plot 10100 of Equation 150 plotted as a function of kd from $-6\pi$ to $-6\pi$ with a red fitted function.

The fitted equation for FIG. 101 is $$\text{ratio} = 0.00459 + 1.034 e^{-\left(\frac{kd}{1.894}\right)^2} \cos\left(\frac{\pi(kd - 4.51 \times 10^{-11})}{3.071}\right) \quad (154)$$

The adjusted r-squared value for Equation 154 is 0.9454

Figure 102:
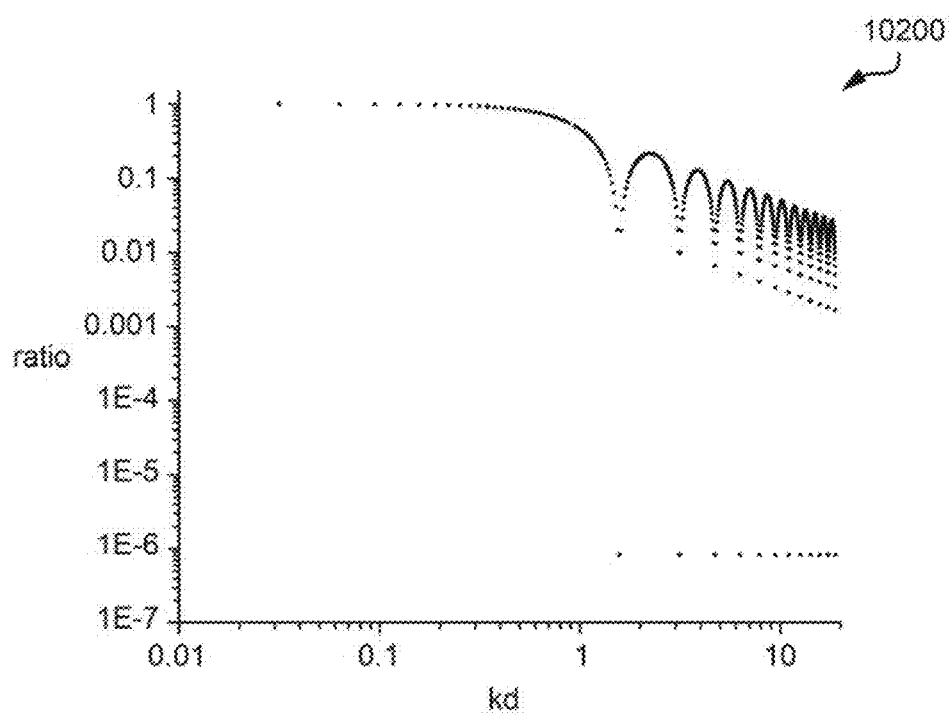
FIG. 102 is a graph of an example absolute value of Equation 150 plotted on a log-log graph.

FIG. 102 is a graph 10200 of an example absolute value of Equation 150 plotted on a log-log graph.

Figure 103:
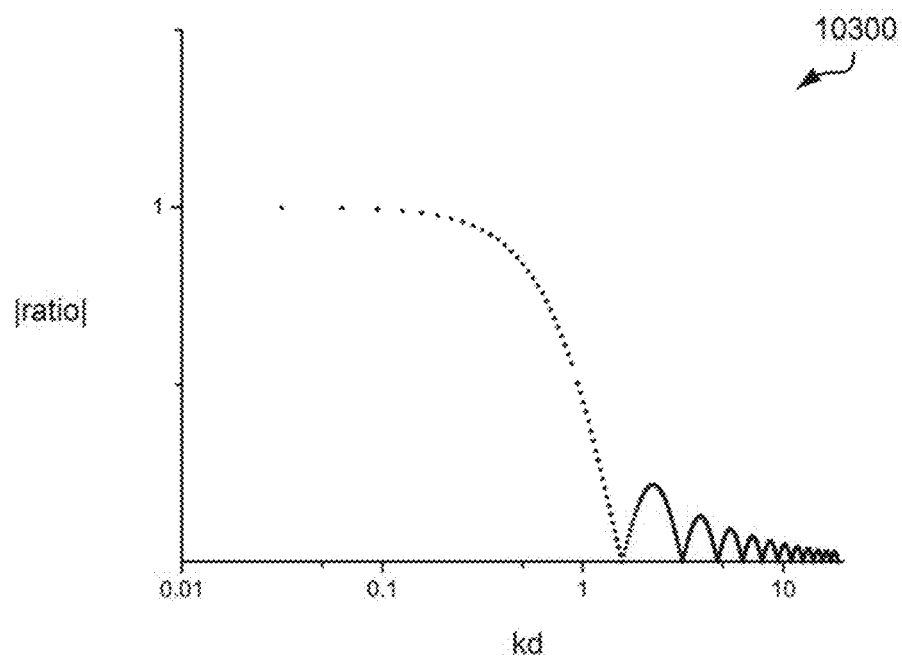
FIG. 103 is a graph of an example absolute value of Equation 150 plotted where the x-axis is logarithmic and the y-axis is linear.

FIG. 103 is a graph 10300 of an example absolute value of Equation 150 plotted where the x-axis is logarithmic and the y-axis is linear.

Figure 104:
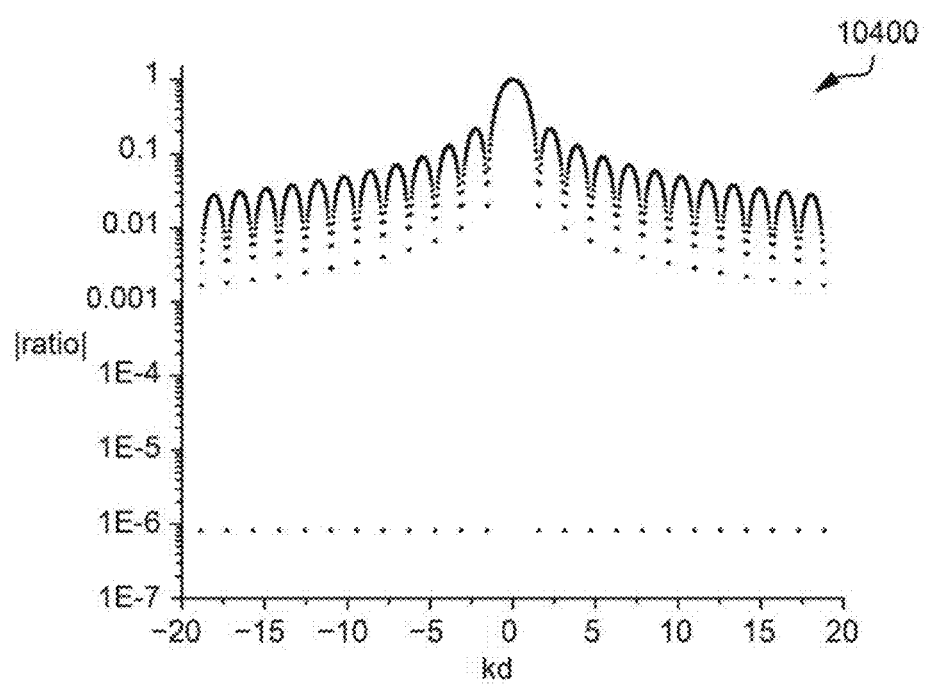
FIG. 104 is a graph of an example absolute value of Equation 120 plotted where the y-axis is logarithmic and the x-axis is linear.

FIG. 104 is a graph 10400 of an example absolute value of Equation 120 plotted where the y-axis is logarithmic and the x-axis is linear.

Figure 105:
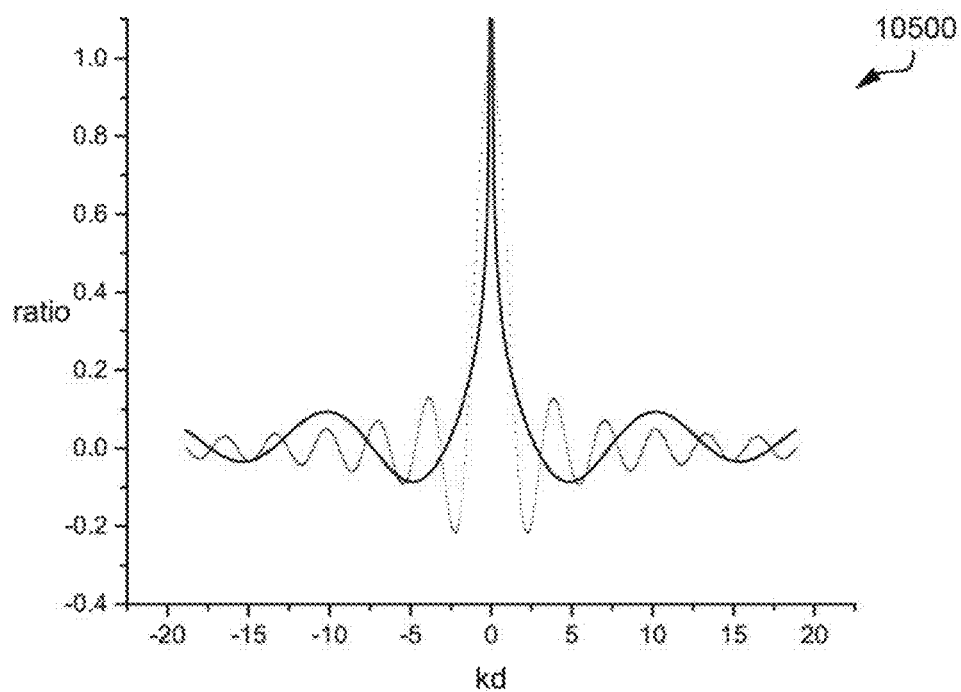
FIG. 105 is an example graph of Equation 150 plotted and fitted with an exponential damping function as described below.

FIG. 105 is an example graph 10500 of Equation 150 plotted and fitted with an exponential damping function as described below.

The fitted function was of the form $$r = \frac{A e^a}{|kd|^b} \cos(\omega x - \phi) + y_0 \quad (155)$$

where A=0.1014, a=0.96496, b=0.56213, $y_0$=0.02168, $\omega$=0.60932, and $\phi$=−0.00548. These were the values that gave the best adj. r-squared value of 0.5649.

Figure 106:
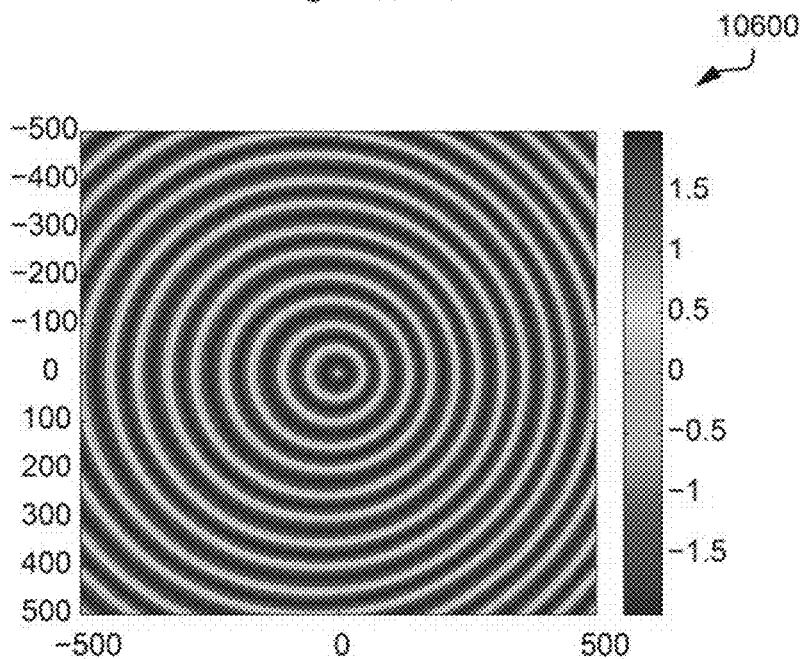
FIG. 106 is an example graph of Equation 104 when kd=3.86416, a value taken from FIG. 100.

FIG. 106 is an example graph 10600 of Equation 104 when kd=3.86416, a value taken from FIG. 100.

In the above figure, the center of the two oscillators is shifted slightly to the left.

Figure 107:
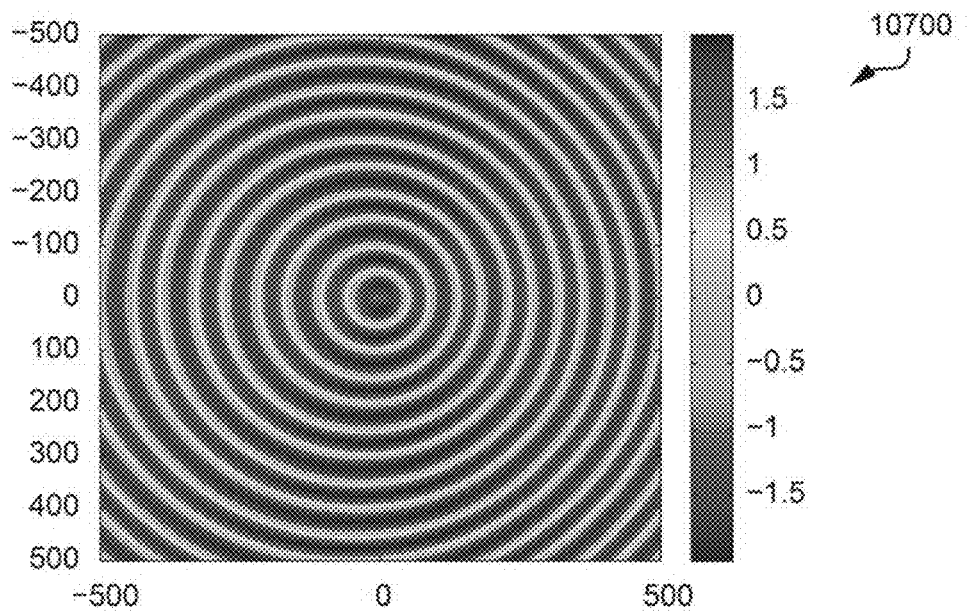
FIG. 107 is an example graph of Equation 104 when kd=10.17876, a value taken from FIG. 100.

FIG. 107 is an example graph 10700 of Equation 104 when kd=10.17876, a value taken from FIG. 100.

In the above wave pattern, the two oscillators are almost distinguishable and destructive interference starts to appear along the x-axis.

Figure 108:
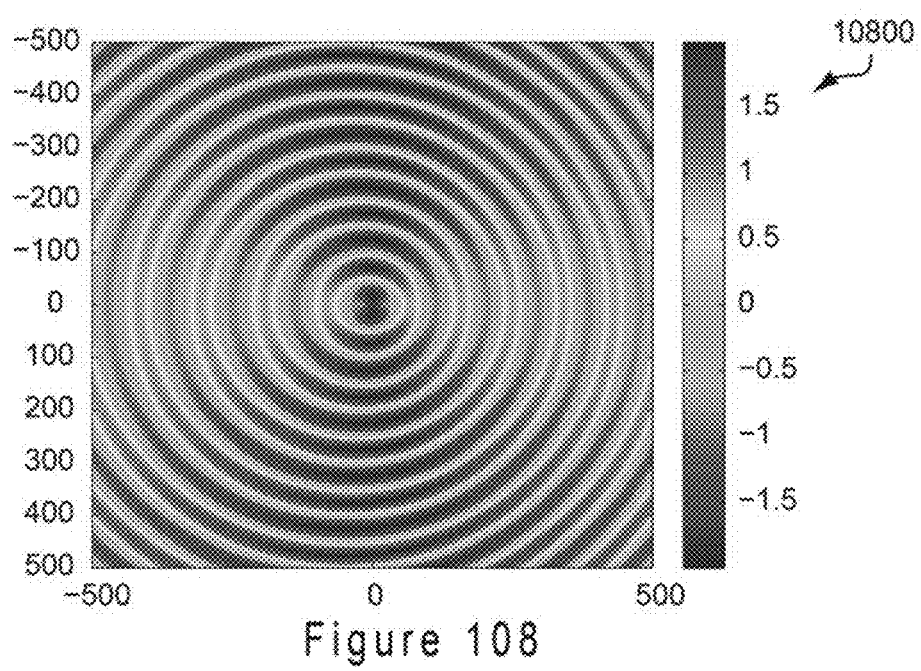
FIG. 108 is an example graph of Equation 104 when kd=18.06416, a value taken from FIG. 100.

FIG. 108 is an example graph 10800 of Equation 104 when kd=18.06416, a value taken from FIG. 100.

In the above wave patter, the two oscillators are distinguishable and destructive interference is visible.

3D Waves

If the receiver is a passive antenna, then the wave function is $$S_{3D} = \frac{A}{r_1} e^{i(kr_1 - \omega t + \phi)} \quad (156)$$

The intensity is then $$I_{3D} = |S_{3D}|^2 = \frac{A^2}{r_1^2} \quad (157)$$

The power absorbed by the receiver is proportional to the energy flux (intensity) by the sender multiplied by the cross-sectional area (A') of the receiver $$P_{receiver} = A_{eff} I_{3D_{tot}} \quad (158)$$

The power absorbed by a passive receiver with a cross-sectional area of $\pi\lambda^2$ is $$P_{3D} = \frac{\pi A^2 \lambda^2}{4d^2} \quad (159)$$

because 2d is the separation distance between the sender and receiver.

If instead an active receiver is used, using Equation 149 the power absorbed by the active antenna with cross-sectional area $\pi\lambda^2$ is $$P_{3D_{active}} = \quad (160)$$
$$2A^2 \pi \lambda^2 \left[ 2\pi + \cos\phi \int_{-\frac{\pi}{2}}^{\frac{\pi}{2}} \int_0^\pi \cos(2kd\sin\theta_2\sin\theta_1)\sin\theta_2 d\theta_2 d\theta_1 \right]$$

2D Waves

In two dimensions, the waves propagate cylindrically and can be described as $$S_{2D} = \frac{A e^{i(ks_1 - \omega t + \phi)}}{\sqrt{s_1}} + \frac{A e^{i(ks_2 - \omega t)}}{\sqrt{s_2}} \quad (161)$$

where $s_1$ and $s_2$ are $$s_1 = \sqrt{(x-d)^2 + y^2} \quad (162)$$
$$s_2 = \sqrt{(x+d)^2 + y^2}$$

From FIG. 67, $$x = -R \sin \theta_1 \quad (163)$$

$$y = R \cos \theta_1$$

Plugging these into Equation 152, $s_1$ and $s_2$ become $$s_1 = \sqrt{R^2 + 2dR\sin\theta_1 + d^2} \quad (164)$$

$$s_2 = \sqrt{R^2 + 2dR\sin\theta_1 + d^2}$$

The intensity is the square of the magnitude of the waves. By taking the squared magnitude of Equation 161, we get the intensity $$|S_{2D}|^2 = A^2 \left( \frac{e^{i(ks_1 - \omega t + \phi)}}{\sqrt{s_1}} + \frac{e^{i(ks_2 - \omega t)}}{\sqrt{s_2}} \right)\left( \frac{e^{i(ks_1 - \omega t + \phi)}}{\sqrt{s_1}} + \frac{e^{i(ks_2 - \omega t)}}{\sqrt{s_2}} \right) \quad (165)$$

After a lot of algebra, the intensity is $$I_{2D} = A^2 \left( \frac{1}{s_1} + \frac{1}{s_2} + \frac{2\cos(2kd\sin\theta_1 - \phi)}{\sqrt{s_1 s_2}} \right) \quad (166)$$

The total intensity is $$I_{tot_{2D}} = A^2 \left[ 2\pi + 2\cos\phi \int_{-\frac{\pi}{2}}^{\frac{\pi}{2}} \cos(2kd\sin\theta_1) d\theta_1 \right] \quad (167)$$

Therefore the ratio between coefficients is $$\text{ratio}_{2D} = \frac{\int_{-\frac{\pi}{2}}^{\frac{\pi}{2}} \cos(2kd\sin\theta_1) d\theta_1}{\pi} \qquad (168)$$

Figure 109:
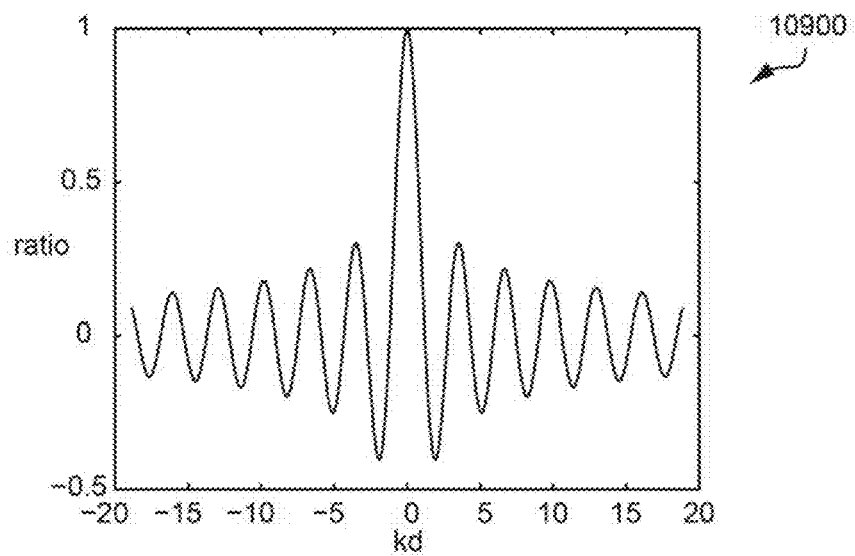
FIG. 109 is a pot of the 2D ratio plotted as a function of kd.

FIG. 109 is a plot 10900 of the 2D ratio plotted as a function of kd.

In some example, the first peak is about 0.3

The second slit is modeled as an active antenna in Equation 161 by the second waveform. If instead the receiver is a passive antenna, then Equation 161 becomes $$S_{2D} = \frac{A}{\sqrt{s_1}} e^{i(ks_1 - \omega t + \phi)} \qquad (169)$$

The intensity is $$I_{2D} = |S_{2D}|^2 = \frac{A^2}{s_1} \qquad (170)$$

The power absorbed by a passive receiver that has a cross-sectional area of one wavelength $\lambda$ is $$P_{2D} = \frac{A^2 \lambda}{2d} \qquad (171)$$

because 2d is the separation distance between the two antennas.

For an active receiver with the same cross-sectional area, the power absorbed is $$P_{2D_{active}} = \lambda A^2 \left[ 2\pi + 2\cos\phi \int_{-\frac{\pi}{2}}^{\frac{\pi}{2}} \cos(2kd\sin\theta_1) d\theta_1 \right] \qquad (172)$$

1 D Waves
The wave pattern in 1 D is $$S_{1D} = A \sin(k(x-d) - \omega t + \phi) + A \sin(k(x+d) - \omega t) \qquad (173)$$

The intensity is the time-averaged value of the square of the wave pattern which is $$I_{1D} = <S_{1D}^2> = A^2 \left[ \frac{1}{T} \int_0^T \sin^2(k(x-d) - \omega t + \phi) dt + \right. \qquad (174)$$
$$\frac{1}{T} \int_0^T \sin^2(k(x+d) - \omega t) dt +$$
$$\left. \frac{1}{T} \int_0^T 2\sin(k(x-d) - \omega t + \phi)\sin(k(x+d) - \omega t) dt \right]$$

Evaluating the integrals, $$I_{1D} = A^2 \left[ \frac{1}{2} + \frac{1}{2} + \frac{1}{2} \cos(k(x-d) - k(x+d) + \phi) \right] \qquad (175)$$

Then the intensity is $$I_{1D} = A^2 \left[ 1 + \frac{1}{2} \cos(2kd - \phi) \right] \qquad (176)$$

The total intensity is $$I_{tot_{1D}} = A^2 \left[ 1 + \frac{1}{2}\cos(2kd)\cos\phi - \frac{1}{2}\sin(2kd)\sin\phi \right] \qquad (177)$$

Therefore the ratio between coefficients is $$\text{ratio}_{1D} = \frac{1}{2}\cos(2kd) \qquad (178)$$

The electric field components of the waves transmitted by the sender and receiver are $$\vec{E}_s = A \sin(\vec{k} \cdot (\vec{x} + \vec{d}) - \omega t)\hat{z} \qquad (179)$$

$$\vec{E}_r = B \sin(\vec{k} \cdot (\vec{x} - \vec{d}) - \omega t + \phi)\hat{z}$$

or $$\vec{E} = A \sin(\vec{k} \cdot (\vec{x} + \vec{d}) - \omega t) + B \sin(\vec{k} \cdot (\vec{x} - \vec{d}) - \omega t + \phi)\hat{z}$$

The corresponding magnetic field can be found by $$\vec{B} = \frac{\hat{k}}{c} \times \vec{E} \qquad (180)$$

where $\hat{k}$ is the direction of propagation of the wave. The corresponding electric and magnetic fields to the left and right of the sender and receiver are $$\vec{E}_{s_R} = A\sin(k(x+d) - \omega t)\hat{z} \qquad (181)$$
$$\vec{E}_{s_L} = A\sin(-k(x+d) - \omega t)\hat{z}$$
$$\vec{E}_{r_R} = B\sin(k(x-d) - \omega t + \phi)\hat{z}$$
$$\vec{E}_{r_L} = B\sin(-k(x-d) - \omega t + \phi)\hat{z}$$
$$\vec{B}_{s_R} = -\frac{A}{c}\sin(k(x+d) - \omega t)\hat{y}$$
$$\vec{B}_{s_L} = \frac{A}{c}\sin(-k(x+d) - \omega t)\hat{y}$$
$$\vec{B}_{r_R} = -\frac{B}{c}\sin(k(x-d) - \omega t + \phi)\hat{y}$$
$$\vec{B}_{r_L} = \frac{B}{c}\sin(-k(x-d) - \omega t + \phi)\hat{y}$$

The rate of energy transfer per unit area, or the Poynting vector, is found by $$\vec{S} = \frac{1}{\mu_0} \vec{E} \times \vec{B} \qquad (182)$$

Figure 110:
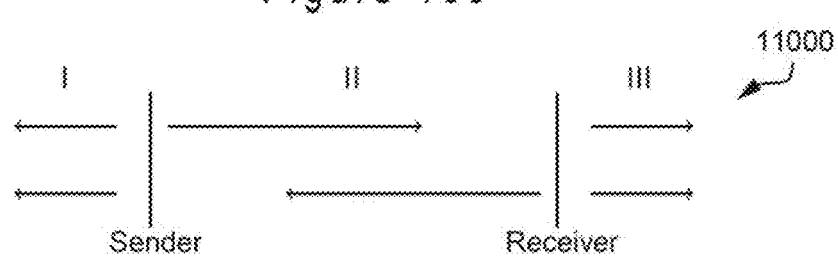
FIG. 110 is a flow diagram depicting an example energy flow between the sender and receiver.

The energy flow between the sender and receiver can be divided into three parts as shown in FIG. 110.

FIG. 110 is a flow diagram 11000 depicting an example energy flow between the sender and receiver. In Region I, the electric and magnetic fields are $$\vec{E}_I = \tag{183}$$

$$\vec{E}_{s_L} + \vec{E}_{r_L} = A\sin(-k(x+d) - \omega t)\hat{z} + B\sin(-k(x-d) - \omega t + \phi)\hat{z}$$

$$\vec{B}_I = \vec{B}_{r_L} + \vec{B}_{s_L} =$$

$$\frac{A}{c}\sin(-k(x+d) - \omega t)\hat{y} + \frac{B}{c}\sin(-k(x-d) - \omega t + \phi)\hat{y}$$

The Poynting vector for region I is $$\vec{S}_I = \frac{1}{\mu_0}\vec{E}_I \times \vec{B}_I = \tag{184}$$

$$\frac{-1}{\mu_0 c}[A^2\sin^2(-k(x+d) - \omega t) + 2AB\sin(-k(x+d) - \omega t)$$

$$\sin(-k(x-d) - \omega t + \phi) + B^2\sin^2(-k(x-d) - \omega t + \phi)]\hat{x}$$

In Region II, the electric and magnetic fields are $$\vec{E}_{II} = \vec{E}_{s_R} + \vec{E}_{r_L} = A\sin(k(x+d) - \omega t)\hat{z} + B\sin(-k(x-d) - \omega t + \phi)\hat{z} \tag{185}$$

$$\vec{B}_{II} =$$

$$\vec{B}_{r_L} + \vec{B}_{s_R} = \frac{-A}{c}\sin(k(x+d) - \omega t)\hat{y} + \frac{B}{c}\sin(-k(x-d) - \omega t + \phi)\hat{y}$$

The Poynting vector for region II is $$\vec{S}_{II} = \tag{186}$$

$$\frac{1}{\mu_0}\vec{E}_{II} \times \vec{B}_{II} = \frac{1}{\mu_0 c}\Big[A^2\sin^2(k(x+d) - \omega t) - AB\sin(k(x+d) - \omega t)$$

$$\sin(-k(x-d) - \omega t + \phi) + AB\sin(k(x+d) - \omega t)\sin$$

$$(-k(x-d) - \omega t + \phi) - B^2\sin^2(-k(x-d) - \omega t + \phi)]\hat{x} =$$

$$\frac{1}{\mu_0 c}[A^2\sin^2(k(x+d) - \omega t) - B^2\sin^2(-k(x-d) - \omega t + \phi)]\hat{x}$$

In Region III, the electric and magnetic fields are $$\vec{E}_{III} = \vec{E}_{s_R} + \vec{E}_{r_R} = A\sin(k(x+d) - \omega t)\hat{z} + B\sin(k(x-d) - \omega t + \phi)\hat{z} \tag{187}$$

$$\vec{B}_{III} = \vec{B}_{r_R} + \vec{B}_{s_R} = \frac{A}{c}\sin(k(x+d) - \omega t)\hat{y} + \frac{B}{c}\sin(k(x-d) - \omega t + \phi)\hat{y}$$

The Poynting vector for region III is $$\vec{S}_{III} = \tag{188}$$

$$\frac{1}{\mu_0}\vec{E}_{III} \times \vec{B}_{III} = \frac{1}{\mu_0 c}[A^2\sin^2(k(x+d) - \omega t) + 2AB\sin(k(x+d) - \omega t)$$

$$\sin(k(x-d) - \omega t + \phi) + B^2\sin^2(k(x-d) - \omega t + \phi)]\hat{x}$$

The time-averaged Poynting vector over one period is each region is $$<S_I> = \frac{-1}{\mu_0 c}\left[\frac{A^2}{2} + \frac{B^2}{2} + AB\cos(2kd - \phi)\right] \tag{189}$$

$$<S_{II}> = \frac{1}{\mu_0 c}\left[\frac{A^2}{2} + \frac{B^2}{2}\right]$$

$$<S_{III}> = \frac{-1}{\mu_0 c}\left[\frac{A^2}{2} + \frac{B^2}{2} + AB\cos(2kd + \phi)\right]$$

Therefore, power flows from the sender to the receiver when A.

Figure 111:
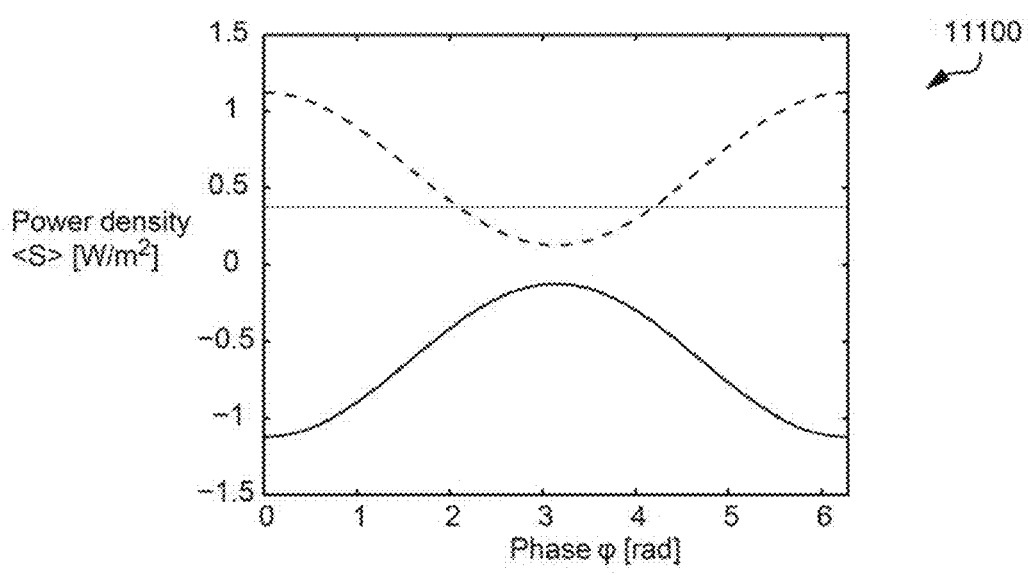
FIG. 111 is a graph of an example intensity in the three regions from Equation 189 plotted over a phase shift at the receiver.

FIG. 111 is a graph 11000 of an example intensity in the three regions from Equation 189 plotted over a phase shift at the receiver. The separation distance is $2d=\lambda$, A=1, and B=0.5.

Figure 112:
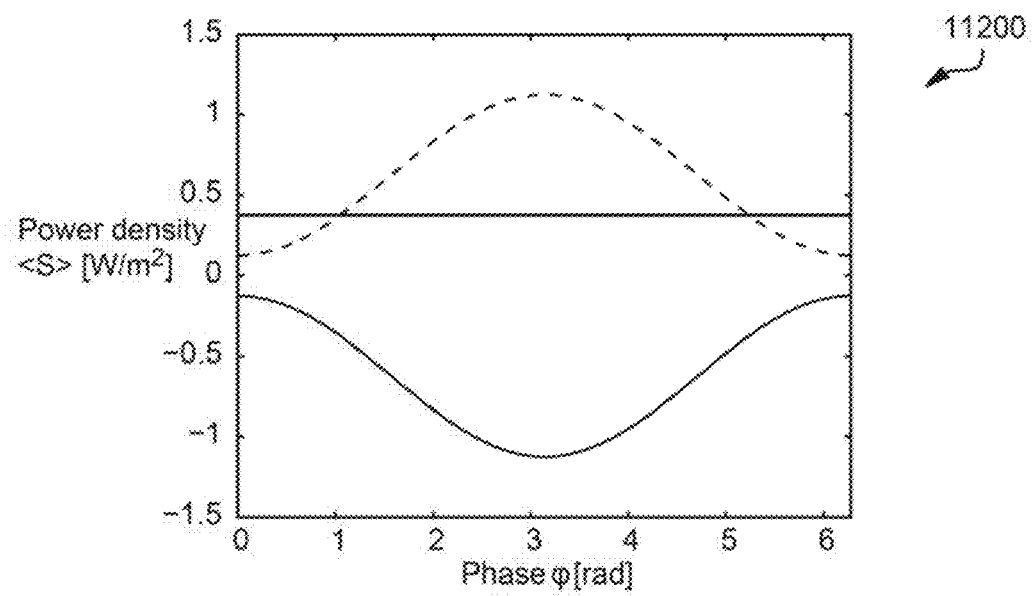
FIG. 112 is a graph of an example intensity in the three regions from Equation 189 plotted over the phase shift at the receiver.

FIG. 112 is a graph 11200 of an example intensity in the three regions from Equation 189 plotted over the phase shift at the receiver. The separation distance is $2d=\lambda/2$, A=1, and B=0.5.

Figure 113:
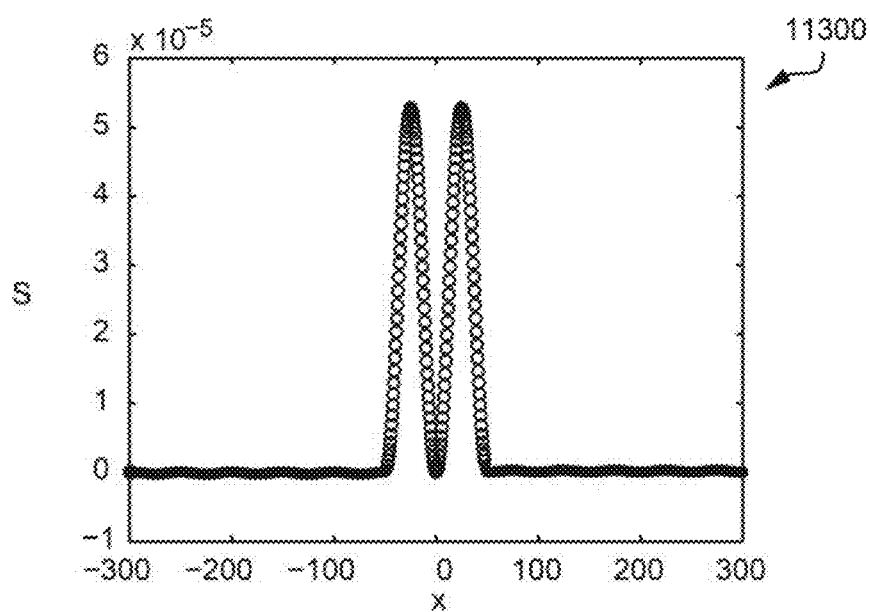
FIG. 113 is an example plot of Equations 184, 186, 188 plotted over the distance from the origin, where d=λ and φ=0.

Looking at the magnitude of the Poynting vector,

FIG. 113 is an example plot 11300 of Equations 184, 186, 188 plotted over the distance from the origin, where $d=\lambda$ and $\phi=0$.

Figure 114:
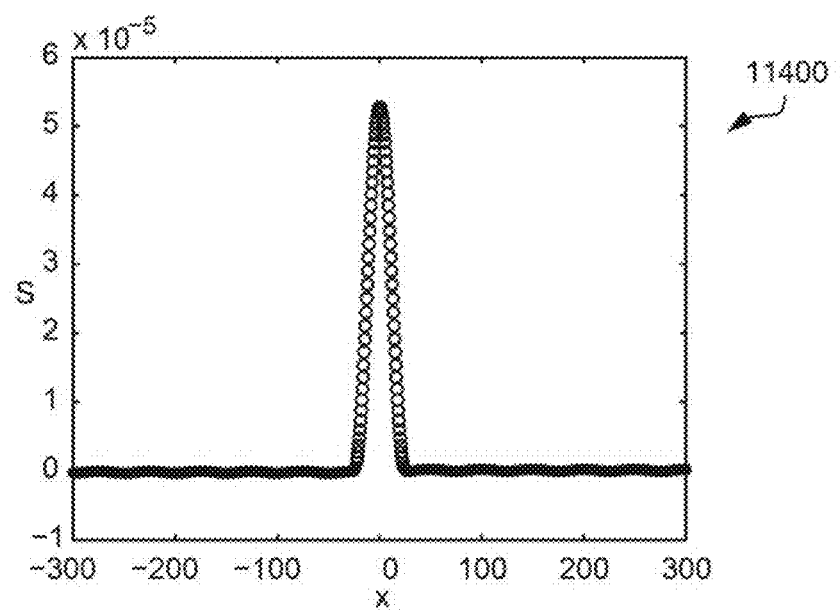
FIG. 114 is an example plot of Equations 184, 186, 188 plotted over the distance from the origin, where d=λ/2 and φ=π.

FIG. 114 is an example plot 11400 of Equations 184, 186, 188 plotted over the distance from the origin, where $d=\lambda/2$ and $\phi=\pi$.

Figure 115:
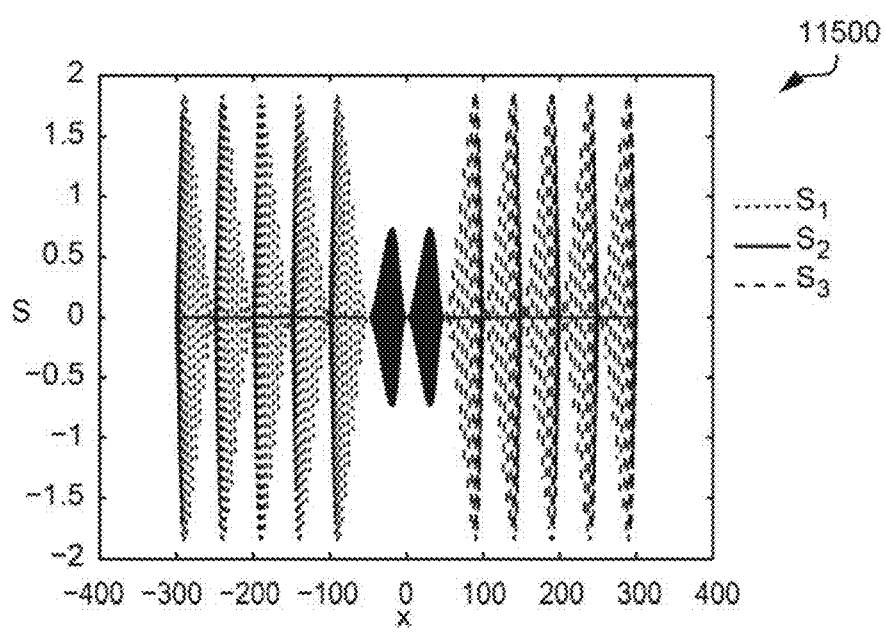
FIG. 115 a graph of an example direction and magnitude of the Poytning vector in each region.

FIG. 115 a graph 11500 of an example direction and magnitude of the Poytning vector in each region.

The power is related to the time-averaged Poynting vector by $$P=<S>A \tag{190}$$

where A is the area the energy flux permeates.

The power in each region is $$P_I = \frac{1}{\mu_0 c}\left[\frac{A^2}{2} + \frac{B^2}{2} + AB\cos(2kd - \phi)\right]\lambda^2 \tag{191}$$

$$P_{II} = \frac{-1}{\mu_0 c}\left[\frac{A^2}{2} + \frac{B^2}{2}\right]\lambda^2$$

$$P_{III} = \frac{1}{\mu_0 c}\left[\frac{A^2}{2} + \frac{B^2}{2} + AB\cos(2kd + \phi)\right]\lambda^2$$

Example Experiment

Figure 116:
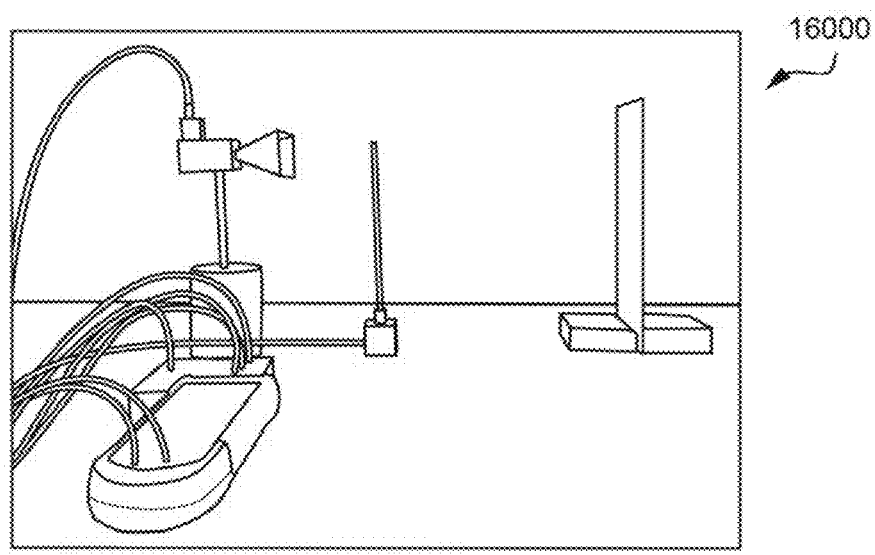
FIG. 116 is a diagram of an example setup without the waveguide to create a standing wave using a sheet of aluminum.

In one example, we set up the Gunn oscillator and electric field probe, as shown in FIG. 116, and have tested the equipment out and everything appears to work fine.

FIG. 116 is a diagram 11600 of an example setup without the waveguide to create a standing wave using a sheet of aluminum.

The next step is for me to measure the wavelength and verify that it is close to 3.19 cm, which is the size of the antennae that can be constructed.

TABLE 1

First trial where the E-field Probe is 60 cm from the antenna.

| # | Minima Distance (cm) | ΔMin |
|---|---|---|
| | 29 | 1.4 |
| | 27.6 | 1.9 |
| | 30.9 | 1.6 |
| | 32.5 | 1.7 |
| | 34.2 | 1.3 |
| | 35.5 | 1.7 |

TABLE 1-continued

First trial where the E-field Probe is 60 cm from the antenna.

| # | Minima Distance (cm) | ΔMin |
|---|---|---|
|   | 37.2 | 1.3 |
|   | 38.5 | 1.6 |
|   | 40.1 |   |

The average distance between minima is 1.5625 cm which implies that the wavelength is 3.125 cm.

TABLE 2

Second trial where the E-field Probe is 60 cm from the horn antenna.

| # | Minima Distance (cm) | ΔMin |
|---|---|---|
|   | 30.5 | 1.5 |
|   | 32.0 | 2.7 |
|   | 34.7 | 1.5 |
|   | 36.2 | 1.8 |
|   | 38.0 | 0.7 |
|   | 38.7 | 1.7 |
|   | 40.4 | 2.0 |
|   | 42.4 | 1.1 |
|   | 43.5 |   |

The average separation distance between minima is 1.6375 which implies the average wavelength is 3.275 cm. Therefore, the average wavelength between the two trials is 3.2 cm.

In one example, we cut a piece of wire 3.2 cm long and attached it to a multimeter to measure the current induced in the wire. Nothing was measured. We then attached the multimeter to the E-field sensor and took the wire in my hand and moved it around. A slight decrease in the current for the E-field was observed but the change was only 3-4 mA.

The systems, methods, devices, and logic described above may be implemented in many different ways in many different combinations of hardware, software or both hardware and software. For example, all or parts of the system may include circuitry in a controller, a microprocessor, or an application specified integrated circuit (ASIC), or may be implemented with discrete logic or components, or a combination of other types of analog or digital circuitry, combined on a single integrated circuit or distributed among multiple integrated circuits.

Figure 117:
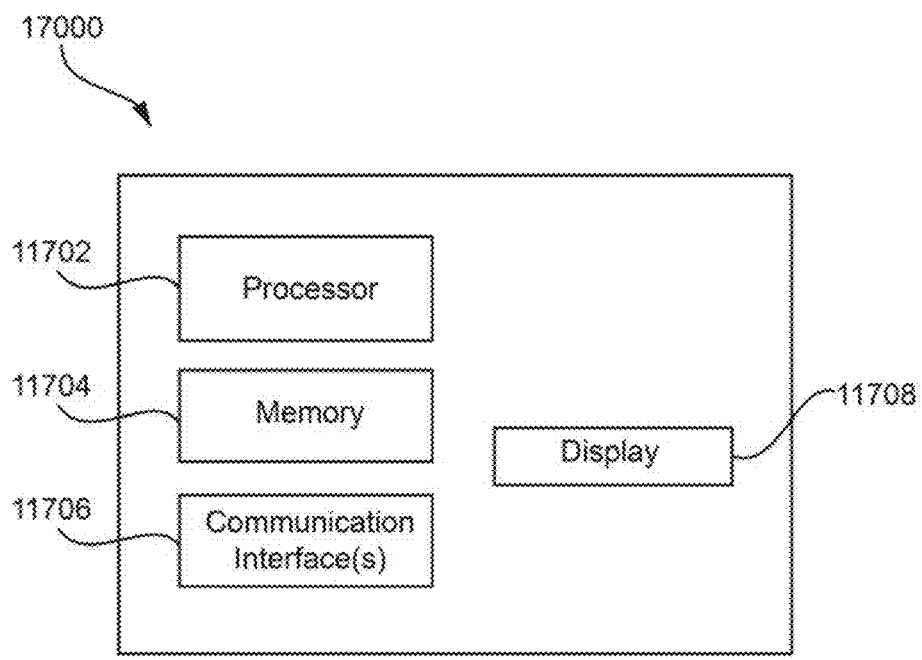
FIG. 117 is a block diagram of an example computing module of any of the devices of FIG. 1.

FIG. 117 is a block diagram of an example computing module 11700 of any of the devices 102, 104, 106, 108, 10, 112, 114, 116, 128, 130, etc., in FIG. 1. The computing module 11700 can include a processor 11702 and a memory 11704, e.g., a non-transitory computer medium including any of the memory types described herein. In some embodiments, the computing module 11700 includes a communication interface(s) 11706 for receiving power, signals and/or data, e.g., via radio frequency interfaces, other wireless interfaces, wired interfaces, etc. In some embodiments, the processor 11702 executes instructions stored in the memory 11704 to determine the received power, signals and/or data. In some embodiments, the processor 11702 can be embodied as a microprocessor, a coprocessor, a controller or various other computing or processing devices including integrated circuits such as, for example, an application-specific integrated circuit (ASIC), an field-programmable gate array (FPGA), some combination thereof, or the like, etc.

Any logic described herein may be implemented in many different ways in many different combinations of hardware, software, firmware, or any combination thereof. The processors become specially configured for performing the operations by the instructions. The processor may mean any type of circuitry configurable to perform the functionality described herein, such as, but not limited to, a microprocessor, a controller, a graphics processor, a digital signal processor, and/or other processor. The processor may also be implemented with discrete logic or components, or a combination of other types of analog or digital circuitry, combined on a single integrated circuit or distributed among multiple integrated circuits. All or part of the logic described above may be implemented as instructions for execution by the processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above. The memory can be implemented with one or more hard drives, and/or one or more drives that handle removable media, such as diskettes, compact disks (CDs), digital video disks (DVDs), flash memory keys, and other removable media.

One or more of the devices 102, 104, 106, 108, 10, 112, 114, 116, 128, 130, etc. can also include a display 11708, an audio output and a controller, such as a keyboard, mouse, trackball, game controller, microphone, voice-recognition device, or any other device that inputs information. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. The systems and methods can be implemented over a cloud.

Many modifications and other embodiments set forth herein can come to mind to one skilled in the art having the benefit of the teachings presented in the foregoing descriptions and the associated drawings. Although specified terms are employed herein, they are used in a generic and descriptive sense only and not for purposes of limitation.

What is claimed is:
1. A communication system, comprising:
  a transmitter, the transmitter configured to emit a signal;
  a means for modulating a frequency of the signal to form a frequency modulated signal; and
  a receiver, wherein the receiver is synchronized to be in resonance with the frequency modulated signal to receive the frequency modulated signal;

wherein the receiver comprises a non-linear antenna; and
wherein the non-linear antenna is selected from a time dependent resonance frequency, a quantum system with short lived intermediate states, a self-sustained nonlinear electric oscillator, and a quantum system in a rapidly changing external field.

2. The communication system of claim 1, wherein the signal comprises a periodic signal.

3. The communication system of claim 1, wherein the frequency modulated signal is modulated to a non-linear signal.

4. The communication system of claim 1, wherein the receiver is synchronized to be in resonance with the frequency modulated signal to receive the signal.

5. The communication system of claim 1, wherein the signal comprises electromagnetic radiation.

6. The communication system of claim 1, wherein the signal comprises microwaves.

7. The communication system of claim 1, wherein the frequency modulated signal is modulated by rapidly changing frequency control voltage of self-sustained, non-linear electric oscillator with adjustable inductance or adjustable capacitance.

8. The communication system of claim 1, wherein the transmitter is selected from a magnetron, a Gunn oscillator; a quantum system with short lived intermediate states, a self-sustained nonlinear electric oscillator, a quantum system in a rapidly changing external field, and an electromagnetic wave emitter driven by amplified output of a function generator.

9. A communication system, comprising:
a transmitter, the transmitter configured to emit a signal;
a means for modulating a frequency of the signal to form a frequency modulated signal;
a receiver, wherein the receiver is synchronized to be in resonance with the frequency modulated signal to receive the frequency modulated signal; and
wherein the frequency modulated signal moves through dense media with non-harmful absorption.

10. A communication system, comprising
a transmitter, the transmitter configured to emit a signal;
a means for modulating a frequency of the signal to form a frequency modulated signal;
a receiver, wherein the receiver is synchronized to be in resonance with the frequency modulated signal to receive the frequency modulated signal; and
wherein the frequency modulated signal is non-harmfully absorbed by organic matter.

11. A communication system, comprising:
a transmitter, the transmitter configured to emit a signal;
a means for modulating a frequency of the signal to form a frequency modulated signal;
a receiver, wherein the receiver is synchronized to be in resonance with the frequency modulated signal to receive the frequency modulated signal, and
wherein the frequency modulated signal resists jamming.

12. A communication system, comprising:
a transmitter, the transmitter configured to emit a signal;
a means for modulating a frequency of the signal to form a frequency modulated signal; and
a receiver, wherein the receiver is synchronized to be in resonance with the frequency modulated signal to receive the frequency modulated signal; and
wherein the frequency modulated signal is modulated so that a significant fraction energy of the frequency modulated signal self-directs from the transmitter to the receiver.

13. The communication system of claim 1 further comprising:
a transmitter configured to emit a signal; and
means for modulating a frequency of the signal to form a frequency modulated signal.

14. The communication system of claim 13, wherein the frequency modulated signal comprises electromagnetic radiation.

15. The communication system of claim 13, wherein the frequency modulated signal comprises microwaves.

16. The communication system of claim 13, wherein a rate of modulating the frequency depends on an amount of power of the received frequency modulated signal received by the receiver.

17. The communication system of claim 13, wherein an energy of an electromagnetic wave of the frequency modulated signal is self-directed from the transmitter to the receiver.

* * * * *